US012755049B1

(12) United States Patent
Lee

(10) Patent No.: US 12,755,049 B1

(45) Date of Patent: Oct. 6, 2026

(54) UNTRUSTED CONTEXT ADMISSION, DERIVATION CONTROL, AND EFFECT-BOUND REVALIDATION IN AGENTIC SYSTEMS

(71) Applicant: Yong Bok Lee, Sheridan, WY (US)

(72) Inventor: Yong Bok Lee, Sheridan, WY (US)

(73) Assignee: THE CROWN AND THE CROSS, Sheridan, WY (US)

( * ) Notice: Subject to any disclaimer, the term of this patent is extended or adjusted under 35 U.S.C. 154(b) by 0 days.

(21) Appl. No.: 19/648,556

(22) Filed: Apr. 15, 2026

Related U.S. Application Data

(60) Provisional application No. 64/001,445, filed on Mar. 10, 2026.

(51) Int. Cl.
*G06F 21/62* (2013.01)

(52) U.S. Cl.
CPC ................................ *G06F 21/6227* (2013.01)

(58) Field of Classification Search
CPC .................................................. G06F 21/6227
See application file for complete search history.

(56) References Cited

U.S. PATENT DOCUMENTS

| | | | |
|---|---|---|---|
| 6,308,274 | B1 | 10/2001 | Swift |
| 7,490,333 | B2 | 2/2009 | Grimaud et al. |
| 8,832,452 | B2 | 9/2014 | Johnson et al. |
| 8,875,266 | B2 | 10/2014 | Chambers et al. |
| 9,137,023 | B1 | 9/2015 | Hackborn et al. |
| 9,635,000 | B1 | 4/2017 | Muftic |
| 10,146,825 | B2 | 12/2018 | Almgren |
| 10,628,268 | B1 | 4/2020 | Baruch et al. |
| 11,245,682 | B2 | 2/2022 | Kukreja et al. |
| 11,546,377 | B2 | 1/2023 | Boshmaf et al. |

(Continued)

OTHER PUBLICATIONS

"Macaroons: Cookies with Contextual Caveats for Decentralized Authorization in the Cloud"—Birgisson et al.—NDSS 2014—Feb. 22, 2014.

(Continued)

*Primary Examiner* — Stephen T Gundry

(57) ABSTRACT

An agentic-system governance platform receives an external context artifact, assigns an artifact identifier, stores an artifact record, determines provenance evidence, and applies machine-readable policy rules to determine mutability, trust tier, authority eligibility, and an admission state for a candidate execution operation. The platform stores the artifact or a transformed representation in a workspace selected according to the admission state and exposes only a workspace-selected representation, including preventing a context-only representation from serving as an authority-bearing input. Restrictions associated with a source artifact propagate to derived artifacts unless a promotion condition is satisfied. For relayed artifacts, current correspondence of an authority capsule or relay envelope to action, recipient, environment, and trust-domain conditions is required before authority-bearing use. At an effect boundary, the platform revalidates version, admission, scope, and policy state, including for snapshot-based deferred execution and future-behavior updates, and generates receipts or verifier outputs for admission, relay, snapshot, and execution-use decisions.

30 Claims, 14 Drawing Sheets

(56) References Cited

U.S. PATENT DOCUMENTS

| | | | | |
|---|---|---|---|---|
| 12,003,655 | B1 | 6/2024 | Slaughter et al. | |
| 12,299,114 | B2 | 5/2025 | Kalle et al. | |
| 12,645,555 | B1 * | 6/2026 | Lee | G06F 11/24 |
| 12,651,164 | B2 * | 6/2026 | Charnock | G06N 3/08 |
| 12,651,181 | B1 * | 6/2026 | Krishnan | G06N 5/04 |
| 12,657,264 | B1 * | 6/2026 | Lee | G06F 21/16 |
| 12,657,639 | B1 * | 6/2026 | Lee | G06Q 40/12 |
| 2017/0075938 | A1 | 3/2017 | Black et al. | |
| 2017/0346639 | A1 | 11/2017 | Muftic | |
| 2018/0005186 | A1 | 1/2018 | Hunn | |
| 2018/0241572 | A1 | 8/2018 | Miele et al. | |
| 2020/0159966 | A1 | 5/2020 | Sibert et al. | |
| 2020/0259663 | A1 | 8/2020 | Firsov | |
| 2021/0018953 | A1 | 1/2021 | Ford | |
| 2026/0147820 | A1 * | 5/2026 | Fields | G06F 16/383 |
| 2026/0154698 | A1 * | 6/2026 | Rollins | G06Q 30/018 |
| 2026/0154749 | A1 * | 6/2026 | Vyas | G06Q 40/0631 |
| 2026/0155228 | A1 * | 6/2026 | Hernandez | G16H 20/10 |
| 2026/0162013 | A1 * | 6/2026 | Arbuckle | G06N 20/00 |

OTHER PUBLICATIONS

RFC 9449: “OAuth 2.0 Demonstrating Proof of Possession (DPOP)”—IETF—Sep. 2023.
RFC 9162: “Certificate Transparency Version 2.0”—Laurie, Messeri, Stradling—Dec. 2021.
RFC 3161: “Internet X.509 Public Key Infrastructure Time-Stamp Protocol (TSP)”—IETF—Aug. 2001.
RFC 9052: “CBOR Object Signing and Encryption (COSE): Structures and Process”—IETF—Aug. 2022.
Snowflake Inc., “AI + Data Predictions 2026: The Year of Agents and Ecosystems,” Snowflake Inc., © 2025.
“Survivable Key Compromise in Software Update Systems”—Samuel et al.—Published Oct. 4, 2010.
“In-toto: Providing farm-to-table guarantees for bits and bytes”—Torres-Arias et al.—USENIX Security 2019.
Mooney, Mallory, “AI Security Best Practices Guide” (Best Practice Series), Datadog, Oct. 30, 2025.
“Not what you’ve signed up for: Compromising Real-World LLM-Integrated Applications with Indirect Prompt Injection”—Greshake et al.

* cited by examiner

UNTRUSTED CONTEXT ADMISSION, DERIVATION CONTROL, AND EFFECT-BOUND REVALIDATION IN AGENTIC SYSTEMS

CROSS-REFERENCE TO RELATED APPLICATIONS

This application claims the benefit under 35 U.S.C. § 119 (e) of U.S. Provisional Patent Application No. 64/001,445, filed Mar. 10, 2026, the entire disclosure of which is hereby incorporated herein by reference.

INCORPORATION BY REFERENCE

Except for the provisional patent application identified in paragraph [0001], no other document is incorporated by reference.

Any appendix, example, glossary entry, deployment embodiment, procurement embodiment, or licensing embodiment described herein is exemplary and non-limiting and is not intended to import limitations into the claims unless explicitly recited in a claim.

STATEMENT REGARDING FEDERALLY SPONSORED RESEARCH OR DEVELOPMENT

Not Applicable.

FIELD

The present disclosure relates generally to computer security, agentic computing, execution governance, and machine-enforced admission control for external context inputs.

More particularly, the present disclosure relates to systems and methods for classifying external context artifacts according to provenance, mutability, trust tier, and authority eligibility; for preserving or constraining restrictions across derived artifacts, propagated actions, memory-state updates, policy-state updates, and other downstream-governing objects; and for revalidating execution-use of such artifacts or downstream-governing objects at effect boundaries before side effects occur.

In certain embodiments, the present disclosure further applies to media, publishing, newsroom, research, and other content-production environments in which external source artifacts are used to prepare candidate content items, publication derivatives, or externally presented outputs for readers, viewers, listeners, downstream syndication recipients, or machine-mediated delivery channels.

In certain embodiments, the present disclosure further applies to philanthropic, charitable-giving, grantmaking, and other public-benefit disbursement environments in which external context artifacts are used in connection with candidate donation, grantmaking, beneficiary-designation, or related externally consequential operations.

BACKGROUND

Agentic systems increasingly act on behalf of users, enterprises, and other principals across messaging systems, memory stores, retrieval systems, tool registries, code repositories, workflow engines, robotic controllers, and remote services.

In many deployments, the security and governance problem is not limited to direct compromise of a model prompt, direct mutation of a policy file, or direct takeover of an action executor. A more common and more difficult failure mode occurs when an agentic system receives an external context artifact that appears useful, benign, or authoritative, but that should not be permitted to influence authorization of a candidate execution operation.

Examples of such external context artifacts include prompt templates, resource identifiers, retrieved documents, memory items, markdown artifacts, shared notes, skill files, tool descriptions, policy candidates, policy packs, embedded references, delegated task payloads, relayed messages, and structured or mixed-media artifacts received from internal or external sources.

Conventional systems frequently collapse materially different artifact classes into a single context stream and permit a model, planner, orchestrator, or tool wrapper to consume the stream without a machine-readable admission decision that distinguishes informative context from authorization-capable input.

That collapse creates multiple technical vulnerabilities. A mutable shared document can be linked into memory and later changed such that the later content silently alters agent behavior. A retrieved note can be treated as if it were a policy-bearing artifact despite lacking verified provenance or an approved policy-pack association. A summary, plan, tool payload, or delegated task derived from an untrusted artifact can obscure the original trust defect and can be propagated to another agent, tool, or remote service in a more operational form.

The problem is amplified in long-running or asynchronous systems in which candidate actions are prepared at one time and executed later, or in multi-agent systems in which one component retrieves content, another component transforms that content, and a third component performs a side effect. In such systems, the artifact actually relied upon at the moment of side effect may differ from the artifact seen earlier, or may be a derived form that no longer visibly carries the original restriction status.

Additional failure modes arise when mutable artifacts are referenced through live pointers rather than content-addressed values, when compound artifacts contain both descriptive and imperative content, when different portions of an artifact should carry different governance states, or when disclosure of information should be blocked even though the same information may still be useful for bounded internal reasoning.

Additional failure modes arise when an external context artifact is rendered, excerpted, clipped, highlighted, resized, reflowed, translated, preview-carded, or otherwise transformed into a presentation-derived representation that differs from the original artifact in visual emphasis, ordering, scope, or surrounding interface context. Conventional systems frequently treat such a presentation-derived representation as if it were self-authenticating or as if authority were carried by the later presentation itself, even though the later presentation can omit qualifiers, collapse selector scope, enlarge apparent support, or otherwise inflate the practical authority of the underlying artifact without a fresh machine-readable governance decision.

Further failure modes arise when an external context artifact is converted into a downstream-governing object such as a memory write, embedding record, retrieval index entry, long-lived plan, cached tool argument package, policy candidate, safety rule candidate, allowlist candidate, training example, or deferred job object. Once stored in such a downstream-governing object, the original defect may become harder to detect while still influencing later authorization, ranking, disclosure, execution, or policy behavior.

Further examples of external context artifacts or downstream-governing objects include, without limitation, a build artifact, package manifest, source-map or debug-mapping artifact, plugin or extension package, hook configuration, managed settings file, permission profile, connector descriptor, agent or sub-agent definition, persistent instruction file, session-resume object, background-task object, queued remote-operation object, channel message, remote-control event, or integrated-development-environment payload. Such an object can be loaded, installed, enabled, resumed, replayed, scheduled, routed, or otherwise operationalized in a form that no longer visibly exposes the original source restrictions, yet can still influence later tool availability, memory behavior, policy behavior, target selection, parameter selection, relay scope, disclosure scope, or execution authorization.

Conventional systems also commonly lack a proof-carrying mechanism by which a downstream agent, tool, executor, or remote service can verify that a relayed object remains within the authority scope actually granted for the then-current artifact version and then-current policy state. As a result, approval context generated earlier can be replayed, over-broadened, or detached from the specific effect-bearing operation ultimately performed.

Accordingly, there is a need for a technical governance rail that treats external context artifacts as governed machine objects rather than as undifferentiated text or data, that separates authority-bearing inputs from context-only inputs, that preserves restrictions across derivation and propagation, and that revalidates execution-use before any side effect is permitted to occur.

There is a further need for such a governance rail to generate machine-verifiable records suitable for platform integration, enterprise audit, procurement diligence, incident review, safety assurance, and post-execution verification, without requiring the claims to be limited to any particular model family, interface modality, vendor stack, or deployment topology.

There is a further need in philanthropic and public-benefit disbursement environments for a governance rail that distinguishes informative charitable context from authority-bearing disbursement input. External context artifacts in such environments can include charitable-registry records, nonprofit profiles, beneficiary attestations, impact summaries, grant restrictions, jurisdictional or sanctions-compliance records, donation endpoint descriptors, payment-platform metadata, public appeals, donor preference objects, or mixed-format diligence packets. Conventional systems frequently permit such materials to enter donor-facing or agent-facing workflows without a machine-readable distinction between advisory use and authorization-capable use, thereby allowing stale, mismatched, or insufficiently verified charitable context to influence donation, grantmaking, routing, or beneficiary-selection operations.

Additional technical failures arise when a nonprofit identity, beneficiary designation, donation endpoint, or jurisdictional eligibility condition is inferred from a rendered page, summarized profile, cross-border payment instruction, or machine-generated giving recommendation rather than from then-current artifact correspondence. A charitable entity name can correspond to multiple legal entities, a beneficiary or destination account can change, a public appeal can omit operative restrictions, a nonprofit site or payment surface can be transformed into a machine-agent interaction surface, and a cross-border giving path can depend on current geography, recipient class, regulatory posture, or due-diligence state. Conventional systems typically do not preserve selector-scoped lineage, endpoint binding, or recipient-specific permitted-use limits across such transformations and therefore can misroute, over-broaden, or prematurely authorize a public-benefit disbursement.

Further failures arise when a charitable source artifact or a derivative thereof is converted into a donor-ranking object, cause-matching object, beneficiary-routing object, nonprofit-eligibility record, cached donation recommendation, interoperability descriptor, or other future-behavior object. Once stored in such a downstream-governing object, a withdrawn charity record, corrected beneficiary attestation, expired diligence result, or later-disqualified endpoint can continue to influence donor guidance, automated matching, routing, disclosure, or commitment behavior unless the governance rail propagates lineage, revalidation, and clawback controls through those future-behavior stores.

In content-publishing environments, external context artifacts frequently include press releases, analyst notes, interview transcripts, uploaded source packets, structured fact tables, public-web materials, internal edit notes, prior publications, and mixed-format source bundles that are used to prepare a candidate content item for later external presentation.

Conventional systems commonly collapse the path from source artifact to candidate draft into an undifferentiated drafting stream. As a result, an AI-generated or human-edited draft can obscure whether a selected sentence, quotation, caption, summary, or headline phrase remains supported by the current source set, remains within granted scope, or was derived from a source artifact that should have remained context-only, quarantined, or otherwise restricted.

Additional technical failures arise because content-publishing systems often treat commitment to a content-management-system state, publication queue, syndication queue, newsletter object, push object, summary surface, chatbot-answer surface, or other outward delivery path as an ordinary workflow transition rather than as an effect boundary or disclosure-governed boundary requiring fresh machine validation.

Further failures arise when one publication derivative is assumed to authorize another. A long-form article, a headline, a blurb, a caption, an alert, and an answer fragment can each impose different support, disclosure, audience, or scope requirements, yet conventional systems frequently permit channel transformation, summarization, excerpting, or reformatting to broaden the practical effect of source material without separately preserving selector-scoped restrictions.

Comparable failures arise in browser-mediated, workflow, and computer-use environments in which a rendered card, interface snippet, autofill candidate, answer fragment, preview surface, or other interaction surface is allowed to drive a click sequence, form submission, credential use, purchase flow, navigation event, or disclosure event. In such environments, layout transformation, truncation, reformatting, or channel transformation can alter what a user or downstream component perceives as supported, approved, or in scope, yet conventional systems typically do not preserve selector-scoped lineage and permitted-use bindings from the underlying artifact to the later interaction surface.

Mutable-source drift presents a related problem. A candidate content item can be prepared at one time from a live source artifact, further edited later, and then published after the source artifact has changed, been corrected, been withdrawn, or otherwise ceased to support one or more published assertions. Without source-lineaged revalidation at publication time, stale or unsupported content can cross an external-presentation boundary even though the original drafting context appeared acceptable.

Newsroom and publishing systems also increasingly rely on memory stores, retrieval indexes, embedding stores, reranker caches, answer corpora, recommendation models, editorial policy candidates, and training pathways that can be influenced by earlier source artifacts or drafts. If restricted, unsupported, or stale content is allowed to enter those future-behavior stores, later content generation, ranking, recommendation, or policy behavior can be corrupted in ways that are more difficult to trace back to the original source defect.

Accordingly, there is a further need for a technical governance rail that preserves source-lineaged restrictions across drafting and channel transformation, treats publication and syndication boundaries as effect-bearing or disclosure-bearing boundaries when appropriate, and constrains later newsroom memory, retrieval, ranking, and training behavior unless then-current support, scope, and policy conditions remain satisfied.

SUMMARY

In some embodiments, a computer-implemented governance system receives an external context artifact, assigns an artifact identifier, creates an artifact record in an artifact registry, and determines provenance evidence, mutability state, and trust tier for the external context artifact according to one or more machine-readable policy rules.

In some embodiments, an authority-eligibility engine determines whether the external context artifact is eligible to influence authorization of a candidate execution operation, and an admission engine assigns an admission state selected, for example, from deny, quarantine, context-only, authority-bearing, hold, or downgraded-authority.

In some embodiments, the system stores the artifact or a transformed representation thereof in one of multiple workspaces selected according to the admission state, such as a quarantine workspace, a context-only workspace, or an authority-bearing workspace, thereby allowing informational use of an artifact without allowing the artifact to serve as an authority-bearing input.

In some embodiments, the system transforms context-only artifacts before exposure, such as by removing or suppressing imperative instruction strings, executable fragments, embedded credentials, capability descriptors, or authority tokens, by converting imperative language into descriptive metadata, or by otherwise generating a bounded representation that cannot by itself authorize an effect-bearing action.

In some embodiments, the system assigns governance states at whole-artifact granularity, fragment granularity, field granularity, or any combination thereof, thereby permitting different portions of a compound artifact to receive different admission states or different authority scopes.

In some embodiments, a derivation controller creates lineage bindings between a source artifact and one or more derived artifacts, including summaries, extracted instruction sets, generated plans, tool argument packages, delegated tasks, policy candidates, embeddings, labels, or relayed messages, and a propagation controller applies inherited restrictions so that transformation into a new syntax or object class does not launder the original restriction state.

In some embodiments, a promotion controller determines whether a source artifact or derived artifact can be promoted from a restricted state to an authority-bearing state according to one or more promotion conditions, such as signature verification, digest lock, trusted conversion pipeline validation, policy-pack authorization, threshold approval, witness approval, or other machine-evaluable conditions.

In some embodiments, an execution boundary gate intercepts a candidate execution operation at or sufficiently near an effect boundary, and a revalidation engine rechecks a then-current version or digest, admission state, mutability state, trust tier, authority-eligibility status, promotion status where applicable, permitted-use scope, revocation status, and policy state, including, where applicable, then-current snapshot validity, freeze conditions, pointer-resolution correspondence, or other pointer-control conditions, before allowing the side effect to proceed.

Example effect boundaries can include message transmission, file write, file delete, task dispatch, queue insertion, schedule creation, credential use, data disclosure, remote application programming interface mutation, purchase submission, actuator command emission, process launch, memory write, retrieval-index update, embedding-store update, policy-store update, fine-tuning queue insertion, or initiation of any operation that would cause, commit, or materially configure a later side effect immediately or at a later time.

In some embodiments, the disclosed architecture improves operation of agentic systems by replacing ad hoc prompt-level treatment of external context with machine-enforced admission, propagation, and revalidation logic that is tied to artifact identity, artifact version, and effect-bound use. The system thereby reduces mutable-artifact corruption, indirect prompt injection, context laundering, stale-context execution, and cross-agent propagation of unauthorized directives.

In some embodiments, the system further generates integrity-protected receipts, records, and assurance exports usable for enterprise governance, procurement diligence, platform attestation, safety review, audit, licensing, or partner verification.

In some embodiments, the system generates a typed inert representation of an external context artifact, the typed inert representation containing declarative fields, extracted facts, normalized references, or other non-operative content while excluding, neutralizing, or separately retaining authority-bearing strings, executable fragments, or capability-bearing fields. The system can associate the typed inert representation with one or more fragment selectors or authority maps indicating which portions, spans, regions, fields, or views are eligible for which uses.

In some embodiments, a promotion controller or relay controller generates an authority capsule, relay envelope, or other machine-readable authorization object bound to one or more artifact identifiers, derived-artifact identifiers, versions or digests, fragment selectors, permitted action classes, permitted parameter classes, principal scope, recipient scope, environment scope, expiration conditions, revocation handles, and integrity data, thereby allowing authority-bearing use to be conveyed in a separately governed form rather than inferred from raw artifact content.

In some embodiments, the execution boundary gate, after successful revalidation, generates a single-use or bounded-use execution authority token bound to an operation identifier, target identifier, parameter digest, artifact digest set, policy-state identifier, nonce, and expiration condition, and an execution component is required to present and consume the execution authority token at the effect boundary before the side effect is committed.

In some embodiments, the actual side-effect interface is itself treated as a governed machine object identified by an effect-interface identifier, an effect-interface class, a consumer-runtime identifier, one or more measurement or attestation values, and one or more endpoint-binding values, such that an execution authority token is not merely valid in the abstract but is valid only for presentation and consumption at a then-current permitted effect boundary corresponding to the bound interface conditions. If the actual interface, runtime posture, attestation posture, or endpoint correspondence fails, the side effect is denied, held, downgraded, or quarantined notwithstanding earlier approval logic.

In some embodiments, writes to long-term memory, retrieval indexes, embedding stores, policy stores, policy-candidate stores, prompt caches, ranking models, training corpora, fine-tuning queues, or other future-behavior stores are treated as governed side effects. Restrictions associated with a source artifact or derived artifact can thereby constrain whether the artifact may influence future retrieval, future ranking, future policy, or future model behavior.

In some embodiments, when a source artifact or derived artifact is permitted to influence one or more future-behavior stores, the system stores an influence map, downstream-dependency set, training-exclusion manifest, unlearning work order, derivative-quarantine epoch, rollback-domain indicator, recomputation requirement, residual-influence status, or reuse-block reason, thereby permitting later correction, withdrawal, revocation, or source drift to be propagated to memory objects, retrieval objects, ranking objects, policy candidates, or training pathways that previously incorporated the affected artifact.

In some embodiments, the system determines one or more sensitivity classes for a whole external context artifact, a derived artifact, a selector-scoped portion thereof, a transformed representation, or another bounded execution-use representation, and generates, according to the determined sensitivity class and a requested context-of-use, a minimization transform that removes, masks, tokenizes, generalizes, substitutes, or otherwise reduces fields, selectors, values, or fragments not required for the requested use. The system can store a minimization-lineage record identifying one or more removed, masked, substituted, generalized, tokenized, or retained portions and can bind a resulting minimized representation to one or more source identifiers, selector-set digests, transformation digests, permitted-use bindings, freshness conditions, or integrity data such that the minimized representation does not obtain broader authority than is expressly granted for the governed source scope.

In some embodiments, the system generates a route-decision record for a transformed representation, authority-shadow view, minimized representation, or other bounded execution-use representation, the route-decision record identifying one or more permitted model classes, runtime-family descriptors, provider-class descriptors, trust-domain classes, context-of-use profiles, disclosure classes, or route outcomes, including local-only execution, enterprise-bounded remote execution, partner-bounded remote execution, public-model-permitted execution for a minimized representation, advisory-only routing, or no-route treatment. A representation eligible for one model class, runtime family, provider class, or trust domain is not thereby eligible for another, and a later downstream submission, disclosure, relay, or commit fails closed when an actual route posture does not correspond to the governed route-decision record.

In some embodiments, when a transformed representation, authority-shadow view, minimized representation, or other governed representation is to be supplied to a model, runtime, connector surface, tool surface, or remote service for inference, ranking, extraction, planning, drafting, classification, summarization, or another bounded machine use, the system generates an outbound invocation package bound to one or more source identifiers, selector sets, transformation digests, minimization-lineage values, route-decision values, runtime-family descriptors, provider-class descriptors, context-of-use constraints, allowed output classes, parameter-class bounds, freshness values, and integrity data, and treats machine-produced content returned therefrom as a response artifact subject to a separate admission decision, selector-scoped transformation, permitted-use determination, and, where applicable, fresh promotion or fresh effect-bound revalidation before the response artifact is permitted to influence authorization, disclosure, memory update, policy update, connector activation, tool invocation, or another downstream-governing use.

In some embodiments, installation, enablement, loading, activation, routing, resumption, replay, queued dispatch, or downstream consumption of a machine-consumable derivative, including without limitation a plugin or extension package, hook configuration, managed settings file, permission profile, connector descriptor, agent definition, session-resume object, background-task object, channel-bound relay object, build artifact, source-map artifact, or another operational derivative, is treated as admission-governed intake, derivation-governed propagation, and, when capable of influencing later tool availability, policy evaluation, disclosure scope, target selection, parameter selection, or execution behavior, as a governed side effect subject to then-current revalidation. Such a derivative does not obtain broader authority merely because it was installed, cached, resumed, rewrapped, or redistributed.

In some embodiments, a connector descriptor, tool definition, invocation schema, session-resume object, background-task object, or other machine-consumable derivative capable of affecting later tool availability, target selection, parameter selection, disclosure scope, or execution behavior is associated with a capability manifest identifying one or more tool-class sets, schema digests, invocation-contract digests, activation-scope values, session-binding values, enablement epochs, refresh conditions, expiration conditions, or revocation handles, such that installation, activation, resumption, or routing of the derivative does not itself grant broader authority absent then-current correspondence to the capability manifest and other governing objects.

In some embodiments, one or more machine-consumable derivatives are represented as managed-agent control-plane objects including one or more agent roster objects, work-item objects, issue objects, board-state objects, assignment-state records, comment-linked selector records, attachment-linked selector records, status-transition records, or combinations thereof, such that a displayed roster entry, issue state, board lane, comment, attachment reference, or workflow-board transition does not itself grant broader operational authority absent then-current correspondence among the represented object, one or more governing artifacts or selectors, an applicable capability manifest, and one or more current policy, lease, session, or attestation conditions.

In some embodiments, one or more local or self-hosted runtimes are discovered, admitted, enrolled, or re-enrolled through a discovery surface including a command-line interface, daemon, session manager, local registry, service endpoint, socket endpoint, or other machine-usable registration surface, and the governance rail generates or verifies a local-agent enrollment record bound to one or more runtime-family descriptors, provider-class descriptors, executable or measurement digests, capability-manifest references, workspace-scope values, delegated-credential or credential-lease references, heartbeat or refresh values, registration epochs, revocation handles, and integrity data, such that later task assignment, task acquisition, board-state transition, queued dispatch, or execution use fails closed when then-current enrollment correspondence is absent, stale, restarted, re-registered, or mismatched.

In some embodiments, when an artifact or derived artifact is relayed to another agent, tool, runtime, or remote service, the recipient verifies an accompanying authority capsule or relay credential and may additionally verify policy compatibility, trust-domain compatibility, or runtime-attestation conditions before the relayed object is permitted to influence authorization of an effect-bearing operation.

In some embodiments, one or more heterogeneous runtimes, tool providers, remote services, connector surfaces, or other provider-specific execution surfaces are each represented by a runtime-family descriptor, a provider-class descriptor, or both, and one or more provider-specific capability descriptions are transformed into a normalized capability record such that authority is evaluated according to machine-readable action classes, parameter classes, recipient classes, environment scope, and policy correspondence rather than according to vendor-specific invocation syntax alone.

In some embodiments, a delegated credential object or credential lease record governs non-export use of a secret, token, signing capability, approval capability, or other credential material on behalf of a session, task, agent, sub-agent, tool, runtime, or remote service, the delegated credential object or credential lease record being bound to one or more action classes, target or recipient classes, runtime-family or provider-class conditions, expiration or refresh conditions, and revocation, exhaustion, or renewal conditions, such that refresh, renewal, or rotation does not itself broaden authority absent a fresh governed authorization path.

In some embodiments, a workspace scope manifest identifies one or more repositories, branches, folders, file trees, drives, data rooms, object sets, pointer targets, or other bounded content scopes, and the governance rail separately determines an enumeration permit for listing, crawling, resolving availability of, or otherwise inspecting objects and a dereference permit for opening, reading, fetching, materializing, checking out, or exporting governed content, such that visibility of object existence does not itself authorize authority-bearing use of the underlying content.

In some embodiments, execution authority token 194 is bound not only to operation, artifact, selector, and policy correspondence values, but also to one or more runtime-family descriptors, provider-class descriptors, invocation-dialect translation records, credential lease records, session-authority digests, endpoint-class values, or interface-posture values, such that a candidate commit fails closed when an actual commit path, actual invocation posture, actual runtime posture, or actual credential-consumption posture does not correspond to the governed posture previously authorized.

In some embodiments, the system generates portable proof bundles, attestation envelopes, or assurance exports that demonstrate, without necessarily disclosing the full governed content, that admission-state assignment, promotion conditions, restriction inheritance, relay scope, revalidation checks, or execution-use conditions were satisfied for a specific artifact version and policy state.

In some embodiments, the system further identifies a source policy-pack posture associated with a machine-consumable derivative, promoted object, or relay object and a destination verification profile associated with a destination runtime, tool provider, remote service, partner, auditor, procurement consumer, insurer, regulator, or other relying party, and generates a policy-compatibility record indicating whether one or more source outcome values, allowed relying-party classes, and context-of-use constraints remain compatible with the destination verification profile for a requested downstream acceptance event.

In some embodiments, the policy-compatibility record is generated according to one or more provider-neutral compatibility classes, outcome-normalization rules, profile-negotiation rules, relying-party-class conditions, selector or transformation correspondence conditions, or context-of-use constraints such that a later-presented provider-specific outcome code, verification result, or evidence-bound posture is not treated as sufficient for downstream acceptance unless then-current correspondence to the destination verification profile is established.

In some embodiments, the system generates a portable verification bundle and a verifier result receipt bound to one or more policy-pack identifiers, selector-set digests, transformation digests, normalized-capability-record identifiers, invocation-dialect translation-record digests where applicable, destination-verification-profile identifiers, compatibility verdicts, and allowed relying-party or context-of-use values, the portable verification bundle being selectively-disclosure capable and usable by a downstream policy-consumer rail without requiring disclosure of full governed content or underlying credential material.

In some embodiments, a downstream policy-consumer rail treats installation, enablement, submission, certification, procurement review, partner exchange, insurer review, regulator review, or other downstream policy-consumer intake as a governed acceptance boundary distinct from an effect boundary, and denies, narrows, downgrades to advisory-only treatment, holds, rejects, or requires bundle reissuance when a policy-compatibility record, destination verification profile correspondence, review-state correspondence, or verifier result receipt remains absent, stale, mismatched, revoked, or otherwise unsatisfied.

In some embodiments, a previously issued portable verification bundle or verifier result receipt is invalidated, downgraded, held, narrowed, rejected, or reissued when a source policy-pack version, destination verification profile, selector correspondence, transformation correspondence, schema correspondence, review-freshness condition, allowed relying-party class, or context-of-use constraint changes such that continued downstream acceptance no longer remains within governed scope.

In some embodiments, a machine-consumable derivative, delegated task object, session-resume object, background-task object, reservation record, or other governed object represents a workload intended for queued, scheduled, resumed, replayed, migrated, or otherwise deferred execution on a heterogeneous execution cluster comprising one or more workload manager classes, runtime families, provider classes, partitions, node pools, accelerator pools, or combinations thereof. The governance rail can generate, retrieve, or verify a scheduler-neutral workload admission bound to one or more workload identifiers, job descriptors, normalized capability records, selector-set digests, snapshot or reservation values, target or environment scope values, resource-share conditions, preemption postures, destination verification profiles, and integrity data, such that no later queue insertion, schedule creation, dispatch, placement, migration, resumption, or commit obtains broader authority absent then-current correspondence to the governed posture and without requiring limitation to any named scheduler implementation or vendor-specific scheduler syntax.

In some embodiments, the system further generates a workload-admission receipt or a selectively-disclosure-capable portable verification bundle identifying one or more corresponding workload identifiers, runtime-family values, provider-class values, partition correspondences, node-pool correspondences, accelerator-pool correspondences, verification-profile values, outcome codes, freshness values, reason codes, or integrity data for downstream acceptance or later effect-bound revalidation.

In some embodiments, a source artifact or derived artifact remains exploratory, advisory, simulation-only, draft-only, or context-only even when it is machine-usable, and is not permitted to enter a submission-bound, audit-bound, certification-bound, sponsor-facing, insurer-facing, procurement-facing, regulator-facing, or other evidence-bearing use unless a promotion request identifying a target consumer class, a context-of-use profile, and one or more required verification classes is accepted under then-current policy.

In some embodiments, the promotion request binds an evidence-purpose digest, an intended decision class, one or more allowed relying-party classes, and one or more selector sets or evidence-scope fields indicating whether requested promotion applies to a full artifact, a bounded derivative, a selected assertion set, a selected field set, or a transformed representation, such that exploratory use of an artifact does not by itself authorize use of a broader or differently contextualized evidence object.

Before evidence-bearing promotion is accepted, the governance rail may generate a promotion snapshot or verification snapshot that freezes or otherwise binds one or more source digests, derived-artifact digests, selector-set digests, transformation digests, one or more model identifiers, one or more training-, reference-, or input-data digests, one or more processing-pipeline, conversion-pipeline, or derivation-pipeline identifiers, one or more policy-pack identifiers, one or more review-state identifiers, and other correspondence values required to determine whether a later-presented evidence object remains the same governed object that was reviewed.

In some embodiments, evidence-bearing promotion further depends on one or more reviewer classes, approver classes, witness classes, or quorum conditions, each bound to the same or narrower artifact scope, context-of-use profile, target consumer class, and freshness window, such that a later-presented approval, signature, threshold result, or witness result cannot be replayed against a broader scope, a different relying-party class, or a later-changed artifact, model, data, pipeline, or policy posture.

In some embodiments, the system evaluates artifact content according to a selector grammar that can address whole artifacts, fragments, fields, attachments, embedded resources, OCR layers, metadata fields, link targets, tool-argument fields, vector or chunk spans, or combinations thereof, and generates an authority-shadow view 196 or bounded execution-use representation corresponding to the selected scope rather than exposing raw artifact content for authorization decisions. Selector expressions, typed inert fields, or transformed field sets can be canonicalized according to deterministic serialization or field-ordering rules and bound to a canonical selector form, selector-set digest, or transformation digest so that scope-equivalent selections remain machine-comparable across transformations, modalities, and later revalidations.

In some embodiments, promotion of a context-only, held, or quarantined artifact is governed by a promotion manifest 197 bound to one or more source identifiers, source digests or versions, transformation identifiers, selector sets, action classes, parameter classes, recipient or audience classes, environment scope, expiration conditions, revocation handles, approver identities, quorum state, and integrity data, promotion being scope-narrowing by default unless a fresh admission decision expressly authorizes broader authority. The promotion manifest 197 can further bind reviewer or approver classes, freshness windows, policy-state identifiers, policy epochs, or parameter digests so that a promotion decision fails closed when current source, review, or policy correspondence no longer matches the bound values.

In some embodiments, promotion manifest 197 or another evidence-bound authorization object functions as an evidence-grade permit rather than as a bare metadata record, and includes or references one or more source or derivative identifiers, one or more snapshot identifiers, one or more review or approval correspondences, one or more context-of-use constraints, one or more allowed relying-party classes, one or more expiry conditions, one or more revocation handles, and integrity data sufficient for fail-closed denial when a later submission, disclosure, exchange, or other evidence-bearing use does not match the governed posture.

In some embodiments, the governance rail packages a portable proof bundle, verifier kit 205, publication-assurance bundle, or other assurance export into a downstream verification bundle that yields a verifier result receipt, decision badge, verification profile, or equivalent machine-verifiable determination, and a downstream policy-consumer rail may require correspondence of that determination before accepting the promoted object for submission, certification, procurement, partner exchange, insurance, safety review, regulator review, or other effect-bearing evidence use. Such an export may be selective-disclosure capable and may still support later invalidation, clawback, downgrade, hold, or revocation when a bound source changes, a model, data, or pipeline correspondence fails, a review-freshness window expires, or a promotion condition is later shown to have been unsatisfied.

In some embodiments, the promoted object is a charitable, grantmaking, or public-benefit disbursement object and the downstream verification bundle is evaluated before donation submission, grantmaking instruction dispatch, beneficiary designation, donor-advised disbursement, nonprofit-endpoint handoff, or other externally consequential public-benefit operation is accepted or committed. The downstream verification bundle can identify, or selectively prove correspondence of, one or more charity-identity fields, beneficiary-provenance fields, donation-destination fields, jurisdiction-eligibility fields, interoperability-profile fields, or other public-benefit execution constraints without requiring disclosure of full donor, beneficiary, or nonprofit records.

In some embodiments, external context artifacts or derived artifacts used in such public-benefit disbursement environments include charity-registry extracts, nonprofit-profile records, beneficiary attestations, impact summaries, grant restrictions, public appeals, cross-border diligence packets, donation endpoint descriptors, payment-surface descriptors, donor preference objects, or machine-generated giving recommendations. A promotion manifest, authority capsule, relay envelope, or verifier kit can therefore be bound to a selected charitable entity, a selected beneficiary or beneficiary class, a selected destination endpoint, a selected jurisdiction or trust domain, a selected impact or use-of-funds scope, or any combination thereof, promotion remaining scope-narrowing by default unless a fresh admission decision expressly authorizes broader authority.

In some embodiments, writes to donor-guidance stores, nonprofit-ranking stores, cause-classification stores, beneficiary-routing stores, interoperability-profile stores, or other future-behavior stores are treated as governed side effects, and later correction, withdrawal, revocation, endpoint drift, diligence expiry, or charity-identity mismatch can trigger hold, downgrade, denial, tombstoning, reindexing, purge scheduling, recomputation, or other clawback treatment before the affected object is again permitted to influence a public-benefit disbursement or related recommendation.

In some embodiments, cross-agent or cross-service propagation is governed by a relay envelope 198 that records hop count, maximum relay depth, fan-out limit, recipient-class binding, trust-domain binding, replay-protection data, and required downstream revalidation obligations such that relay does not inflate privilege and downstream authority is limited to an intersection of upstream granted scope and downstream local policy. The relay envelope 198 can further bind session or channel data, monotonic sequence or idempotency data, sender-runtime attestation data, or other anti-replay conditions and can be rewrapped or narrowed by a downstream runtime without creating broader authority than was previously granted.

In some embodiments, cross-agent or cross-service propagation is further represented by one or more delegation-chain records or delegation receipts, each delegation receipt cryptographically or otherwise integrity-protectively binding a delegator identity or descriptor, a delegate identity or descriptor, a parent-hop reference if any, an authority-capsule reference or authority-scope digest, a purpose digest or task reference, one or more permitted action classes, one or more permitted parameter classes, one or more target or recipient classes, an environment scope, a freshness value or expiration condition, a re-delegation policy, a non-transitive indicator, and integrity data, such that delegated authority is conveyed in a machine-verifiable form rather than inferred from narrative instructions, chat context, or orchestration state alone.

In some embodiments, delegation is non-transitive by default, and any downstream relay, re-delegation, or authority-bearing use is fail-closed unless expressly permitted by then-current delegation-chain data, then-current policy-state correspondence, and then-current local compatibility checks. Downstream usable scope can thereby be limited to an intersection of upstream granted scope, downstream local policy, selector-scoped source restrictions, target correspondence, recipient correspondence, and environment correspondence, such that no relay, repackaging, rewrapping, session resumption, queue handoff, or sub-agent transfer inflates privilege absent a fresh admission or fresh promotion decision expressly authorizing broader authority.

In some embodiments, delegated operation is further governed according to a mode class including read mode, draft mode, and act mode. Read mode can permit bounded retrieval, summarization, ranking, provenance generation, or non-operative analysis. Draft mode can permit preparation of a candidate message, task, command, workflow object, or other candidate action without final commitment. Act mode can permit an effect-bearing commit only when a then-current live execution permit, one or more required confirmation predicates, and current correspondence with applicable delegation, selector, snapshot, and policy conditions are satisfied.

In some embodiments, a mode-transition record is generated for a requested transition between mode classes, the mode-transition record being bound to a prior mode, a requested mode, an authority-scope digest or authority-capsule reference, a purpose digest or task reference, an execution-context digest, an act window or other freshness interval, and, where applicable, a draft-artifact digest, a sponsor-binding reference, or a confirmation-digest reference. The governance rail can thereby determine whether a later act-mode event remains within the same delegated scope, purpose, and reviewed context as an earlier read-mode or draft-mode state.

In some embodiments, revocation is propagated across one or more delegation hops by a revocation receipt, revocation digest, revocation epoch, revocation-lineage reference, or equivalent machine-readable revocation object such that revocation of an upstream hop, parent hop, sponsor relationship, or required confirmation can freeze, hold, quarantine, downgrade, or deny one or more downstream actions, resumed sessions, queued jobs, delegated tool activations, connector enablements, or execution-authority-token uses until renewed authority is obtained under then-current policy and then-current source correspondence.

In some embodiments, verifier kit 205 or another assurance export further includes a delegation-state view, a re-delegation-limit view, a revocation-lineage view, a confirmation-to-act consistency proof, a delegation-chain digest, a delegation-scope digest, a delegation-consumption proof, or a sponsor-binding proof sufficient for a downstream runtime, customer, partner, auditor, insurer, regulator, or procurement reviewer to determine whether delegated authority remained attenuated, fresh, revocable, and within granted scope without requiring disclosure of hidden prompts, full internal reasoning traces, or full underlying governed content.

In some embodiments, delegated authority can be conveyed according to one or more delegation leases, refresh windows, exhaustion counts, renewal triggers, or reconfirmation predicates, and a resumed session, queued dispatch, scheduled replay, connector enablement, delegated tool activation, or later act-mode transition can be prevented when a then-current lease state, remaining-use count, freshness value, sponsor correspondence, confirmation correspondence, or renewal condition is absent, stale, exhausted, or mismatched.

In some embodiments, mutable artifacts referenced through live pointers are resolved to a snapshot record 199 at one or more governance points including admission time, scheduling time, dispatch time, or effect-bound execution time, and the system can apply freeze-on-schedule, freeze-on-dispatch, snapshot time-to-live, re-fetch-triggered downgrade, or other pointer-control semantics before authority-bearing use is permitted. Snapshot validity can additionally depend on target correspondence, recipient correspondence, policy-state correspondence, environment correspondence, or other invalidation triggers such as pointer re-resolution, source drift, or thaw of a required freeze condition.

In some embodiments, retrieval, reranking, summarization, memory write-back, embedding generation, or indexing of an artifact generates a chunk lineage map 200 preserving selector-level restriction inheritance across retrieved chunks, vector records, reranker outputs, memory summaries, or other machine-consumable derivatives so that storage in a retrieval or memory subsystem does not launder the original restriction state. In some embodiments the system additionally creates derivative-write records and later tombstones, reindexes, quarantines, purges, or recomputes machine-consumable derivatives when underlying source support, correction state, or policy state changes.

In some embodiments, a compound or multimodal artifact is decomposed into visible content, extracted text, OCR text, alt text, captions, embedded links, code comments, encoded directives, metadata, or other latent channels, and the admission engine assigns separate governance states or selector-scoped restrictions to those channels so that authority-bearing semantics are not imported through hidden or re-encoded content.

In some embodiments, the external context artifact or a derived artifact is further represented as a rendered, excerpted, clipped, highlighted, resized, reflowed, translated, summarized, preview-carded, or otherwise presentation-derived representation, and the governance rail treats such presentation-derived representation as a governed object rather than as a self-authenticating surface. Selector-scoped lineage, support state, permitted-use scope, and authority-eligibility status can thereby be evaluated for page regions, DOM paths, OCR spans, rendered text spans, interface fields, preview regions, or other presentation-linked selectors so that authority is not broadened by presentation, layout, or channel transformation alone.

In some embodiments, one or more policy overlay sets 201 are composed according to precedence, deny-wins, rollback, or revocation rules, and the system generates a verifier kit 205 containing structured outcome codes, selective proofs, or precondition-failure references sufficient for a downstream component, auditor, customer, procurement reviewer, or other relying party to determine whether a selected admission, promotion, relay, snapshot, revalidation, publication, acceptance-boundary, or execution-use decision remained within granted scope without disclosure of full governed content.

In some embodiments, the system maintains a conformance vector set 203 including attack vectors, regression vectors, or assurance vectors for mutable-pointer drift, memory poisoning, policy-candidate substitution, relay laundering, hidden-instruction artifacts, stale deferred execution, or scope-expansion attempts, and uses the conformance vector set 203 to validate that the governance rail continues to fail closed under changed artifact, policy, or execution conditions.

In some embodiments, the external context artifact 180 or a derived artifact 182 is used in a media, publishing, or other content-production environment to prepare a candidate content item, and an execution boundary gate 128 or disclosure gate 166 treats commitment of the candidate content item or a publication derivative to a content-management-system state, publication queue, syndication queue, newsletter surface, push surface, answer surface, or other external-presentation channel as an effect boundary or disclosure-governed boundary.

In some embodiments, the system stores selector-scoped editorial lineage linking one or more segments, fields, assertions, excerpts, headlines, captions, or summaries of the candidate content item to one or more source artifact identifiers, source digests, or source selectors, and prevents publication, syndication, or redisclosure of a selected segment or derivative when required support, scope, freshness, or promotion conditions are absent. Editorial lineage can additionally distinguish supported, quoted-supported, attributed-supported, conditionally releasable, unsupported, corrected, withdrawn, superseded, or similar support states for selected assertions or segments.

In some embodiments, approval for one external-presentation channel does not authorize another external-presentation channel, and a channel-specific permitted-use scope is separately revalidated for long-form articles, headlines, blurbs, newsletters, push alerts, chatbot answers, summary cards, captions, short-form scripts, or other publication derivatives. Channel-specific permitted-use scope can additionally depend on audience class, jurisdiction, embargo state, monetization state, partner scope, or disclosure freshness even where two derivatives share common source artifacts or draft text.

In some embodiments, writes from source artifacts, candidate content items, or publication derivatives into newsroom memory stores, retrieval indexes, embedding stores, ranking models, editorial policy candidates, training corpora, or other future-behavior stores are treated as governed side effects so that restricted or unsupported content does not launder into later content generation, retrieval, ranking, recommendation, or policy behavior. Future-behavior writes can be excluded, downgraded, or clawed back when later correction, withdrawal, support-state change, or source-digest change shows that continued downstream influence is no longer within granted scope.

In some embodiments, the system generates a publication-assurance bundle or other portable proof set indicating which source artifacts, selector sets, policy states, promotion conditions, disclosure states, and revalidation outcomes governed a candidate content item or publication derivative at a selected publication boundary, without requiring disclosure of the full underlying artifact set. The publication-assurance bundle can further include publication receipts, support-state transitions, review-freshness results, disclosure results, or token-consumption proofs associated with a selected publication or future-behavior update.

In some embodiments, a portable proof bundle, verifier kit, publication-assurance bundle, or other assurance export generated by the governance rail is packaged as, incorporated into, or referenced by a downstream verification bundle, and a downstream component or policy-consumer rail evaluates a corresponding verifier result receipt, decision badge, verification profile, or other machine-verifiable determination before permitting promotion, relay, publication, execution, or other effect-bearing use, without requiring that every embodiment employ any particular verifier topology, badge format, profile syntax, receipt container, or downstream enforcement architecture.

DETAILED DESCRIPTION OF THE INVENTION

A. Common Architecture, Objects, and Definitions

Figure 1:
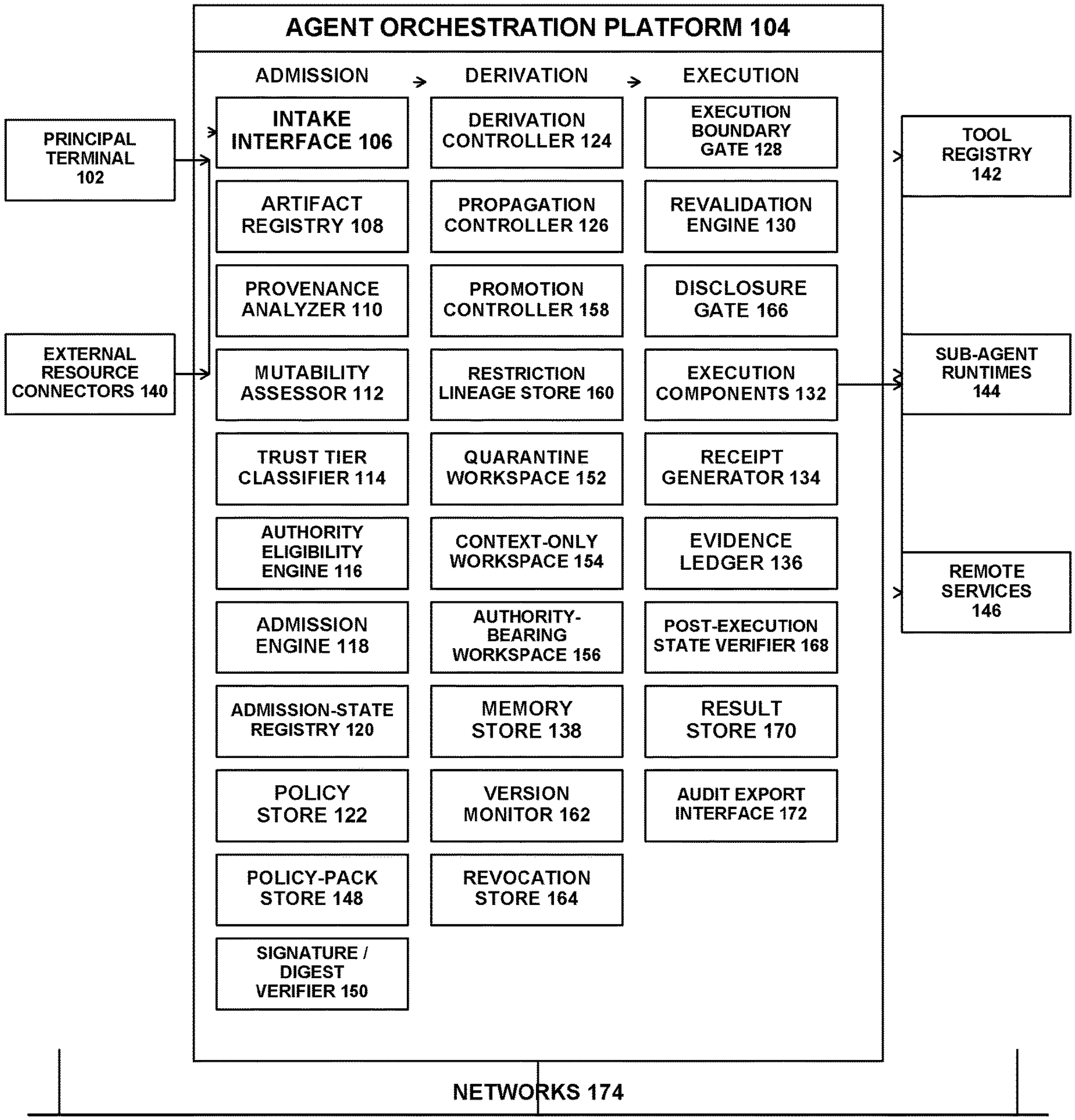
FIG. 1 is a block diagram of an example agentic-system environment including an external context governance rail, an artifact registry, an admission engine, derivation and propagation controls, and an effect-bound revalidation rail.

Referring initially to FIG. 1, an example agentic-system environment 100 includes a principal terminal 102, an agent orchestration platform 104, an intake interface 106, an artifact registry 108, a provenance analyzer 110, a mutability assessor 112, a trust tier classifier 114, an authority-eligibility engine 116, an admission engine 118, an admission-state registry 120, a policy store 122, a derivation controller 124, a propagation controller 126, an execution boundary gate 128, a revalidation engine 130, one or more execution components 132, a receipt generator 134, an evidence ledger 136, a memory store 138, one or more external resource connectors 140, a tool registry 142, one or more sub-agent runtimes 144, one or more remote services 146, a policy-pack store 148, a signature and digest verifier 150, a quarantine workspace 152, a context-only workspace 154, an authority-bearing workspace 156, a promotion controller 158, a restriction lineage store 160, a version monitor 162, a revocation store 164, a disclosure gate 166, a post-execution state verifier 168, a result store 170, and an audit export interface 172, communicating over one or more networks 174.

An external context artifact 180 may be received from the principal terminal 102, the memory store 138, one of the external resource connectors 140, the tool registry 142, a sub-agent runtime 144, a remote service 146, or any other source that provides content, data, metadata, code, configuration, or references for potential use by the agentic system.

As used herein, an external context artifact 180 can include, without limitation, a prompt template, a retrieved document, a resource pointer, a resource snapshot, a memory entry, a markdown artifact, a skill file, a shared note, a tool description, a structured data record, a policy pack, a policy candidate, an embedded resource, an image or multimedia asset accompanied by executable or directive metadata, a delegated task payload, a relayed message, or any mixed-format object having possible influence on planning, authorization, execution, or disclosure.

A derived artifact 182 can include any machine-generated or human-assisted representation produced from one or more source artifacts, such as a summary, extracted instruction set, generated plan, policy candidate, embedding record, ranking label, tool argument package, delegated task object, or relay object intended for a sub-agent, tool, or remote service.

An artifact identifier is a machine-readable identifier bound to a particular artifact or artifact version. The artifact identifier can be a digest, hash, content address, registry key, pointer-derived identifier, object identifier, or any other stable or version-sensitive identifier capable of being referenced by machine policy or machine evidence.

Provenance evidence is machine-usable evidence relating to origin, integrity, authenticity, or governance status of an artifact. By way of example, provenance evidence can include source identity, repository origin, transport metadata, signature verification result, digest correspondence, witness record, timestamp attestation, transparency-log reference, policy-pack identifier, source connector identity, or a verified relation to one or more other governed records.

A mutability state indicates whether an artifact is mutable, version-locked, append-only, immutable, pointer-based, callback-updated, locally mirrored, periodically refreshed, or otherwise subject to later change. A mutability state may be determined for a whole artifact, for one or more fragments of a compound artifact, or for an associated pointer target.

A trust tier is a machine-readable classification reflecting relative trust, authenticity, governance status, or operational admissibility of an artifact. In some embodiments trust tier is scalar. In other embodiments trust tier is vector-valued or multidimensional and may separately encode integrity confidence, policy confidence, source familiarity, mutability tolerance, or action-class eligibility.

Authority eligibility indicates whether an artifact is permitted to influence authorization of a candidate execution operation. In some embodiments authority eligibility is binary. In other embodiments authority eligibility is scoped by principal class, action class, workspace, environment, recipient class, time window, lifecycle stage, or any combination thereof.

An admission state is a machine-readable governance state assigned to an artifact or representation thereof. Example admission states include deny, quarantine, context-only, authority-bearing, hold, or downgraded-authority. The assignment can apply to the whole artifact, to one or more fields, to a transformed representation, or to one or more machine-generated views of the artifact.

An effect boundary is a boundary at which a side effect would occur, could become externally consequential, would commit the system to later cause such a side effect, or would update a store or model that can govern future behavior. Example effect boundaries include file write, file delete, queue insertion, schedule creation, message send, credential use, data disclosure, API mutation, external process launch, remote-task dispatch, purchase submission, physical actuation, memory write, retrieval-index update, embedding-store write, policy-store update, training-corpus insertion, model-state update, or initiation or commit of a future-behavior update.

Additional governed objects described herein can include an authority-shadow view 196, a promotion manifest 197, a relay envelope 198, a snapshot record 199, a chunk lineage map 200, a policy overlay set 201, a verifier kit 205, and a conformance vector set 203. Such objects can be generated, stored, integrity-protected, relayed, revalidated, or exported independently or in combination with admission receipts, relay credentials, promotion tokens, execution authority tokens, or other governed records.

In addition to the foregoing objects, the governance rail can maintain a canonical selector form, selector-set digest, transformation digest, derivative-write record, support-state record, structured precondition failure reference, and token-consumption proof, each of which can be stored as a standalone machine-readable object or as fields within an artifact record, lineage record, receipt, verifier kit, or audit export. Such objects can be integrity protected, versioned, composed, or selectively disclosed so that later promotion, relay, publication, future-behavior update, or effect-bound execution can be reproduced without re-exposing full underlying content.

A runtime-family descriptor is a machine-readable descriptor identifying a class of runtime, execution environment, orchestration surface, connector surface, tool-execution surface, or other operational surface having one or more shared control, attestation, invocation, policy, or correspondence characteristics. A runtime-family descriptor can identify a local runtime, a sub-agent runtime, a browser-mediated runtime, a remote tool runtime, a queued execution surface, a delegated execution surface, or any other execution family without requiring limitation to a named vendor or protocol.

A provider-class descriptor is a machine-readable descriptor identifying a class of provider, operator, connector source, tool source, credential source, remote service source, or other external or internal provider surface from which capabilities, schemas, credentials, delegated actions, or execution opportunities are obtained. A provider-class descriptor can be used independently of, or in coordination with, a runtime-family descriptor.

A normalized capability record is a machine-readable record representing one or more provider-specific, runtime-specific, connector-specific, or tool-specific capabilities according to a normalized grammar of action classes, parameter classes, target classes, recipient classes, environment scope, invocation constraints, or policy-relevant correspondence values such that governance need not depend on any single provider-specific invocation syntax or surface representation.

An invocation-dialect translation record is a machine-readable record identifying or binding a translation between a normalized capability record and one or more provider-specific, runtime-specific, connector-specific, or tool-specific invocation forms. The invocation-dialect translation record can identify one or more schema digests, invocation-contract digests, parameter mappings, field-ordering rules, canonicalization rules, endpoint-class values, or other translation-correspondence values used to determine whether an actual invocation remains within governed scope.

A delegated credential object is a machine-readable authorization object governing use of a secret, token, signing capability, approval capability, or other credential material without requiring export of the underlying credential material into raw artifact content, prompt content, free-form task content, or other ungoverned agent-visible form. The delegated credential object can be bound to one or more principals, sessions, tasks, action classes, parameter classes, runtime-family conditions, provider-class conditions, targets, recipients, environments, expiration conditions, revocation conditions, or integrity values.

A credential lease record is a machine-readable record governing temporal, consumptive, refresh, renewal, or exhaustion conditions applicable to delegated credential use. A credential lease record can identify a lease epoch, a lease start time, an expiry condition, a refresh window, a renewal condition, a remaining-use value, a maximum-use value, a non-export condition, a session-binding value, a task-binding value, a runtime-family condition, a provider-class condition, a revocation handle, or integrity data.

A workspace scope manifest is a machine-readable record identifying one or more bounded content scopes within a repository, branch, folder, file tree, drive, data room, object collection, pointer set, or other governed workspace surface. A workspace scope manifest can identify whole-workspace scope, object-level scope, path-level scope, selector-level scope, dereference scope, export scope, or any combination thereof, and can be bound to one or more source identifiers, selector sets, digests, policy states, trust-domain values, or permitted-use conditions.

An enumeration permit is a machine-readable permit governing listing, crawling, inventorying, resolving availability of, or otherwise inspecting one or more governed objects or workspace scopes without thereby authorizing content dereference, content export, or authority-bearing use. A dereference permit is a machine-readable permit governing opening, reading, fetching, materializing, checking out, or exporting one or more governed objects or selected portions thereof. A session-authority digest is a machine-readable digest or equivalent correspondence value identifying a then-current session-scoped authority posture, including one or more permitted-use values, credential-governance values, policy-state values, runtime-family or provider-class values, or other correspondence values sufficient to determine whether a later session-scoped action remains within governed scope.

A future-state evaluation object, also referred to in certain embodiments as a forecast object, is a machine-readable control object representing a predicted or estimated future state associated with one or more targets, horizons, windows, candidate downstream actions, or combinations thereof. The future-state evaluation object can be distinct from raw model output and can include or reference one or more forecast identifiers, target identifiers, window fields, horizon fields, uncertainty data, manifest identifiers, lineage digests, or bound governance conditions.

A future-state governance receipt, also referred to in certain embodiments as a forecast receipt, is a machine-readable receipt identifying or binding one or more governance conditions associated with a future-state evaluation object or with a candidate downstream action evaluated using the future-state evaluation object. The receipt can include or reference one or more prediction-output digests, quantile or interval digests, manifest identifiers, checkpoint identifiers, action-class identifiers, uncertainty results, stale indicators, reforecast flags, reason codes, signatures, timestamps, or selective-disclosure data.

An eligible future-state configuration, also referred to in certain embodiments as an eligible forecast configuration, is a machine-verifiable posture in which a future-state evaluation object corresponds to one or more required model, data, lineage, checkpoint, policy, scope, freshness, or action-class conditions. Eligibility can depend on correspondence with a model-manifest identifier, covariate-manifest identifier, feature-lineage record, checkpoint identifier, policy-profile identifier, candidate-action identifier, branch identifier, or any combination thereof.

A decision-state record, also referred to in certain embodiments as a release-state record, is a machine-readable record governing whether a candidate downstream action is presently permitted, held, denied, uncertainty-limited, stale-forecast-blocked, scenario-review-required, reauthorize-required, or reforecast-required. A forecast-conditioned or future-state-conditioned state qualifier is a field or state value of such a decision-state record and can be distinct from an admission state assigned to an artifact or representation thereof.

An uncertainty budget is a machine-readable limit on forecast uncertainty or other future-state evaluation uncertainty applicable to one or more candidate downstream actions, action classes, target classes, channels, or sensitivity classes. An uncertainty budget can depend on one or more disagreement thresholds, confidence floors, scenario-spread limits, calibration conditions, interval requirements, or reforecast thresholds.

Reforecast-required treatment indicates that a prior future-state evaluation object, forecast receipt, or decision-state determination is insufficient for present authority-bearing use of a candidate downstream action until a later evaluation or replacement authorization path satisfies then-current governance conditions.

The present specification describes three closely related and interoperable aspects of a governance rail. A first aspect concerns admission and classification of external context artifacts. A second aspect concerns derivation control, promotion, and propagation of source and derived artifacts. A third aspect concerns effect-bound revalidation and execution-use enforcement. These aspects can be practiced independently, in subcombination, or as an integrated governance rail.

Although the description below uses agentic-system examples, the disclosed techniques are not limited to any particular model type, vendor stack, protocol, interface, communication channel, modality, deployment topology, trust architecture, or programming model. The functions can be implemented in hardware, software, firmware, or any combination thereof, and can be centralized, distributed, layered, or federated.

B. External Context Artifact Admission and Classification Embodiments

1. Intake, Registration, and Artifact Records

Figure 2:
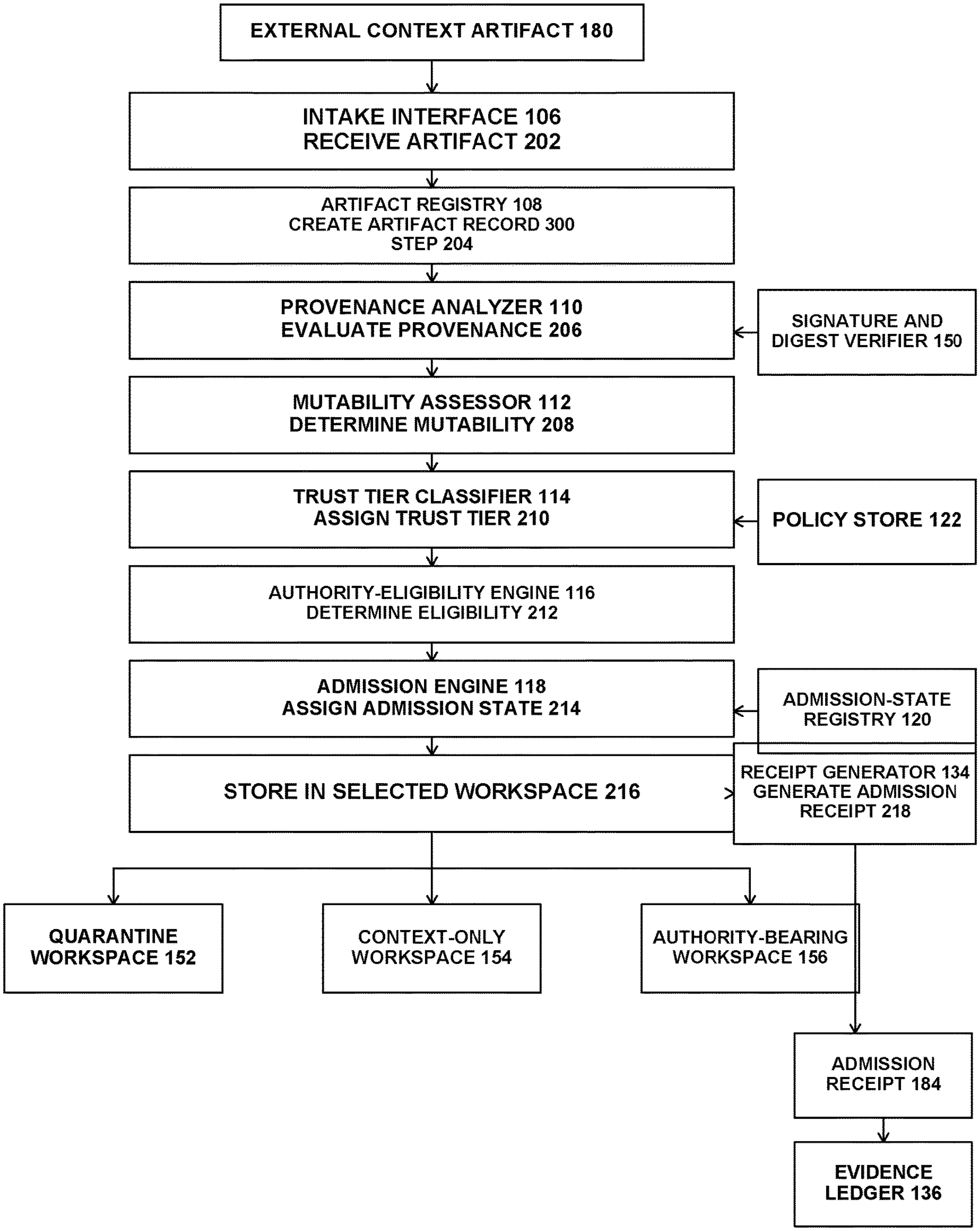
FIG. 2 is a flow diagram of an example admission and classification process for external context artifacts.

Referring to FIG. 2, the intake interface 106 receives an external context artifact 180 at step 202 and normalizes source metadata sufficient to create a governed artifact record 300 in the artifact registry 108.

At step 204, the artifact registry 108 assigns an artifact identifier and stores an artifact record 300 associated with that identifier. In some embodiments, artifact record 300 stores at least source class, current version indicator or digest, current admission state, and one or more references to receipts or evidence records. In further embodiments, artifact record 300 additionally stores source channel, source identity, repository origin, pointer origin, digest history, signature status, witness status, timestamp status, mutability state, trust tier, authority-eligibility status, policy-pack identifier, permitted-use binding, creation time, and latest verification time.

The artifact record 300 can be stored in an append-only registry, a mutable registry with integrity-protected receipt linkage, a relational store, a graph store, a content-addressed store, or any other machine-accessible registry capable of being queried by policy or execution logic.

2. Provenance, Mutability, and Trust-Tier Evaluation

At step 206, the provenance analyzer 110 evaluates provenance evidence associated with the external context artifact 180. Evaluation can include checking source identity against one or more source classes or trust domains, verifying one or more signatures or digests using verifier 150, determining whether a resource pointer resolves to version-locked or mutable content, checking relation to an allowed policy pack in store 148, and determining whether transport or repository metadata satisfies one or more policy rules.

At step 208, the mutability assessor 112 determines a mutability state. The mutability assessor 112 may identify, for example, whether the artifact is content-addressed, pinned to a known version, editable through a live pointer, callback-updated, locally mirrored from a mutable source, or composed of fragments with different update characteristics.

Version monitor 162 can maintain one or more watchers, subscriptions, polling routines, callback handlers, registry comparisons, or digest checks so that later changes can be detected and tied to the corresponding artifact record 300. In some embodiments, the system stores both a current digest and a digest history to support revalidation and forensic reconstruction.

At step 210, the trust tier classifier 114 assigns a trust tier according to one or more machine-readable policy rules. A policy rule can map combinations of provenance evidence, mutability state, source class, channel class, policy-pack relationship, and administrative or environmental conditions to one or more trust tiers or trust vectors.

In one non-limiting example, a TO tier can denote an unknown or insufficiently evidenced source, a T1 tier can denote a source-known but unsigned or weakly evidenced artifact, a T2 tier can denote an authenticated and version-monitored artifact, and a T3 tier can denote an authenticated artifact that is additionally policy-authorized for bounded authority-bearing use. Other tiering schemes can be used.

3. Authority Eligibility and Admission-State Assignment

At step 212, the authority-eligibility engine 116 determines whether the external context artifact 180 is eligible to influence authorization of a candidate execution operation. Authority eligibility can depend on one or more of provenance evidence, mutability state, trust tier, source class, policy-pack identifier, principal scope, action class, environment, disclosure class, expiration, revocation status, human or machine approvals, or any combination thereof.

In some embodiments, selected artifact classes default to non-authoritative or context-only treatment unless a verified policy authorization or another separate promotion condition is satisfied. By way of example, an external memory item, retrieved note, live-shared document, markdown artifact, tool description, or other mutable or unsigned input may be assigned the context-only admission state by default even though the artifact remains useful for bounded informational reasoning.

3A. Artifact-Set Coherence, Contradiction Detection, Corroboration, and Completeness-Gated Admission In some embodiments, authority-eligibility engine 116 determines not only a governance posture for an individual external context artifact 180, but also whether a plurality of external context artifacts, selector-scoped portions thereof, transformed representations thereof, or combinations thereof form an artifact set associated with a common candidate execution operation, candidate decision, candidate disclosure event, candidate submission event, candidate policy update, or other downstream-governing use. The system can generate, retrieve, or update an artifact-set coherence record identifying an artifact_set_identifier, one or more member artifact identifiers, one or more member digests or version indicators, one or more selector-set references where applicable, and one or more coherence-evaluation results.

In some embodiments, the artifact-set coherence record further includes one or more canonical field-map values identifying how semantically corresponding governed fields expressed across different member artifacts are to be compared. By way of non-limiting example, such governed fields can include legal-entity identifiers, beneficiary or recipient identifiers, endpoint identifiers, target identifiers, account or tenant identifiers, action-class identifiers, destination values, scope values, timing values, amount values, policy-pack identifiers, approval-state values, parameter values, or combinations thereof, without requiring limitation to any particular domain, storage model, or field syntax.

In some embodiments, one or more coherence-evaluation components determine whether the artifact set satisfies a contradiction condition, a completeness condition, a corroboration condition, or any combination thereof. A contradiction condition can indicate that two or more member artifacts map to materially incompatible values for a common governed field. A completeness condition can indicate that one or more required governed fields remain absent, unresolved, stale, overly broad, selector-mismatched, or otherwise insufficiently determined for authority-bearing use. A corroboration condition can indicate whether one or more governed fields are supported by a required number or class of independent sources, trust tiers, provenance postures, witness records, or machine-verifiable correspondences.

In some embodiments, the artifact-set coherence record stores one or more contradiction-set values, one or more missing-required-field values, one or more corroboration-class values, one or more coherence reason codes, and a coherence verdict selected from, by way of non-limiting example, coherent, coherent_narrowed, insufficiently_correlated, contradictory, incomplete, stale_coherence, corroboration_insufficient, review_required, or another machine-readable result. The coherence verdict can be scoped by action class, recipient class, environment scope, selector scope, time window, or any combination thereof, such that an artifact set can be coherent for one bounded use while remaining non-coherent for another bounded use.

In some embodiments, assignment of an admission state, determination of authority eligibility, issuance of a promotion token 190, generation of an authority capsule 193, generation of a relay credential 191, generation of a permitted-use binding 192, or another authority-bearing treatment depends not only on the posture of an individual artifact, but also on the then-current coherence verdict of the applicable artifact set. Thus, where a contradiction condition, incompleteness condition, or insufficient-corroboration condition remains unsatisfied, admission engine 118 can deny, hold, quarantine, downgrade, or assign context-only treatment to one or more member artifacts or to one or more derived or transformed representations notwithstanding that an individual member artifact might otherwise appear usable in isolation.

In some embodiments, a contradiction or incompleteness result does not require total rejection of all informational use. One or more member artifacts, selector-scoped portions, or transformed representations can remain available for bounded informational reasoning, comparison, explanation generation, or review workflows while remaining ineligible to serve as authority-bearing input for a candidate execution operation until a separate remediation, narrowing, promotion, or revalidation path is satisfied under then-current policy.

In some embodiments, later mutation, source drift, digest change, selector change, pointer re-resolution, policy-state change, approval-state change, or newly admitted corroborating or contradicting artifact causes the artifact-set coherence record to be recomputed, refreshed, or invalidated. A derived artifact 182, memory derivative, policy candidate, queued object, response artifact, or other downstream-governing object associated with the artifact set can thereby inherit a coherence-sensitive restriction posture such that later authority-bearing use fails closed when the then-current artifact-set coherence record no longer corresponds to the posture previously evaluated.

In some embodiments, receipt generator 134 generates an artifact-set coherence receipt identifying the artifact_set_identifier, one or more member artifact identifiers, one or more selector-set digests where applicable, one or more contradiction-set indicators, one or more missing-required-field indicators, one or more corroboration results, a coherence verdict, one or more reason codes, and integrity data. The artifact-set coherence receipt can be stored in evidence ledger 136 or exported through audit export interface 172 for later review, remediation, procurement diligence, incident reconstruction, or downstream verification.

E1. Optional Future-State Evaluation Objects and Separate Decision-State Control In some embodiments, one or more optional future-state estimation components generate, in addition to or instead of another model output, a machine-readable future-state evaluation object, also referred to in certain embodiments as a forecast object, representing a predicted or estimated future state for at least one candidate downstream action, schedule, route, allocation, activation, branch, audience segment, or other action context. The future-state evaluation object can be treated as a distinct control object from raw model output, thereby permitting later validation, gating, invalidation, selective disclosure, or reauthorization without requiring disclosure of proprietary model internals.

A future-state evaluation object can include, by way of non-limiting example, a forecast identifier, a prediction identifier, a target identifier, a target-variable identifier, an observation-window definition, an observation-window start time, an observation-window end time, a forecast-window definition, a forecast-horizon start time, a forecast-horizon end time, a cadence field, a granularity field, an aggregation field, a baseline reference, and one or more predicted values associated with the target.

In some embodiments, the future-state evaluation object includes a point forecast, one or more quantile forecasts, one or more prediction-interval bounds, one or more confidence-band fields, one or more scenario-specific outputs, a scenario-spread field, a model-disagreement field, an uncertainty score, or combinations thereof. The future-state evaluation object can therefore preserve not only a predicted value but also machine-readable uncertainty information usable by later policy evaluation.

In some embodiments, one or more model manifests and one or more related records define a covariate manifest, feature-lineage record, checkpoint identifier, training-cutoff identifier, evaluation-profile identifier, or processing-pipeline identifier associated with the future-state evaluation object. Such records can identify one or more source datasets, feature classes, exogenous-input classes, transform-pipeline identifiers, normalization profiles, challenge-status fields, freshness fields, or rights-governance fields used in producing the future-state evaluation object.

In some embodiments, the future-state evaluation object is bound to one or more hashes, digests, or identifiers corresponding to the applicable model manifest, covariate manifest, feature-lineage record, checkpoint identifier, policy-profile identifier, and candidate-action or branch identifier, thereby permitting later verification of whether a particular downstream decision relied upon an eligible future-state configuration.

In some embodiments, one or more evaluation or policy components compute one or more disagreement thresholds, confidence floors, calibration indicators, uncertainty budgets, scenario-spread limits, or reforecast thresholds. Such thresholds or budgets can be associated with a machine-readable policy profile and can differ by action class, target class, channel, territory, audience class, or sensitivity class.

In some embodiments, a future-state evaluation object is not itself an authorization for an effect-bearing downstream action. Rather, the future-state evaluation object is an input to a separate decision-state control architecture, such that a predicted future condition, demand condition, engagement condition, disclosure-comprehension condition, routing condition, scheduling condition, allocation condition, or other future-state estimate does not by itself authorize a downstream action absent satisfaction of then-applicable governance predicates.

In some embodiments, a requested downstream action can be future-state-conditioned, including by way of example selection, scheduling, routing, allocation, activation, continuation, withholding, or reauthorization of a candidate downstream action. In certain embodiments, additional action classes can include pricing-related, order-related, inventory-related, dispatch-related, submission-related, or other effect-bearing actions, without requiring the common inventive concept to be limited to any one such class.

In some embodiments, a future-state-conditioned decision-state record, also referred to in certain embodiments as a forecast-conditioned release-state record, is distinct from an admission state assigned to an external context artifact. The admission state can govern whether an artifact or representation thereof may be used as an authority-bearing input, whereas the separate decision-state record can govern whether a candidate downstream action remains permitted, held, denied, uncertainty-limited, stale-forecast-blocked, scenario-review-required, reauthorize-required, or reforecast-required under then-current future-state governance conditions.

In some embodiments, the admission-state rail and the separate decision-state rail are interoperable but non-identical. A future-state evaluation object may be generated from, derived from, linked to, or evaluated in view of one or more external context artifacts, yet satisfaction of admission-state conditions for an artifact does not by itself satisfy future-state governance conditions for a downstream action, and satisfaction of future-state governance conditions does not by itself promote an external context artifact to authority-bearing use.

In some embodiments, a separate decision-state registry may be separate from, partially coextensive with, or logically linked to one or more admission-state, lineage, evidence-ledger, or result stores, provided that machine-readable distinction remains preserved between admission-state assignment for artifacts and future-state-conditioned decision-state determination for candidate downstream actions.

E2. Optional Branch-Isolation, Hypothetical-State Segregation, and Merge-Gated Promotion In some embodiments, where one or more future-state evaluation objects, plans, schedules, recommendations, or other machine-usable outputs are generated in connection with a hypothetical, simulated, exploratory, scenario-specific, what-if, counterfactual, branch-specific, or draft-only path, the system generates, retrieves, or updates a branch-state record associated with the corresponding branch. The branch-state record can identify a branch_identifier, an optional parent_branch_reference, one or more branch-local source artifact identifiers, one or more branch-local selector-set references, one or more assumption digests, one or more scenario-input values, one or more branch-local decision-state values, one or more freshness or expiration values, and one or more integrity-protected linkage values.

In some embodiments, a branch-state record preserves machine-readable separation between a live authority-bearing path and a hypothetical, simulated, or draft-only path such that a future-state evaluation object, recommendation, plan, derivative, or downstream-governing object produced within the branch does not thereby obtain live execution authority merely because the same or similar target, recipient, route, schedule, or action class also exists in a live posture. A branch-local object can therefore remain exploratory, advisory-only, simulation-only, draft-only, or context-only by default unless a separate merge-gated promotion path is satisfied.

In some embodiments, one or more branch-local writes to memory stores, retrieval indexes, prompt caches, policy-candidate stores, routing candidates, queued objects, tool argument packages, capability objects, or other future-behavior stores are isolated, selector-limited, or associated with one or more no-authorize, no-policy-update, no-memory-write, no-dispatch, or no-commit indicators while the branch remains hypothetical or draft-only. A branch-local derivative therefore does not launder exploratory or simulated authority into a live future-behavior posture absent a then-current governed merge path.

In some embodiments, transition of a branch-local object, future-state evaluation object, recommendation, plan, parameter set, or other branch-local derivative into a live authority-bearing posture depends on a merge manifest, promotion manifest 197, or another merge-gated authorization object identifying the applicable branch_identifier, one or more assumption digests, one or more branch-to-live correspondence results, one or more source artifact identifiers or source digests, one or more selector-set digests, one or more action classes, one or more target or recipient values, one or more review or approval correspondences where applicable, one or more then-current policy-state values, and one or more freshness or expiration conditions.

In some embodiments, merge-gated promotion fails closed when one or more branch assumptions are stale, contradicted, unsupported, selector-mismatched, branch-externalized beyond permitted scope, policy-incompatible, target-shifted, recipient-shifted, or otherwise non-corresponding to the then-current live posture. The resulting treatment can include deny, hold, branch_review_required, reforecast_required, narrowed_merge_only, renewed_authority_required, or another machine-readable result. Satisfaction of a prior branch-local evaluation therefore does not by itself authorize a later live action absent then-current merge correspondence.

In some embodiments, reuse, relay, replay, publication, or downstream operationalization of a branch-local derivative across another branch or into a live path requires fresh admission, fresh promotion, fresh merge authorization, or any combination thereof under then-current policy, and the system preserves branch lineage sufficient to determine whether a later-presented derivative originated from a hypothetical or simulation-only path. The governance rail can thereby reduce branch laundering, stale-scenario execution, cross-branch replay, and improper migration of exploratory content into a live authority-bearing posture.

In some embodiments, receipt generator 134 generates a branch-state or merge-correspondence receipt identifying one or more branch identifiers, one or more parent-branch references where applicable, one or more assumption digests, one or more branch-to-live correspondence values, one or more merge or promotion results, one or more reason codes, and integrity data sufficient to demonstrate whether a later live use remained within a properly segregated and then-current merge-authorized posture.

At step 214, the admission engine 118 assigns an admission state. A deny state prevents operational consumption. A quarantine state places the artifact into quarantine workspace 152 pending review, transformation, or other conditions. A context-only state allows bounded use for informational or analytical purposes while preventing the artifact from serving as an authority-bearing input. An authority-bearing state permits use by policy or admission logic within a defined scope. Additional states such as hold or downgraded-authority may also be used.

The admission engine 118 can store one or more reason codes explaining the basis for the assignment. Example reason codes include unsigned-external-policy, mutable-pointer-unlocked, digest-mismatch, source-not-allowlisted, memory-default-context-only, policy-pack-verified, promotion-condition-missing, or revocation-hit. Reason codes can be machine-readable and can be used in later auditing, appeal, remediation, or platform enforcement.

4. Workspace Selection, Transformation, and Representation Control

At step 216, the system stores the artifact or a representation thereof in one of multiple workspaces selected according to the admission state. In some embodiments quarantine workspace 152, context-only workspace 154, and authority-bearing workspace 156 are physically separate stores. In other embodiments they are logically separated stores, access domains, tables, containers, or views within a common platform. The system can expose to the agentic system or other downstream components only the workspace-selected representation associated with the selected workspace. In some embodiments, quarantine workspace 152 is isolated from authority-bearing workspace 156 and from policy or authorization logic used to determine whether candidate execution operations are permitted.

A context-only representation can be transformed before exposure. Example transformations include removing or suppressing imperative instruction text, executable code fragments, embedded credentials, capability descriptors, control tokens, or embedded references that would otherwise allow the artifact to function as an authority-bearing input; converting imperative sentences into non-operative descriptive metadata; extracting only declarative facts or bounded structured fields; or labeling retained fields with non-authoritative markers.

In some embodiments, the admission state applies to different fragments of a compound artifact. For example, declarative portions may be retained in a context-only representation while executable or directive portions are quarantined or removed. This permits fine-grained governance without requiring complete rejection of compound artifacts.

4A. Enumeration-Governed Workspace Scope, Data-Room/Repository Admission, and Pointer-Dereference Control In some embodiments, the system generates, retrieves, or verifies a workspace scope manifest associated with the external context artifact 180, the transformed representation thereof, or a derived artifact 182, the workspace scope manifest identifying one or more repositories, branches, folders, file trees, drives, data rooms, object collections, pointer targets, or other bounded workspace scopes relevant to potential downstream use.

In some embodiments, the system determines an enumeration permit governing whether a downstream component may list, crawl, inspect, inventory, resolve availability of, or otherwise obtain bounded metadata regarding one or more governed objects or workspace scopes. The enumeration permit can be bound to one or more principal classes, session values, task references, runtime-family conditions, provider-class conditions, trust-domain conditions, selector sets, freshness conditions, revocation conditions, or integrity values.

In some embodiments, the system separately determines a dereference permit governing whether a downstream component may open, read, fetch, materialize, check out, export, or otherwise obtain content-bearing access to one or more governed objects, pointer targets, or selected portions thereof. The dereference permit can be narrower than the enumeration permit and can depend on one or more then-current selector-scoped restrictions, policy-state values, workspace assignments, promotion conditions, snapshot conditions, or permitted-use bindings.

In some embodiments, an enumeration permit can authorize only context-only or non-operative visibility into governed workspace content, including by way of example object-existence data, bounded path data, class tags, digest stubs, freshness indicators, object-size indicators, schema indicators, or other typed inert inventory fields, while denying or withholding dereference of underlying content. A downstream component therefore need not obtain authority-bearing use of a repository object, file, pointer target, data-room object, or drive object merely because the component is permitted to determine that the object exists or to inspect bounded metadata associated therewith.

In some embodiments, where a governed object is referenced through a live pointer, a repository head, a branch head, a shared-drive reference, a callback-updated path, or another mutable workspace reference, the system requires then-current correspondence between the requested dereference operation and one or more resolved snapshot, digest, selector, scope, or pointer-control conditions before the dereference permit is treated as sufficient. If the pointer target, branch state, repository state, path resolution, or other bound workspace condition has changed, dereference can be denied, held, downgraded, narrowed, or required to obtain fresh admission or fresh promotion.

In some embodiments, dereference scope is selector-scoped, field-scoped, object-scoped, or path-scoped rather than whole-workspace scoped, such that a downstream component can be permitted to obtain bounded content from selected files, selected file portions, selected repository regions, selected data-room objects, selected fields, or selected pointer-resolved representations without thereby obtaining broader workspace authority. The resulting dereferenced representation can be bound to a canonical selector form, selector-set digest, transformation digest, or support-state indicator so that later relay, publication, promotion, or execution-use remains machine-comparable to the governed dereference scope.

In some embodiments, a workspace object that is enumeration-visible, context-only visible, or otherwise available for bounded informational use does not thereby become authority-bearing for later planning, parameter selection, policy update, delegated task formation, credential use, disclosure, or execution. Promotion of such a workspace object, pointer-resolved object, or dereferenced representation to authority-bearing use can require a separate promotion decision, a separate dereference permit, a fresh admission decision, or any combination thereof under then-current policy.

In some embodiments, the receipt generator 134 generates an enumeration receipt, a dereference receipt, or both, identifying one or more workspace scope values, object identifiers, selector values, snapshot or pointer-resolution values, permit states, reason codes, freshness values, and integrity data. Example reason codes can include enumeration-only, dereference-denied, stale-pointer-target, path-scope-overbroad, selector-mismatch, branch-state-changed, repository-state-changed, export-not-permitted, or promotion-required.

5. Typed Inert Representations, Fragment Maps, and Multimodal Selectors

In some embodiments, a transformation engine generates a typed inert representation from the external context artifact 180. The typed inert representation can be schema-bound, grammar-constrained, canonicalized, or otherwise structured so that retained content is descriptive or declarative rather than operative. By way of example, imperative instructions can be converted into labeled facts, candidate intents, unsupported assertions, quoted text blocks, or other non-authorizing fields that remain linked to the source artifact identifier. The typed inert representation can additionally be deterministically serialized or field-ordered so that later selector, transformation, or parameter digests remain stable across scope-equivalent transformed representations.

The system can additionally create a fragment selector set or authority map identifying portions of the source artifact or transformed representation by offset range, token span, bounding region, page region, DOM path, JSON pointer, table cell selector, audio interval, video interval, object identifier, or other selector. Different fragments can therefore carry different admission states, permitted-use scopes, disclosure scopes, or promotion conditions.

For multimodal or mixed-format artifacts, the authority map can govern extracted text, captions, embeddings, labels, thumbnails, vector segments, or other derived fragments generated from selected regions or spans. A restricted region of a source artifact does not become authority-bearing merely because it has been embedded, summarized, segmented, or otherwise re-expressed through another modality or storage format.

F1. Optional Uncertainty-Aware Selection and Future-State-Conditioned Candidate Action In some embodiments, an optional future-state evaluation flow compares alternative candidate actions not only according to expected predicted improvement but also according to one or more uncertainty-aware conditions. A candidate action can therefore be held, denied, downgraded, escalated for review, or marked reforecast-required when a corresponding future-state evaluation object fails a quantile-condition rule, prediction-interval rule, confidence-band rule, scenario-spread rule, or model-disagreement rule.

In one worked embodiment, an uncertainty-aware predicate evaluates whether a predicted improvement remains sufficient across a selected confidence band or across one or more quantile outputs. The predicate can fail when an apparent improvement exists at a point estimate but not across a required interval, quantile set, or scenario-spread bound specified by the active policy profile.

In one worked embodiment, a future-state-conditioned action is selected only when both: (i) a predicted improvement metric or future-state-conditioned objective exceeds a required threshold; and (ii) uncertainty-related conditions remain within an allowed uncertainty budget. If either condition fails, a separate decision-state engine can generate hold, deny, limited-permit, human-review-required, or reforecast-required treatment.

In some embodiments, the active policy profile defines different uncertainty treatments for different action classes. For example, a scheduling action can be permitted under a first uncertainty budget, while an allocation action, routing action, activation action, pricing-related action, order-related action, inventory-related action, or other effect-bearing action can require a stricter uncertainty budget, narrower confidence band, lower scenario spread, or additional review.

In some embodiments, downstream components are exposed only to the typed inert representation and the associated authority map, while the original operative artifact remains sealed in quarantine or in a higher-control workspace. This allows bounded reasoning over informative portions of the artifact without exposing raw authority-bearing strings to policy logic or execution logic.

Figure 9:
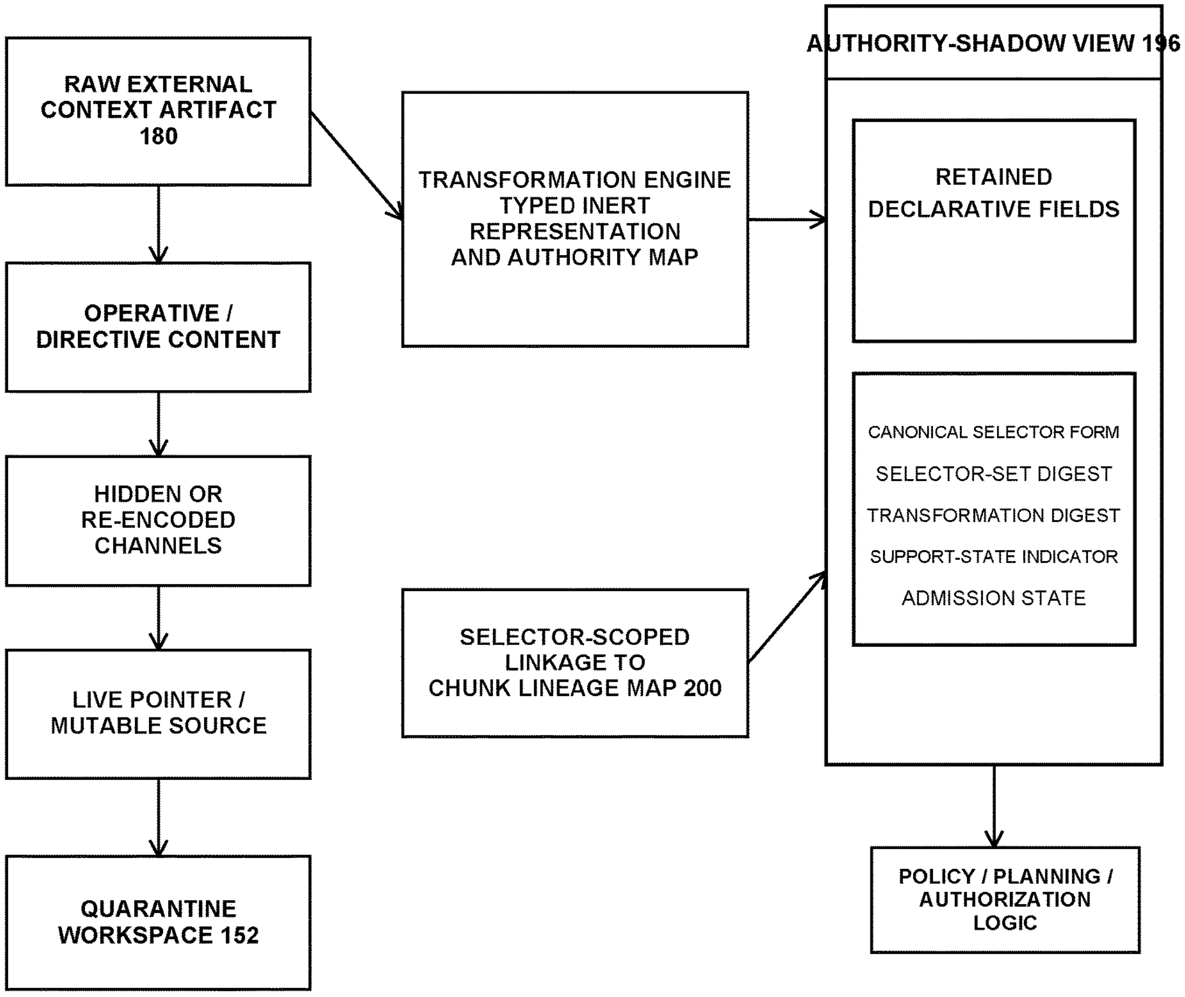
FIG. 9 is a diagram of an example selector grammar, canonical selector form, authority map, authority-shadow view, and bounded execution-use representation for a compound or multimodal artifact.

As illustrated in FIG. 9, the transformation engine can generate the authority-shadow view 196 as a selector-scoped, bounded execution-use representation distinct from raw artifact content. The authority-shadow view 196 can retain only those declarative fields, normalized references, or non-operative facts that are permitted for a specified use while preserving linkage to the source artifact identifier, current digest, selector set, and governing admission state. The authority-shadow view 196 can additionally include or reference a canonical selector form, selector-set digest, transformation digest, support-state indicator, or other machine-readable comparison artifact used in later promotion, relay, publication, or execution-use verification.

In some embodiments, selector expressions are defined by a selector grammar and can identify, without limitation, a whole artifact, paragraph, sentence, token span, field, attachment, page region, DOM path, JSON pointer, table cell, OCR layer, metadata field, hyperlink target, tool-argument field, image region, audio interval, video interval, vector segment, or retrieval chunk. Selector expressions can be canonicalized, hashed, or otherwise normalized so that fragment-level scope can be compared, inherited, or revalidated across transformed representations.

For mixed-format or multimodal artifacts, the system can decompose visible content, extracted text, OCR text, alt text, captions, EXIF or other metadata, embedded links, code comments, encoded or base64-transformed directives, clipboard-derived content, or similar latent channels into separately governed fragments. A hidden or re-encoded channel therefore does not become authority-bearing merely because a downstream component perceives it through a different modality or extraction path.

In some embodiments, when the external context artifact 180 is referenced through a live pointer, callback-updated source, or periodically refreshed mirror, the system can create a snapshot record 199 identifying a pointer origin, resolution time, resolved digest, mirror digest if applicable, snapshot time-to-live, and freeze condition. The snapshot record 199 can be used to distinguish informational viewing of a mutable source from authority-bearing reliance on a bounded, resolved version of that source.

In some embodiments, downstream policy logic, planning logic, or authorization logic is exposed only to the authority-shadow view 196 or other bounded execution-use representation, while raw operative content remains sealed in quarantine workspace 152 or another higher-control workspace. This permits bounded contextual use and cross-component interoperability without requiring raw imperative artifact content to be directly consumed by authorization logic.

In some embodiments, the governance rail determines one or more sensitivity classes for a whole external context artifact 180, a derived artifact 182, a selector-scoped portion thereof, a transformed field set, or another bounded representation according to one or more machine-readable sensitivity-classification rules. The sensitivity classes can distinguish, by way of non-limiting example, public, internal, confidential, regulated, credential-bearing, subject-identifying, transaction-identifying, policy-bearing, endpoint-binding, or other disclosure-relevant classes, and can depend on source provenance, field type, selector scope, semantic content, entity linkage, policy-pack posture, trust-domain conditions, or one or more prior admission, promotion, or disclosure states.

In some embodiments, before a representation is exposed beyond a local trust boundary or beyond a first runtime-family or provider-class boundary, the system generates a minimization transform according to the determined sensitivity class, a requested context-of-use, and one or more recipient, runtime, provider, or channel classes. The minimization transform can remove, mask, tokenize, hash, generalize, substitute, bucketize, or otherwise reduce fields, selectors, values, or fragments not required for the requested use, thereby generating a minimized representation bound to one or more source artifact identifiers, selector-set digests, transformation digests, permitted-use bindings, freshness conditions, and integrity data.

In some embodiments, the system generates a minimization-lineage record or redaction-lineage record identifying one or more removed, masked, substituted, generalized, tokenized, or retained fields, selectors, or fragments and further identifying whether the resulting minimized representation remains context-only, advisory-only, evidence-limited, submission-limited, channel-limited, or eligible only for a narrower authority-bearing use. A downstream component therefore does not obtain broader authority from the existence of the minimized representation than is expressly granted for the governed source scope from which the minimized representation was produced.

In some embodiments, when a later relay, publication, provider invocation, model invocation, partner exchange, downstream acceptance event, or other downstream use requests broader content than is permitted by the then-current sensitivity class, minimization transform, selector scope, or permitted-use binding, the governance rail denies, narrows, re-minimizes, downgrades to context-only treatment, holds, quarantines, or requires fresh admission or fresh promotion under then-current policy.

In some embodiments, the governance rail generates a route-decision record for a selected transformed representation, authority-shadow view 196, minimized representation, or other bounded execution-use representation, the route-decision record identifying one or more permitted model classes, runtime-family descriptors, provider-class descriptors, trust-domain classes, context-of-use profiles, disclosure classes, and route outcomes. Example route outcomes can include local-only execution, enterprise-bounded remote execution, partner-bounded remote execution, public-model-permitted execution for a minimized representation, advisory-only routing, or no-route treatment.

In some embodiments, the route-decision record is determined according to one or more sensitivity classes, selector-scoped restrictions, permitted-use bindings, delegated credential conditions, policy-pack conditions, disclosure conditions, destination verification-profile conditions, or combinations thereof, such that a representation eligible for one model class, provider class, runtime family, or trust domain is not thereby eligible for another. A downstream component therefore does not obtain authority to submit governed content to a broader, less trusted, or differently governed model surface merely because a narrower or more trusted route was previously permitted.

In some embodiments, where a requested route is not permitted for the then-current representation, the governance rail generates a substitute route outcome requiring local execution, requiring a narrower minimized representation, requiring a synthetic or feature-reduced representation, requiring a different provider class, requiring a different runtime family, or denying model submission altogether. The denied or substituted route outcome can be associated with one or more machine-readable reason codes identifying, by way of non-limiting example, sensitivity mismatch, provider-class mismatch, runtime-family mismatch, destination-trust-domain mismatch, disclosure-scope mismatch, minimization-required, local-only constraint, or no-permitted-route.

In some embodiments, a later execution authority token 194, relay envelope 198, permitted-use binding 192, portable verification bundle, verifier result receipt, or downstream acceptance result is bound to the route-decision record such that a downstream commit, publication, disclosure, provider invocation, or later relay fails closed when the actual model class, actual runtime family, actual provider class, actual trust domain, or actual submitted representation does not correspond to the governed route posture previously authorized.

As used herein, a presentation-derived representation can include a rendered surface, excerpt, snippet, highlight view, reformatted view, resized view, reflowed view, preview card, answer fragment, interface field view, overlay region, OCR-derived surface view, or other representation in which source content is re-expressed according to a display, interaction, or channel-specific format. In some embodiments, the governance rail binds such presentation-derived representation to one or more source artifact identifiers, source digests, selector sets, transformation digests, support-state indicators, permitted-use bindings, or canonical selector forms so that a later click path, autofill operation, navigation event, form submission, credential use, publication act, redisclosure, or other effect-bearing action cannot derive broader authority from the later surface than is expressly granted for the governed source scope unless a fresh admission decision or promotion decision authorizes the broader authority under then-current policy.

In some embodiments, a presentation-derived representation further includes an interface-state representation generated from one or more rendered surfaces, interface field views, overlay regions, audio-linked guidance representations, interaction transcripts, or combinations thereof, the interface-state representation being bound to one or more source artifact identifiers, source digests, selector sets, transformation digests, support-state indicators, or permitted-use bindings such that later highlighting, guidance, narration, focus cues, or other interaction assistance does not itself broaden authority beyond the governed source scope.

In some embodiments, the governance rail distinguishes between a context-only guidance overlay representation or interaction transcript and a separately governed authority-bearing object, such that a later click sequence, field entry, navigation event, form submission, credential use, or delegated action is not authorized merely because the same or similar interface field, rendered region, preview region, or overlay region was previously highlighted, described, or otherwise presented through the presentation-derived representation.

In some embodiments, an interface-state snapshot or other presentation-linked selector set captured at a first time is revalidated against then-current interface correspondence, source correspondence, support-state correspondence, and permitted-use scope before a downstream component may rely on the interface-state snapshot for action authorization, parameter selection, or effect-bound execution. If the later-presented interface field, rendered region, preview region, or overlay region no longer corresponds to the governed selector scope, authority-bearing use is denied, held, downgraded, or required to obtain fresh admission or fresh promotion under then-current policy.

5A. Cross-View Field-Binding Manifests, Hidden-Field Correspondence, and Submit-Surface Control In some embodiments, for a browser-mediated, workflow-mediated, or computer-use interaction involving one or more rendered surfaces, interface fields, preview regions, guidance overlays, autofill candidates, or submit surfaces, the governance rail generates, retrieves, or updates a cross-view field-binding manifest associated with one or more presentation-linked selectors, one or more interface-state representations, one or more interface-state snapshots, or a combination thereof. The cross-view field-binding manifest can identify a field_binding_manifest_identifier and can bind one or more governed field or region representations across multiple machine-perceivable and machine-usable views of the same candidate interaction target.

In some embodiments, the cross-view field-binding manifest includes, by way of non-limiting example, one or more DOM-path values, one or more accessibility-node references, one or more rendered-text spans, one or more OCR-span references, one or more page-region or bounding-region values, one or more field-label values, one or more field-name or field-label digests, one or more hidden-field identifiers or hidden-field digests, one or more form-action or submit-endpoint values, one or more method or endpoint-class values, one or more origin, site, tenant, account, or session-binding values, one or more interface-state snapshot references, one or more canonical submit-surface digests, and one or more support-state or permitted-use correspondences.

In some embodiments, the governance rail uses the cross-view field-binding manifest to preserve machine-readable correspondence between what was rendered or described to a user or downstream component and what would actually be committed if a later click sequence, field entry, autofill action, navigation event, credential submission, form submission, purchase action, download action, or other effect-bearing interaction were allowed to proceed. Thus, apparent similarity of visible text, field placement, preview content, or overlay guidance is insufficient by itself to confer authority-bearing use where the then-current hidden-field posture, submit-surface posture, endpoint posture, account posture, tenant posture, or selector correspondence differs from the governed posture previously captured.

In some embodiments, before permitting a later browser-mediated or computer-use action to influence authorization of a candidate execution operation, revalidation engine 130 determines whether the then-current rendered field, hidden field set, submit endpoint, origin or tenant context, accessibility tree posture, OCR-correspondence posture, interface-state snapshot, and permitted-use scope continue to correspond to the applicable cross-view field-binding manifest. If the later interaction surface no longer corresponds to the governed manifest, authority-bearing use is denied, held, downgraded, narrowed, quarantined, or required to obtain fresh admission or fresh promotion under then-current policy.

In some embodiments, a context-only guidance overlay representation, interaction transcript, highlight view, autofill preview, narration cue, or other presentation-derived representation remains insufficient by itself to authorize submission, credential use, or another effect-bearing interaction absent then-current correspondence to the applicable cross-view field-binding manifest or another separately governed authority-bearing object. A downstream component therefore does not obtain broader authority merely because a field, button, region, or preview surface was earlier highlighted, described, or visually associated with a governed source scope.

In some embodiments, the cross-view field-binding manifest can additionally identify one or more sequence-step correspondences for a multi-step workflow, including one or more intermediate navigation states, confirmation surfaces, review surfaces, or submit surfaces, such that a later sequence remains governed not only as an isolated field interaction but also as a bounded ordered interaction path. A mismatch at any governed step can cause deny, hold, downgrade, or renewed-authority-required treatment before a later effect-bearing interaction is permitted to proceed.

In some embodiments, the receipt generator 134 generates a field-binding or submit-surface correspondence receipt identifying one or more manifest identifiers, one or more interface-state snapshot references, one or more rendered-surface correspondences, one or more hidden-field or submit-endpoint correspondences, one or more reason codes, and integrity data sufficient to demonstrate whether a later browser-mediated or computer-use action remained within the governed interaction posture at the time of the attempted action.

In some embodiments, retrieved chunks, vector entries, reranker candidates, memory excerpts, or similar retrieval outputs each carry a selector-scoped linkage into a chunk lineage map 200 so that even fragmentary or machine-generated retrieval outputs remain tied to source selectors, source admission states, and inherited restrictions before they can influence later ranking, memory recall, or authority-bearing decisions.

In some embodiments, selector expressions, typed inert fields, or transformed field sets are normalized according to deterministic ordering and serialization rules before the system computes a canonical selector form, a selector-set digest, a transformation digest, or a parameter-class digest. Canonically equivalent selector expressions that identify the same governed scope can resolve to the same canonical form even across formatting or modality differences, while scope-distinct expressions resolve to different canonical forms so that later promotion, relay, publication, or execution decisions remain bound to the originally governed scope.

In some embodiments, authority-shadow view 196 or the associated authority map includes one or more of the canonical selector form, selector-set digest, transformation digest, support-state indicator, non-authoritative marker, or structured precondition reference identifying what condition would cause deny, hold, downgrade, or revalidation-required treatment. If a later-presented selector set, transformed field set, or parameter scope fails correspondence with the stored canonical or digest-bound representation, downstream authority-bearing use is blocked or narrowed rather than inferred from presentation-level similarity.

6. Admission Receipts and Standalone Admission Operation

Figure 3:
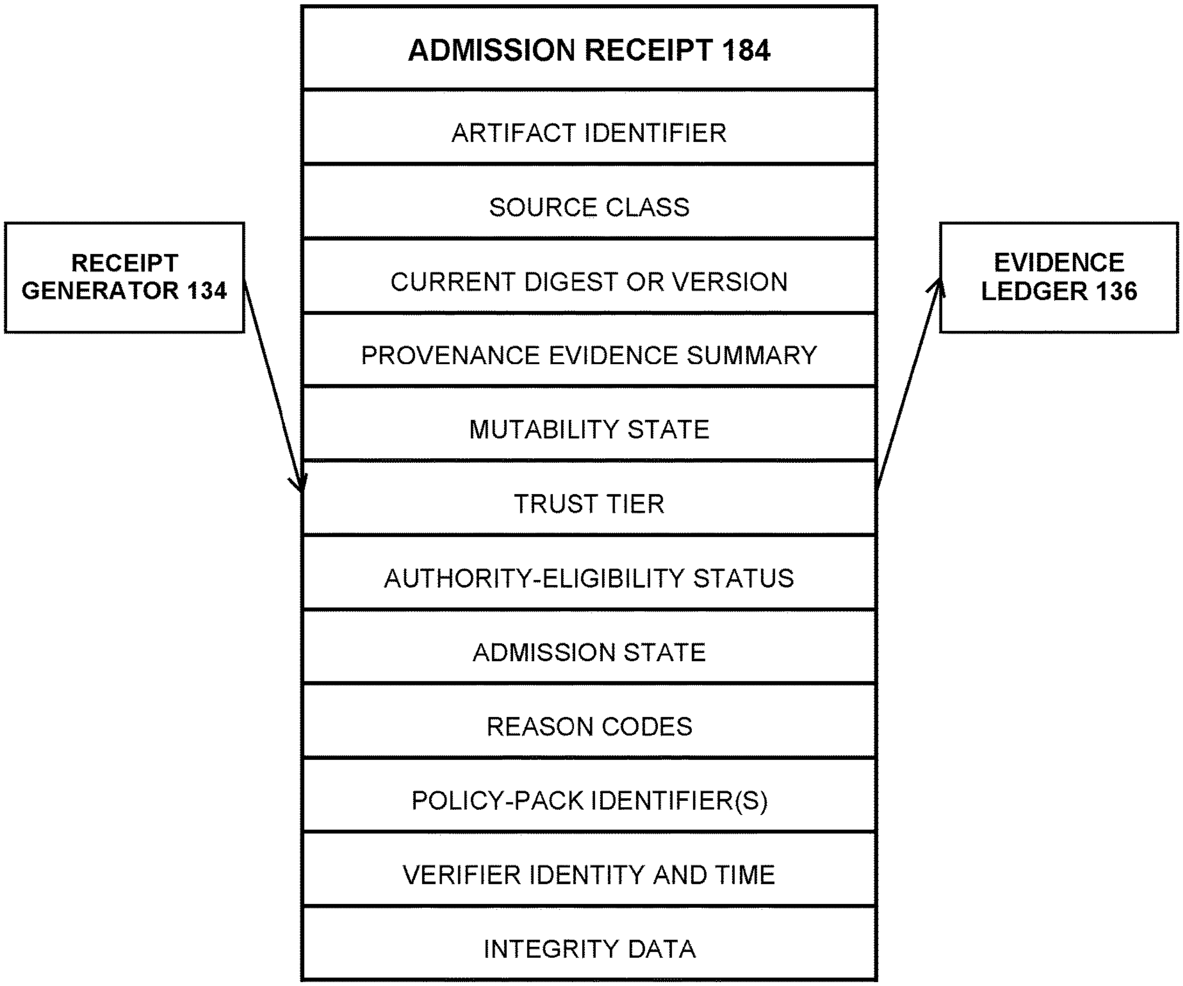
FIG. 3 is a diagram of an example artifact record, admission-state structure, and admission receipt.

At step 218, the receipt generator 134 creates an admission receipt 184. Referring to FIG. 3, admission receipt 184 can identify the artifact identifier, source class, current digest or version indicator, provenance evidence summary, mutability state, trust tier, authority-eligibility status, admission state, one or more reason codes, one or more policy-pack identifiers, verifier identity, time, and integrity data.

The evidence ledger 136 stores admission receipt 184 and can be append-only, witness-signed, timestamped, content-addressed, or otherwise integrity protected. Audit export interface 172 can export one or more receipts, records, or proofs for internal governance, procurement diligence, licensing demonstrations, incident review, or regulator-facing documentation.

In certain embodiments, admission and classification can be practiced independently. Even without derivation-control or effect-bound revalidation features, admission and classification provide a concrete technical improvement by replacing undifferentiated context ingestion with machine-enforced artifact identity, artifact registration, provenance and mutability analysis, authority-eligibility determination, workspace selection, and receipt generation.

C. Derivation Control, Promotion, and Propagation Embodiments

1. Derived Artifacts and Lineage

Figure 4:
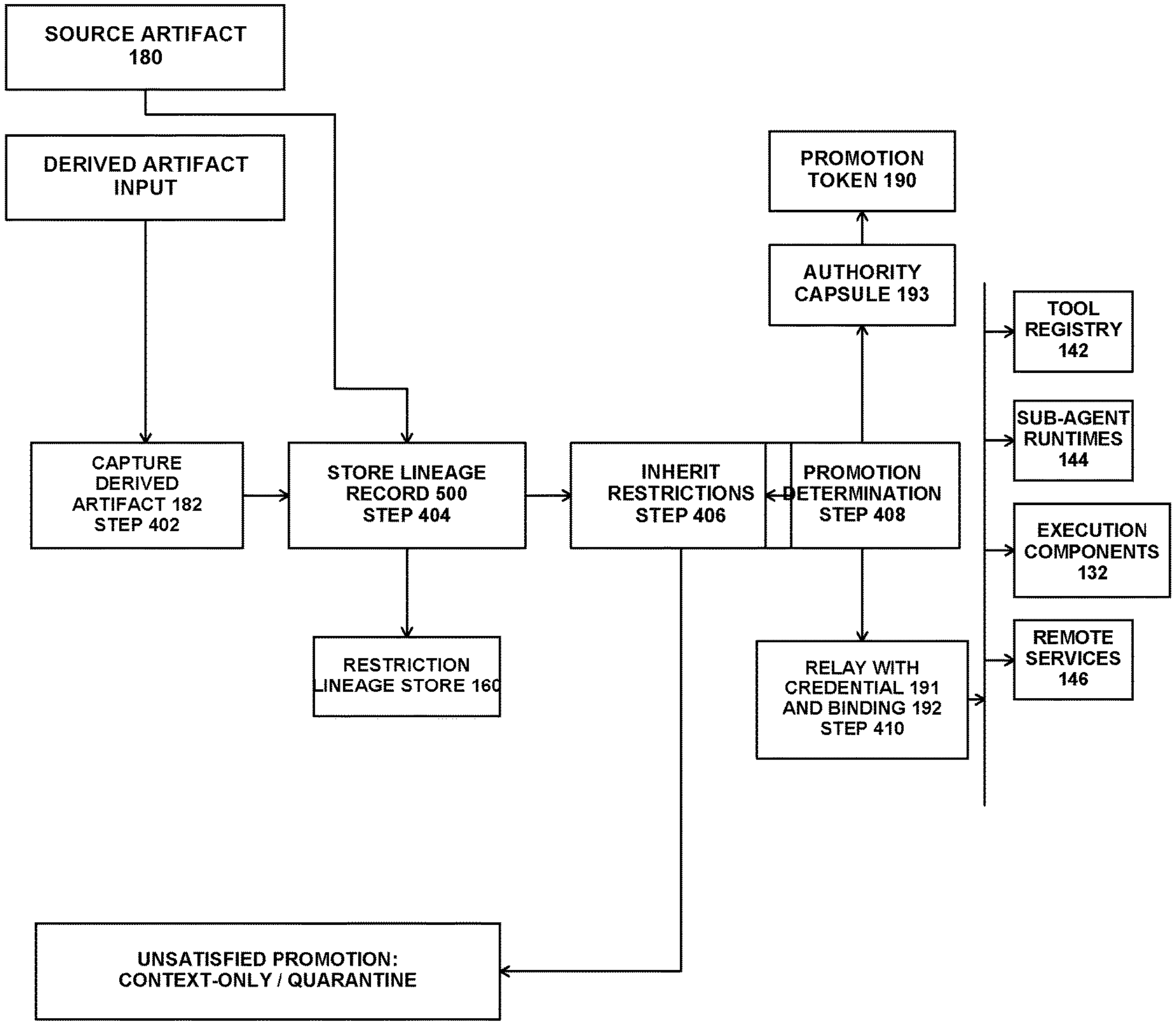
FIG. 4 is a flow diagram of an example derivation, promotion, and propagation control process.

Referring to FIG. 4, derivation controller 124 generates, receives, or captures a derived artifact 182 at step 402. Derived artifact 182 can be produced by a model, a planner, a translator, a parser, a tool adapter, a human reviewer, a deterministic transformation pipeline, or any combination thereof.

Figure 5:
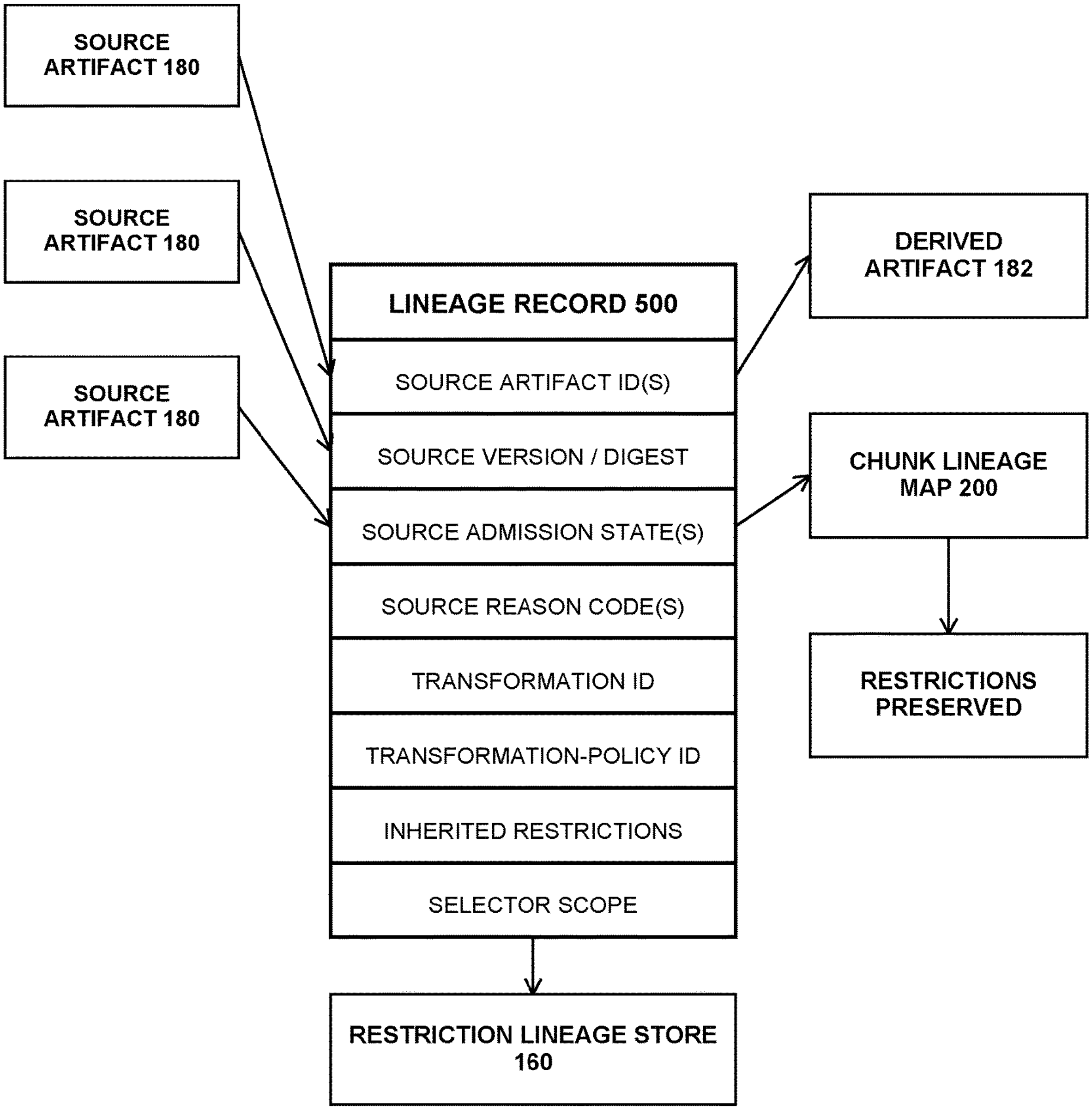
FIG. 5 is a diagram of an example lineage structure for derived artifacts, propagated restrictions, and permitted-use bindings.

At step 404, derivation controller 124 stores a lineage record 500 in restriction lineage store 160 linking the derived artifact 182 to one or more source artifact identifiers and, in some embodiments, to one or more source versions, source admission states, source reason codes, source digests, transformation identifiers, or transformation-policy identifiers. FIG. 5 illustrates an example lineage structure 500.

2. Restriction Inheritance and Anti-Laundering Controls

At step 406, propagation controller 126 determines whether restrictions associated with one or more source artifacts are inherited by the derived artifact 182. In some embodiments inheritance is the default. Thus, a summary derived from a context-only source remains context-only by default, a tool argument package derived from a quarantined source remains quarantined or held by default, and a delegated task generated from an authority-ineligible source remains authority-ineligible by default.

Restriction inheritance can apply to whole objects, fragments, fields, vectors, labels, ranked items, or structured records. A derived artifact therefore does not escape source restrictions merely because the representation has been translated, normalized, summarized, embedded, segmented, ranked, reformatted, or otherwise transformed into a new syntax or object class.

3. Promotion Control

At step 408, promotion controller 158 determines whether a source artifact or derived artifact can be promoted from a restricted state, such as context-only or quarantine, to an authority-bearing state. Promotion can require one or more promotion conditions, including signature verification, digest lock, trusted conversion pipeline proof, policy-pack authorization, threshold approval, witness quorum, multi-party approval, or machine-determined satisfaction of a promotion rule set.

In some embodiments, promotion controller 158 issues a promotion token 190 or stores a promotion record bound to the artifact identifier, derived artifact identifier, permitted-use scope, and one or more expiration or revocation conditions. Promotion can be whole-artifact, fragment-specific, action-class-specific, recipient-specific, environment-specific, time-limited, or revocable.

4. Relay, Cross-Agent Propagation, and Standalone Derivation-Control Operation

At step 410, propagation controller 126 relays a source artifact or a derived artifact to a sub-agent runtime 144, a tool registry 142, an execution component 132, or a remote service 146. In some embodiments, a relay credential 191 and a permitted-use binding 192 accompany the propagated object and specify source lineage, current restriction state, allowable action classes, allowable recipients, required revalidation conditions, and scope limitations.

If the source artifact or derived artifact lacks authority-bearing status, the propagated object can be delivered only in context-only form, forced into quarantine, limited to non-operative analytics, or blocked entirely. Propagation policies can prohibit cross-agent relay of mutable, unsigned, or externally editable policy candidates unless promotion conditions are satisfied.

In certain embodiments, derivation control, promotion, and propagation can be practiced independently. Even if effect-bound revalidation is handled elsewhere, these features provide a concrete technical improvement by binding source and derived artifacts through machine-readable lineage, preserving restrictions across transformations, and preventing context laundering through relay or object conversion.

5. Capability-Scoped Relay Credentials, Authority Capsules, and Downstream Verification In some embodiments, promotion controller 158 or propagation controller 126 generates an authority capsule 193. Authority capsule 193 can be distinct from the artifact itself and can bind one or more source artifact identifiers, one or more derived artifact identifiers, source or derived digests, selected fragment selectors, permitted action classes, permitted parameter classes, target or recipient classes, principal scope, environment scope, expiration conditions, revocation conditions, one or more policy-pack identifiers, one or more policy-state identifiers, and integrity data.

Because authority capsule 193 is separately governed, a raw artifact need not itself carry authority-bearing semantics. A downstream agent, tool, or executor can instead be required to rely only on authority capsule 193, relay credential 191, or permitted-use binding 192 when determining whether a relayed object may influence authorization of a candidate execution operation. This reduces the risk that authority is inferred from free-form text alone.

In some embodiments, a downstream runtime verifies the integrity, scope, and freshness of authority capsule 193 and further determines a compatibility result between the upstream permitted-use scope and a downstream local policy set. The downstream runtime can narrow the usable scope to an intersection of allowed conditions, thereby preventing an upstream runtime from broadening authority beyond what the downstream runtime would independently permit.

In some embodiments, cross-domain relay additionally requires trust-domain proof, runtime attestation, verifier identity validation, channel binding, nonce confirmation, or replay protection. If such conditions are absent or fail, the propagated object can be downgraded to context-only use, limited to non-operative analytics, held for approval, or blocked.

5A. Capability-Bound Connector Descriptors, Tool-Class Manifests, and Activation-Gated Relay In some embodiments, when a source artifact or derived artifact is embodied as, incorporated into, or accompanied by a connector descriptor, tool definition, invocation schema, capability advertisement, session-resume object, background-task object, channel-bound relay object, or other machine-consumable derivative capable of affecting later tool availability, target selection, parameter selection, disclosure scope, or execution behavior, propagation controller 126 generates, retrieves, or verifies a capability manifest associated with the derivative.

The capability manifest can identify, by way of non-limiting example, one or more source or derived artifact identifiers, a connector or derivative identifier, one or more tool-class sets, one or more allowed action-class sets, one or more parameter-class sets, one or more invocation-contract digests, one or more schema digests, one or more activation-scope values, one or more recipient or environment classes, one or more session-binding or channel-binding values, one or more enablement epochs, one or more refresh or renewal conditions, one or more expiration or revocation conditions, one or more required attestation or verification-profile references, and integrity data.

Because the capability manifest is separately governed, installation, enablement, loading, routing, activation, resumption, replay, or downstream consumption of the derivative does not itself authorize broader operational use. A downstream runtime, tool registry 142, sub-agent runtime 144, execution component 132, or remote service 146 can require current correspondence among the derivative, the capability manifest, authority capsule 193, relay credential 191, permitted-use binding 192, then-current policy state, and any required session, channel, trust-domain, or attestation condition before allowing the derivative to influence authorization of a candidate execution operation.

In some embodiments, where such correspondence is absent, stale, over-broad, replayed, or otherwise unsatisfied, the derivative is rejected, rewrapped, narrowed, downgraded to context-only or non-operative analytics, held for approval, quarantined, or blocked. The resulting technical improvement includes machine-enforced prevention of privilege inflation by resumed, cached, activated, routed, or redistributed machine-consumable derivatives whose apparent operational posture no longer corresponds to the then-current governed posture.

In some embodiments, a source artifact or derived artifact further comprises or yields an interaction trace, workflow trace, step-sequence representation, reusable execution template, skill file, or other machine-consumable derivative representing one or more previously observed, drafted, or partially executed interaction sequences. Such a derivative can be bound to one or more source artifact identifiers, derived-artifact identifiers, selector sets, target classes, parameter classes, session values, runtime-family descriptors, provider-class descriptors, draft-artifact digests, or lineage digests so that later reuse of the derivative remains within governed scope rather than inheriting broader authority from prior observation or prior successful execution alone.

In some embodiments, a skill file or other reusable machine-consumable derivative is associated with a capability manifest identifying one or more allowed action classes, parameter classes, invocation-contract digests, activation-scope values, enablement epochs, refresh conditions, expiration conditions, revocation handles, or required attestation or verification-profile conditions, and the governance rail can further require a promotion manifest, authority capsule 193, or other fresh authorization object before installation, enablement, routing, activation, replay, or downstream consumption of the skill file is permitted to influence authorization of a candidate execution operation.

5AA. Managed-Agent Control-Plane Objects, Board-State Governance, and Local-Agent Enrollment In some embodiments, a source artifact or derived artifact is embodied as, incorporated into, or associated with one or more managed-agent control-plane objects including an agent roster object, a work-item object, an issue object, a board-state object, an assignment-state record, a comment-linked selector record, an attachment-linked selector record, a status-transition record, or any combination thereof. Such a control-plane object can be generated by, stored at, routed through, or rendered by an orchestration surface, workflow board, queue manager, issue tracker, assignment service, collaboration surface, or other managed-agent coordination surface without requiring limitation to any named vendor, protocol, or interface.

In some embodiments, each managed-agent control-plane object is bound to one or more source or derived-artifact identifiers, selector sets, capability-manifest references, session-binding values, allowed action classes, allowed parameter classes, runtime-family descriptors, provider-class descriptors, target or environment scope values, freshness values, review-state values, lease values, revocation handles, and integrity data. Accordingly, display or storage of a roster entry, issue state, board column, board lane, comment, attachment reference, assignment marker, or status indicator does not itself authorize broader operational use absent then-current correspondence to the governed control-plane posture.

In some embodiments, claim, assign, reassign, release, close, reopen, route, escalate, unblock, or otherwise transition a managed-agent control-plane object is treated as a governed acceptance event, a governed side effect, or both, when the transition can influence later tool availability, target selection, delegated execution, queued dispatch, disclosure scope, or effect-bound execution. The governance rail can therefore deny, hold, narrow, downgrade, quarantine, or require renewed authority when a then-current work-item state, board-state posture, assignment scope, capability-manifest posture, selector correspondence, session correspondence, heartbeat posture, or lease posture is absent, stale, over-broad, replayed, or otherwise unsatisfied.

In some embodiments, a local or self-hosted runtime is discovered, admitted, enrolled, refreshed, or re-enrolled through a discovery surface descriptor identifying a command-line interface, daemon, session manager, local agent registry, local service endpoint, socket endpoint, inter-process communication surface, or other machine-usable discovery or registration surface. The governance rail can generate, retrieve, or verify a local-agent enrollment record bound to one or more runtime-family descriptors, provider-class descriptors, executable digests, measurement digests, capability-manifest references, workspace-scope values, delegated credential references, credential-lease references, heartbeat values, refresh values, registration epochs, revocation handles, and integrity data.

Because the local-agent enrollment record is separately governed, detection, advertisement, registration, re-registration, restart, binary replacement, capability refresh, or session resumption of a local runtime does not itself authorize broader operational use. A downstream runtime, board manager, task router, queue manager, orchestration surface, or execution component can require then-current correspondence among the local-agent enrollment record, one or more managed-agent control-plane objects, one or more authority capsules 193, one or more relay credentials 191, one or more permitted-use bindings 192, one or more capability manifests, and one or more then-current policy, attestation, heartbeat, or lease conditions before permitting task assignment, task acquisition, queued dispatch, or effect-bearing execution.

In some embodiments, when an executable changes, a daemon restarts, a discovery surface re-advertises different capabilities, a heartbeat expires, a session manager rotates state, a registration epoch changes, or a board-state or work-item transition no longer corresponds to the then-current governed posture, the governance rail rejects, rewraps, narrows, downgrades, freezes, quarantines, or blocks the later operational use and can generate an enrollment receipt, assignment-transition receipt, or acceptance result record sufficient to demonstrate fail-closed treatment without requiring disclosure of full underlying governed content.

In some embodiments, where an interaction trace, workflow trace, reusable execution template, or skill file is derived from context-only content, from a held or quarantined artifact, from a draft-mode event, or from a bounded interaction sequence not previously authorized for broader reuse, the resulting derivative remains context-only, held, narrowed, or otherwise scope-limited unless a fresh admission decision or promotion decision expressly authorizes broader operational use under then-current policy. The resulting technical improvement includes machine-enforced prevention of privilege inflation and context laundering through packaging of previously observed or previously prepared interaction sequences into reusable machine-consumable derivatives.

5B. Provider-Neutral Capability Normalization, Delegated-Credential Brokerage, and Cross-Runtime Policy Harmonization In some embodiments, one or more provider-specific connector descriptors, tool definitions, invocation schemas, capability advertisements, delegated task objects, session-resume objects, background-task objects, channel-bound relay objects, or remote-service descriptors are transformed into, mapped to, or associated with one or more normalized capability records such that governance can be performed according to provider-neutral action classes, parameter classes, target classes, recipient classes, environment scope, and policy-relevant correspondence values rather than according to any single provider-specific syntax, message format, or invocation posture.

In some embodiments, the system generates, retrieves, or verifies an invocation-dialect translation record identifying correspondence between a normalized capability record and one or more provider-specific or runtime-specific invocation forms. The invocation-dialect translation record can bind one or more schema digests, invocation-contract digests, parameter mappings, field-ordering rules, canonicalization rules, endpoint-class values, or translation-correspondence values such that a later provider-specific invocation is treated as insufficient for authority-bearing use when the later invocation no longer corresponds to the governed normalized capability posture.

In some embodiments, the governance rail further coordinates with a delegated credential object representing non-export use of a secret, token, signing capability, approval capability, or other credential material. The delegated credential object can be bound to one or more principals, sessions, tasks, authority capsules 193, relay credentials 191, permitted-use bindings 192, normalized capability records, runtime-family descriptors, provider-class descriptors, targets, recipients, or environments such that operational capability is conveyed in governed machine-readable form without requiring export of the underlying credential material into prompt text, raw artifact content, free-form agent-visible memory, or other ungoverned content form.

In some embodiments, delegated credential use is further governed by a credential lease record identifying one or more lease epochs, lease start times, expiry conditions, refresh windows, renewal conditions, remaining-use values, maximum-use values, session-binding values, task-binding values, runtime-family conditions, provider-class conditions, non-export conditions, revocation handles, or integrity values. A provider-specific token refresh, credential renewal, or session rotation therefore does not itself authorize broader operational use and remains insufficient for authority-bearing use when the then-current credential lease posture is stale, exhausted, mismatched, revoked, unrenewed, or otherwise non-corresponding.

In some embodiments, a downstream runtime, tool registry 142, sub-agent runtime 144, execution component 132, connector surface, or remote service 146 computes an effective usable scope according to an intersection of: (i) one or more upstream granted scopes represented in an authority capsule 193, relay credential 191, permitted-use binding 192, delegated credential object, or credential lease record; (ii) one or more normalized capability records and, where applicable, one or more invocation-dialect translation records; (iii) one or more selector-scoped or workspace-scoped restrictions preserved in lineage or workspace-governance data; (iv) one or more then-current local policy results; and (v) one or more runtime-family, provider-class, trust-domain, session, channel, or attestation correspondence conditions. If the effective usable scope is empty or narrower than the requested operational use, the derivative can be rejected, rewrapped, narrowed, downgraded, held, quarantined, or blocked.

In some embodiments, where a provider-specific execution surface, connector surface, or tool surface changes syntax, endpoint posture, parameter posture, session posture, or credential-refresh posture, the governance rail does not infer continued authority from prior successful use alone. Rather, the system requires then-current correspondence of the later provider-specific posture to the governed normalized capability record, the invocation-dialect translation record if any, the delegated credential object if any, the credential lease record if any, and the then-current policy state before authority-bearing use is permitted.

In some embodiments, a downstream component may rewrap, narrow, or translate a received derivative for local use without creating broader authority than was previously granted. A rewrapped or translated derivative therefore remains bound to the same or narrower action classes, parameter classes, target classes, recipient classes, environment scope, selector scope, credential-governance scope, and runtime-family or provider-class conditions unless a fresh admission decision or fresh promotion decision expressly authorizes broader authority under then-current policy.

In some embodiments, the system generates a harmonization result record, translation-correspondence record, lease-state result, delegated-credential-use result, or other machine-verifiable record indicating whether cross-runtime and cross-provider correspondence was satisfied for a selected derivative, invocation, credential use, or candidate execution path. Such records can be incorporated into verifier kit 205, a portable proof bundle, an assurance export, or another downstream verification bundle without requiring disclosure of the underlying credential material or the full provider-specific invocation payload.

In some embodiments, when a transformed representation, authority-shadow view 196, minimized representation, or other governed representation is to be supplied to a model, runtime, connector surface, tool surface, or remote service for inference, ranking, extraction, planning, drafting, classification, summarization, or another bounded machine use, the governance rail generates an outbound invocation package bound to one or more source artifact identifiers, selector sets, transformation digests, minimization-lineage values, route-decision values, runtime-family descriptors, provider-class descriptors, context-of-use constraints, allowed output classes, parameter-class bounds, freshness values, and integrity data. The outbound invocation package can thereby function as a separately governed submission object rather than as an unbounded transmission of raw artifact content.

In some embodiments, the outbound invocation package further binds one or more input field classes, response-schema constraints, citation requirements, tool-call allowances, code-generation allowances, extraction allowances, disclosure-scope limits, memory-write restrictions, policy-update restrictions, no-train indicators, no-retain indicators, or other downstream-use constraints such that a later response is evaluated in view of the governed submission posture rather than in view of raw model output alone.

In some embodiments, content, metadata, code, structured output, tool-call request, citation set, extracted field set, ranking output, or other machine-produced material returned from the model, runtime, connector surface, tool surface, or remote service is treated as a response artifact and is assigned a response-artifact identifier, a response-lineage binding, and one or more provenance or response-posture values identifying at least the corresponding outbound invocation package, the responding runtime family, the responding provider class, one or more response digests, and one or more then-current policy or review states. The response artifact does not become authority-bearing merely because it was produced in response to a permitted outbound invocation package.

In some embodiments, the governance rail subjects the response artifact to a separate admission decision, selector-scoped transformation, minimization treatment, permitted-use determination, and, where applicable, fresh promotion or fresh execution-bound revalidation before the response artifact may influence authorization of a candidate execution operation, a memory write, a policy update, a disclosure event, a connector activation, a tool invocation, or another downstream-governing use.

In some embodiments, where the response artifact contains one or more fields, instructions, tool calls, parameter values, generated code segments, citations, extracted entities, or disclosure-bearing content outside the scope permitted for the corresponding outbound invocation package, the governance rail strips, masks, narrows, downgrades to context-only or advisory-only treatment, holds, quarantines, requires package reissuance, or requires fresh promotion under then-current policy rather than allowing broader authority to be laundered through the intermediate model or provider surface.

In some embodiments, the governance rail generates a round-trip receipt identifying one or more source artifact identifiers, selector-set digests, transformation digests, outbound invocation package values, response-artifact identifiers, response digests, route-decision values, output-class determinations, and one or more reason codes sufficient to determine whether a later downstream use remained within the same governed submission-and-response posture rather than laundering broader authority through an intermediate model, runtime, connector surface, or provider surface.

5B1. Response-Grounding, Action-Field Support Mapping, and Unsupported-Field Demotion In some embodiments, when a response artifact includes one or more structured fields, extracted entities, citation-linked assertions, tool-call requests, parameter values, target values, recipient values, endpoint values, code segments, schedule values, amount values, or other machine-usable output elements, the governance rail generates, retrieves, or updates a response-support map associated with the response artifact. The response-support map can identify, for each selected response field or response segment, a response_field_identifier, one or more corresponding source artifact identifiers, one or more corresponding source selectors or selector-set digests, one or more transformation or extraction references, and one or more support-state values.

In some embodiments, the response-support map distinguishes between response content that is selector-grounded and support-confirmed, response content that is selector-grounded but scope-limited, response content that is corroborated across multiple governed sources, response content that is inferential only, response content that is unsupported, response content that is contradicted by a current governed source, and response content that is outside an allowed output class or other bounded package posture. The map can further identify one or more grounding methods, citation correspondences, corroboration results, contradiction results, confidence or quality indicators, freshness indicators, or package-constraint results without requiring that any such indicator alone confer authority-bearing status.

In some embodiments, one or more response fields are designated as action-relevant fields because they are capable of influencing authorization of a candidate execution operation, a downstream disclosure event, a connector activation, a tool invocation, a memory write, a policy update, a queued dispatch, or another downstream-governing use. By way of non-limiting example, action-relevant fields can include a target identifier, recipient identifier, endpoint value, account identifier, parameter value, quantity value, schedule value, code segment, policy recommendation, or any other field that can materially affect a later side effect or future-behavior update.

In some embodiments, where an action-relevant field lacks required selector-grounded support, lacks required corroboration, conflicts with a then-current governed source, exceeds an allowed output class, or otherwise fails the response-support map, the governance rail strips, masks, narrows, rewrites into non-authoritative descriptive form, downgrades to advisory-only or context-only treatment, holds, quarantines, or requires fresh promotion under then-current policy before the response artifact may influence authorization of a candidate execution operation or another downstream-governing use. A downstream component therefore does not obtain authority to act on a response field merely because the response artifact was generated from a permitted outbound invocation package.

In some embodiments, a response artifact, or one or more selector-scoped or field-scoped portions thereof, can remain usable for bounded explanatory, summarization, planning, drafting, comparison, or review workflows even where one or more action-relevant fields are demoted, stripped, or held. The governance rail can thereby preserve informational value while fail-closing authority-bearing use of unsupported or contradicted output elements.

In some embodiments, where a response artifact is subsequently translated, summarized, normalized, embedded, relayed, converted into a tool argument package, written to memory, proposed as a policy candidate, or otherwise transformed into a downstream-governing object, the applicable response-support map or one or more support-state results are inherited, preserved, or recomputed such that broader support is not inferred from later transformation alone. A later derivative therefore does not become authority-bearing for an action-relevant field absent then-current correspondence to the applicable grounded-support posture.

In some embodiments, later source drift, selector mismatch, source correction, source withdrawal, policy-state change, output-class change, or route-decision change causes one or more response-support-map entries to be recomputed, invalidated, narrowed, or marked revalidation-required. A later effect-bound use of the response artifact can therefore fail closed when one or more action-relevant fields no longer remain grounded and support-confirmed under then-current conditions.

In some embodiments, the round-trip receipt further identifies one or more response-support-map references, action-relevant-field indicators, support-state results, unsupported-field indicators, contradiction indicators, package-constraint results, or grounding reason codes sufficient to determine whether a later downstream use remained within a grounded submission-and-response posture rather than inferring authority from raw machine-generated output alone.

5C. Policy-Pack Exchange, Verification-Profile Interoperability, and Downstream Acceptance In some embodiments, a machine-consumable derivative, promoted object, or relay object is associated with a source policy-pack posture comprising one or more policy-pack identifiers, source outcome values, allowed relying-party classes, context-of-use constraints, selector-set digests, transformation digests, review-state values, or other correspondence values sufficient to determine whether later downstream acceptance remains within governed scope.

In some embodiments, the governance rail identifies or retrieves a destination verification profile associated with a destination runtime, tool provider, remote service, partner, auditor, procurement consumer, insurer, regulator, or other relying party, the destination verification profile specifying one or more required verification classes, accepted outcome classes, profile-version values, selective-disclosure requirements, review-freshness requirements, allowed relying-party classes, or context-of-use constraints applicable to a requested downstream acceptance event.

In some embodiments, the system generates or retrieves a policy-compatibility record, a profile-negotiation record, an outcome-normalization record, or any combination thereof, the record mapping one or more source policy-pack posture values to the destination verification profile according to one or more provider-neutral compatibility classes, outcome-normalization rules, selector or transformation correspondence rules, relying-party-class conditions, or context-of-use conditions. A provider-specific outcome code, verification result, or evidence posture is therefore not treated as sufficient for downstream acceptance absent then-current compatibility determination under the destination verification profile.

In some embodiments, the governance rail generates a portable verification bundle and a verifier result receipt bound to one or more source identifiers, policy-pack identifiers, selector-set digests, transformation digests, normalized-capability-record identifiers, invocation-dialect translation-record digests where applicable, destination-verification-profile identifiers, compatibility-verdict identifiers, allowed relying-party classes, context-of-use constraints, or freshness values. The portable verification bundle can be selective-disclosure capable and can permit a downstream policy-consumer rail to determine compatibility without requiring disclosure of full governed content or underlying credential material.

In some embodiments, installation, enablement, submission, certification, procurement review, partner exchange, insurer review, regulator review, or other downstream policy-consumer intake is treated as a governed acceptance boundary distinct from an effect boundary, such that a downstream component can accept a presented object for evidence-bearing use, advisory-only use, narrowed use, or authority-bearing use only when the portable verification bundle and the verifier result receipt remain compatible with the destination verification profile and the requested context-of-use.

In some embodiments, a previously issued portable verification bundle or verifier result receipt is invalidated, downgraded, narrowed, held, rejected, or reissued when a policy-pack version, verification-profile version, selector correspondence, transformation correspondence, normalized-capability correspondence, translation correspondence, review-state value, allowed relying-party class, or context-of-use constraint changes such that continued downstream acceptance no longer remains within governed scope.

H1. Optional Future-State Governance Receipts and Selective Verification

In some embodiments employing a future-state evaluation lane, a future-state governance receipt, also referred to in certain embodiments as a forecast receipt, represents machine-verifiable governance data associated with a selected candidate action. The receipt can identify, by way of non-limiting example, a forecast identifier, target identifier, observation-window field, forecast-window field, horizon field, model-manifest identifier, covariate-manifest identifier, checkpoint identifier, feature-lineage digest, prediction-output digest, uncertainty field, action-class field, and one or more reason codes.

In some embodiments, a future-state governance receipt binds or references one or more of: a point-forecast digest, quantile-forecast digest, prediction-interval digest, confidence-band digest, scenario-set digest, disagreement score, calibration score, uncertainty-budget result, reforecast flag, staleness flag, or override field, thereby permitting later verification that a downstream action relied on a permitted future-state posture rather than on an ungoverned or stale model output.

In some embodiments, a separate decision-state registry can store, in addition to a permit, hold, deny, expired, challenged, or reauthorize-required state, one or more future-state-conditioned qualifiers indicating whether a corresponding action is forecast-eligible, uncertainty-limited, reforecast-required, stale-forecast-blocked, scenario-review-required, or otherwise limited under the active policy profile.

In some embodiments, a verification-bundle generator or another component creates a signed verification bundle that exposes selective future-state governance information to a relying party without exposing proprietary model internals, the selective information including one or more of a validity result, uncertainty-status result, freshness result, permitted action class, horizon class, or reason code.

Figure 10:
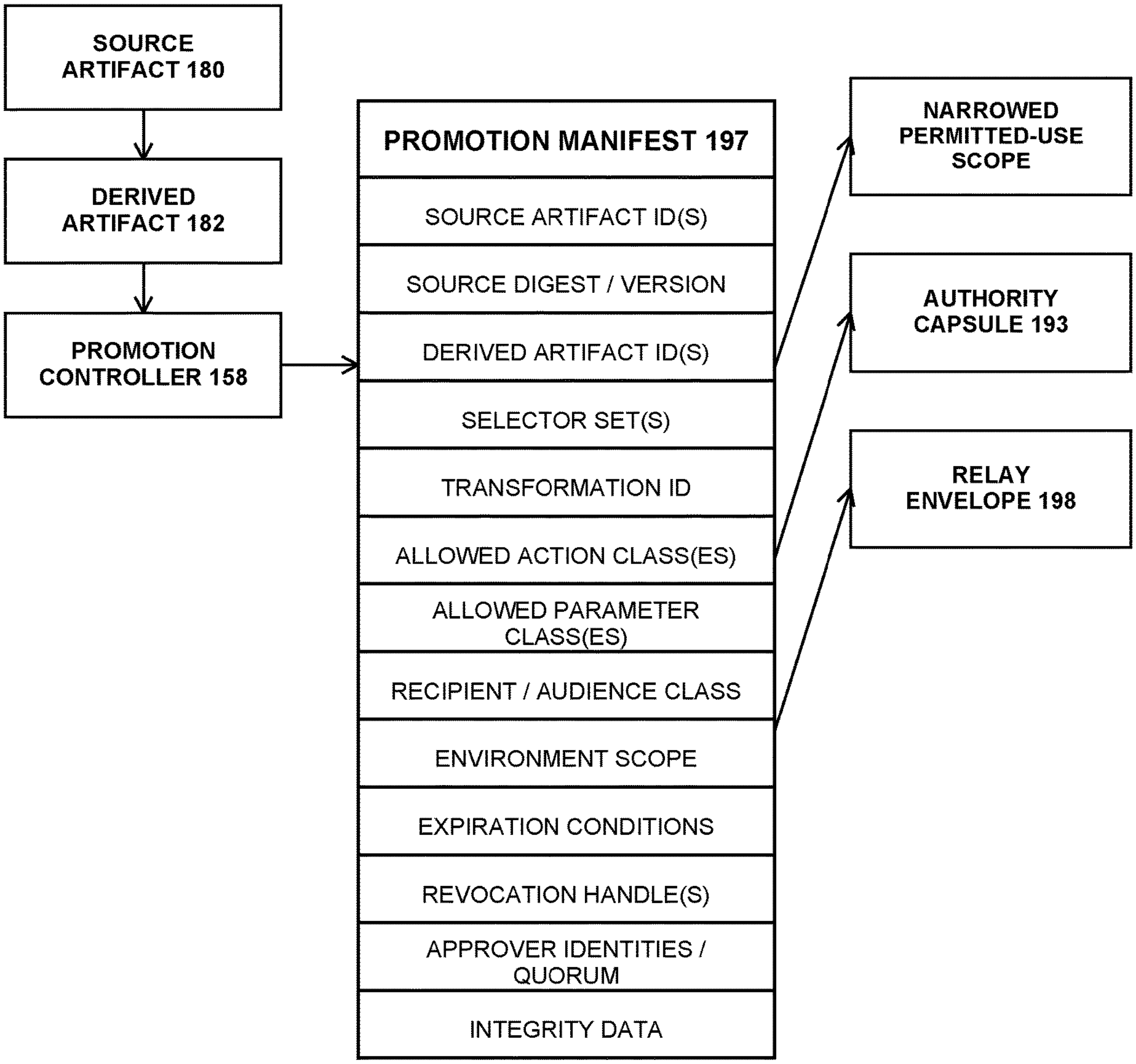
FIG. 10 is a diagram of an example promotion manifest, freshness window, quorum correspondence, and scope-narrowing promotion flow for promoting a restricted artifact or derived artifact to bounded authority-bearing use.

As illustrated in FIG. 10, promotion controller 158 can generate or verify a promotion manifest 197 that binds one or more source artifact identifiers, source digests or versions, one or more derived artifact identifiers, one or more selector sets, transformation identifiers, allowed action classes, allowed parameter classes, intended recipient or audience classes, environment scope, expiration conditions, revocation handles, approver identities, quorum state, and integrity data to a promotion decision.

In some embodiments, promotion is scope-narrowing by default. A promotion manifest 197 can therefore authorize only an equal or narrower selector set, action class, parameter class, recipient class, or environment scope than those already permitted for the originating artifact unless a fresh admission decision expressly authorizes broader scope under then-current policy.

Figure 11:
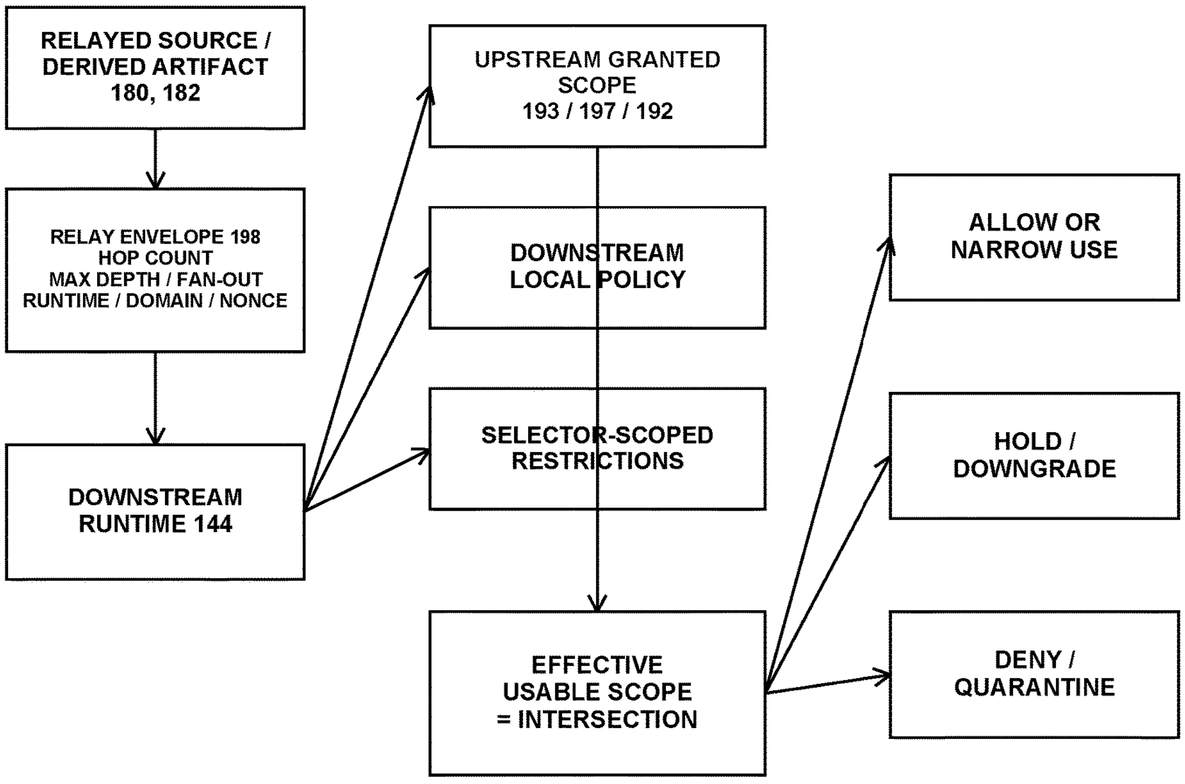
FIG. 11 is a diagram of an example relay envelope, hop counter, fan-out limit, recipient binding, anti-replay data, and no-privilege-inflation verification flow for cross-agent or cross-service propagation.

As illustrated in FIG. 11, propagation controller 126 can generate a relay envelope 198 that accompanies a relayed source artifact or derived artifact and records a relay hop counter, maximum relay depth, maximum fan-out, sender-runtime identity, intended recipient class, trust-domain binding, nonce or replay-protection data, and one or more required downstream revalidation conditions.

In some embodiments, no-privilege-inflation controls require that the downstream runtime compute an effective usable scope as an intersection of: (i) the upstream granted scope represented in the authority capsule 193, promotion manifest 197, or permitted-use binding 192; (ii) the downstream runtime's own local policy result; and (iii) the selector-scoped restrictions preserved in lineage data. If the intersection is empty, the relayed artifact is denied, held, downgraded to context-only, or quarantined.

In some embodiments, when a source artifact or derived artifact is converted into retrieved chunks, embeddings, reranker outputs, memory summaries, cached tool arguments, or other machine-consumable derivatives, the propagation controller 126 records the conversion in chunk lineage map 200 so that inherited restrictions remain attached across indexing, recall, compaction, summarization, deduplication, or ranking operations.

In some embodiments, memory write-back from a restricted artifact or derived artifact defaults to context-only storage, quarantined storage, or blocked storage unless a promotion manifest 197 or other separate promotion flow authorizes bounded future-behavior influence. A derived memory object therefore cannot obtain broader authority merely because it has been rewritten as a summary, label, embedding, or cache entry.

In some embodiments, policy candidates, allowlist candidates, training examples, or model-adaptation inputs derived from external context carry machine-readable indicators such as no-authorize, no-policy-update, no-memory-write, or no-train until a separate promotion flow satisfies stricter conditions than those required for bounded informational use.

In some embodiments, promotion manifest 197 further binds reviewer-class sets, freshness windows, threshold-approval or quorum correspondence, policy-state identifiers or policy epochs, and one or more selector-set digests, transformation digests, or parameter digests so that a promotion decision remains valid only while the then-current source set, review state, and policy state continue to correspond to the bound values. If the correspondence fails, the manifest is treated as insufficient for authority-bearing use until a fresh promotion decision is recorded.

In some embodiments, relay envelope 198 further carries session-binding data, channel-binding data, monotonic counter or sequence data, idempotency data, or sender-runtime attestation data. A downstream runtime can reject, hold, downgrade, or rewrap the relayed object when the relay is stale, replayed, over-broad, mismatched to the intended runtime or channel, or unsupported by then-current trust-domain or attestation conditions, while still preserving lineage to the source artifact or derived artifact.

6. Delegation-Chain Records, Mode-Separated Delegated Execution, and Revocation-Lineage Controls In some embodiments, when propagation controller 126 relays a source artifact, derived artifact, delegated task object, tool argument package, session-resume object, background-task object, connector-bound object, or other machine-consumable derivative in a form capable of influencing authority-bearing use, the propagation controller 126 additionally generates, retrieves, or verifies a delegation receipt representing an individual delegation hop.

A delegation receipt can identify, by way of non-limiting example, a delegation-chain identifier, a delegation-hop identifier, a parent-hop reference, an origin-principal reference, a delegator identity reference, a delegate identity reference, an authority-capsule reference, an authority-scope digest, a purpose digest, a task reference, one or more action-class sets, one or more parameter-class sets, one or more target-class sets, one or more recipient-class sets, an environment scope, an effective time, an expiration condition, a freshness window, a re-delegation policy, a non-transitive indicator, a confirmation-digest reference, a sponsor-binding reference, a policy-state identifier, a verification-profile reference, a revocation epoch, and integrity data.

In some embodiments, a plurality of delegation receipts forms a delegation chain extending from a human principal, enterprise principal, policy-bound service account, or other originating authority source to one or more sub-agents, tools, runtimes, queues, connectors, or remote services. The delegation chain can preserve parent-child hop linkage even when individual hops are rewrapped, transformed into other machine-consumable derivatives, resumed after interruption, or carried across heterogeneous transport or orchestration surfaces.

In some embodiments, non-transitive delegation is the default. Thus, a delegate that receives authority to perform a bounded action does not thereby obtain authority to further delegate that action to another agent, tool, queue, workflow, or service unless a then-current delegation receipt, authority capsule 193, promotion manifest 197, or other governing object expressly permits re-delegation under defined hop, freshness, purpose, or scope conditions.

In some embodiments, propagation controller 126 computes or verifies an effective delegated scope as no broader than: (i) the upstream granted scope; (ii) the downstream local-policy result; (iii) the selector-scoped source restrictions represented in lineage, authority-capsule, promotion-manifest, or permitted-use data; and, where applicable, (iv) then-current target correspondence, recipient correspondence, trust-domain correspondence, environment correspondence, and sponsor or confirmation correspondence. If correspondence fails, the propagated object can be rejected, rewrapped, narrowed, downgraded, quarantined, or held without granting broader authority.

In some embodiments, the governance rail distinguishes among read mode, draft mode, and act mode for delegated operation. Read mode can allow bounded retrieval, summarization, extraction, provenance generation, or policy-compatible analytics without permitting effect-bearing execution. Draft mode can allow preparation of a candidate message, workflow object, command package, approval object, disclosure package, or other candidate action without final transmission, commit, or actuation. Act mode can permit an effect-bearing operation only after satisfaction of then-current act-mode predicates.

Act-mode predicates can include, by way of non-limiting example, presentation of a live execution permit, current correspondence to a delegation receipt or authority-capsule reference, satisfaction of a freshness window or act window, presence of a required confirmation digest, sponsor-binding correspondence, threshold-approval or quorum correspondence, trust-domain compatibility, runtime-attestation correspondence, or any combination thereof.

In some embodiments, a mode-transition record is generated when a delegated operation transitions from read mode to draft mode, from draft mode to act mode, or from one protected mode to another protected mode. The mode-transition record can be bound to a prior mode, a requested mode, a draft-artifact digest if any, an authority-scope digest, a purpose digest, a task reference, an execution-context digest, a freshness value, an act window, a live-permit reference, one or more confirmation references, and integrity data.

In some embodiments, a draft-artifact digest is generated for a candidate message, candidate command, candidate approval package, candidate connector action, candidate tool invocation, or other non-final candidate action, and a later draft-to-act consistency result is computed to determine whether a subsequent act-mode event corresponds to the reviewed or approved draft-artifact digest rather than to a scope-expanded, target-shifted, recipient-shifted, or otherwise mismatched variant.

In some embodiments, a workflow object, step-sequence representation, reusable execution template, skill file, or other machine-consumable derivative generated during read mode or draft mode does not thereby become act-mode eligible merely because the same or similar sequence was previously reviewed, observed, drafted, or partially executed. A later act-mode transition can require then-current correspondence among the reusable derivative, the applicable delegation receipt, any draft-artifact digest or lineage digest, current selector and target correspondence, and one or more current confirmation, promotion, or execution-authority conditions before the reusable derivative may influence an effect-bearing operation.

In some embodiments, where the reusable derivative, draft artifact, workflow object, step-sequence representation, skill file, or other machine-consumable derivative is associated with a branch-state record for a hypothetical, simulated, exploratory, scenario-specific, or draft-only branch, a later act-mode transition further requires then-current correspondence to an applicable merge manifest, promotion manifest 197, or other merge-gated authorization object identifying the branch identifier, one or more branch-local assumptions, one or more applicable source or selector correspondences, and one or more then-current policy, review, approval, or freshness correspondences.

In some embodiments, absent such merge-gated correspondence, the branch-local derivative remains simulation-only, advisory-only, draft-only, context-only, or otherwise non-act-eligible notwithstanding prior review, prior structural similarity to a live-path derivative, or prior execution of a similar sequence. A later act-mode event therefore fails closed when the reusable derivative originated from a branch-local posture that has not been validly merged into a then-current live authority-bearing posture.

In some embodiments, a sponsor-binding reference or confirmation-digest reference identifies a human principal, enterprise approver, delegated sponsor, reviewer class, or other approving authority whose confirmation is required before the delegated operation may enter act mode. The confirmation can itself be bound to a task reference, purpose digest, target class, recipient class, execution context, freshness value, or draft-artifact digest so that a stale or mismatched confirmation does not authorize a later act.

In some embodiments, a resumed session, queued dispatch, scheduled replay, connector enablement, plugin activation, agent-definition override, delegated tool invocation, or other later-operationalized derivative does not obtain broader authority merely because it was cached, resumed, reissued, routed, replayed, or redistributed. Rather, the system requires current correspondence to the then-current delegation receipt, then-current authority capsule 193, then-current policy state, and then-current target, recipient, and environment conditions before authority-bearing use.

In some embodiments, revocation propagates across one or more delegation hops by a revocation receipt, revocation digest, revocation epoch, revocation-lineage reference, or equivalent machine-readable revocation object. Revocation of an upstream hop, a required sponsor relationship, or a parent authorization source can thereby cause a downstream relay, queued task, resumed session, delegated tool activation, or act-mode transition to fail closed by deny, hold, quarantine, downgrade, or freeze treatment until renewed authority is established.

In some embodiments, the governance rail stores or exports a delegation-state view, a re-delegation-limit view, a revocation-lineage view, a delegation-chain digest, a delegation-scope digest, a draft-to-act consistency view, a confirmation-to-act consistency proof, or a delegation-consumption proof sufficient to permit a downstream runtime or later verifier to determine whether delegated authority was attenuated rather than inflated, whether re-delegation remained within granted limits, and whether any later act remained within then-current granted scope.

In certain embodiments, the foregoing delegation-chain, mode-separation, and revocation-lineage controls can be practiced independently or in subcombination with authority capsule 193, promotion manifest 197, relay envelope 198, snapshot record 199, execution authority token 194, or verifier kit 205. The resulting technical improvement is not merely a policy preference, but a machine-enforced reduction in stale delegation, relay laundering, implicit privilege expansion, resumed-session scope drift, queued-dispatch authority drift, and draft-to-act mismatch at authority-bearing boundaries.

6A. Delegation Leases, Refresh Windows, Exhaustion, and Renewal Control

In some embodiments, one or more delegation receipts additionally or alternatively define a delegation lease governing the temporal and consumptive validity of delegated authority. A delegation lease can be associated with a delegation-chain identifier, a delegation-hop identifier, a lease start time, a lease expiry condition, a refresh window, an act window, a remaining-use count, a maximum-use count, a renewal trigger, a reconfirmation predicate, a lease epoch, and integrity data.

A resumed session, queued dispatch, scheduled replay, connector enablement, delegated tool invocation, or other later-operationalized derivative can therefore require not only selector, scope, target, recipient, and policy correspondence, but also a then-current lease-state correspondence showing that the delegated authority remains within an unexpired, unexhausted, and, where applicable, renewed or refreshed lease posture. If the lease is exhausted, stale, unrenewed, mismatched, or otherwise insufficient, the system can deny, hold, quarantine, downgrade, freeze, or require renewed authority before act-mode use.

In some embodiments, verifier kit 205 or another assurance export includes a lease-state view, a renewal-history view, an exhaustion result, a remaining-use result, a refresh-window result, a reconfirmation result, or a lease-consumption proof sufficient to permit a downstream runtime or later verifier to determine whether delegated authority remained temporally current, quantitatively unexhausted, and machine-verifiable at the time of a protected action.

D. Effect-Bound Revalidation and Execution-Use Enforcement Embodiments

1. Effect Boundaries and Interception

Figure 6:
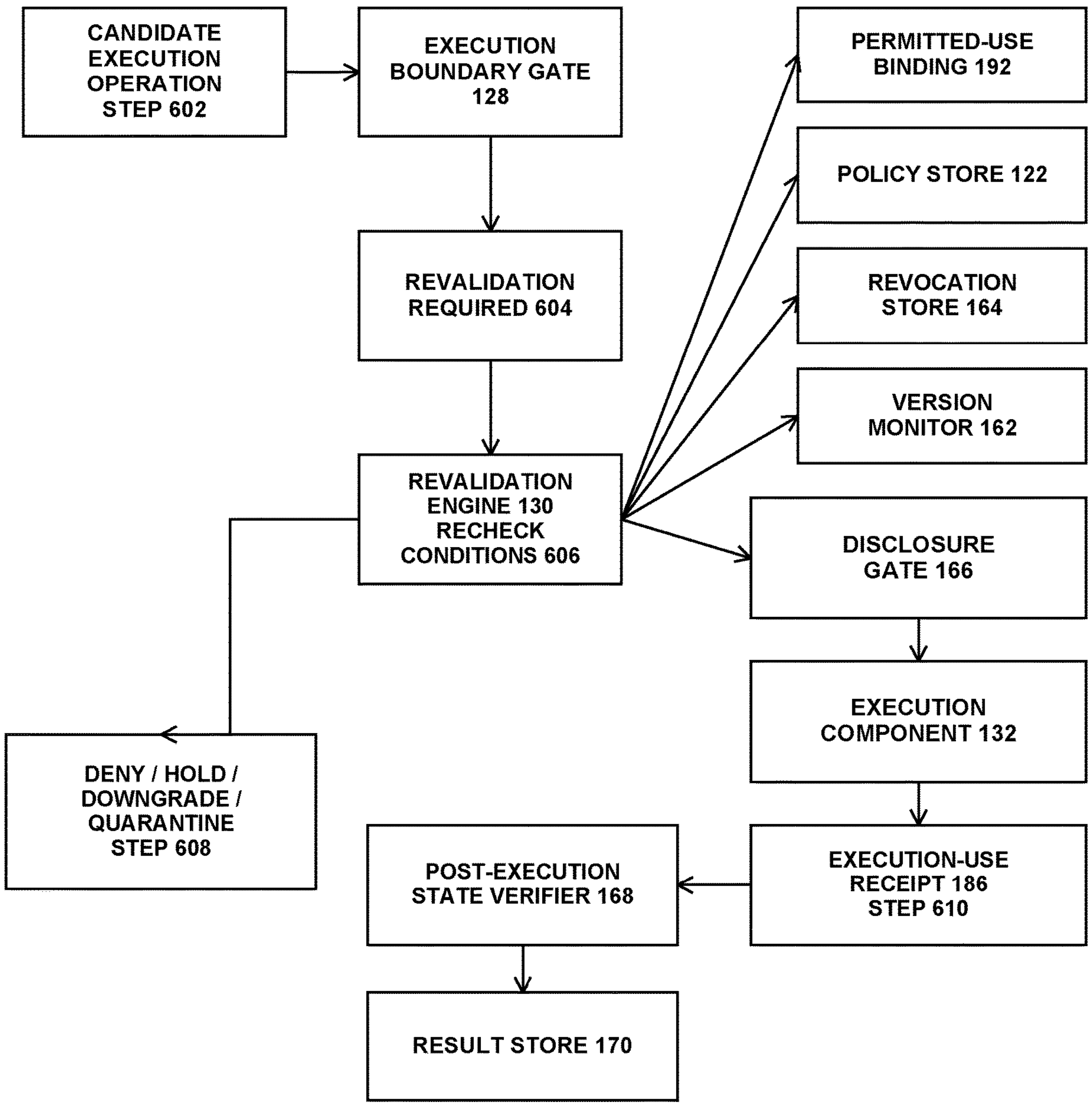
FIG. 6 is a flow diagram of an example effect-bound revalidation process at an execution boundary.

Referring to FIG. 6, execution boundary gate 128 intercepts a candidate execution operation at step 602. In some embodiments the execution boundary gate 128 is placed at or sufficiently near the actual side-effect boundary so that a stale or mutated artifact cannot bypass final governance merely by passing through a planner, queue, adapter, or proxy.

A candidate execution operation can comprise, by way of non-limiting example, a file write, a file deletion, a queue insertion, a schedule creation, a message send, an email send, a credential use, a data disclosure, a purchase submission, a remote API mutation, a task dispatch, an external process launch, a database commit, an actuator command, a memory write, a retrieval-index update, an embedding-store update, a policy-store update, or a training-corpus insertion. Initiation of a later-executing job can itself be treated as an effect boundary.

2. Revalidation Triggers and Checks

At step 604, revalidation engine 130 determines whether revalidation is required. Revalidation can be triggered by elapsed time, version-monitor notification, re-fetch event, mutation detection, workspace transition, cross-agent relay, promotion-token expiration, policy-pack update, trust-tier downgrade, revocation event, target-recipient change, or change in requested action class.

At step 606, revalidation engine 130 rechecks one or more of current digest, current version, current admission state, mutability state for the artifact or any associated pointer target, trust tier, authority-eligibility status, promotion-token validity, relay-credential validity, permitted-use binding 192, revocation status from store 164, and policy state from policy store 122, including, where applicable, whether any associated snapshot validity, freeze condition, pointer resolution, or re-fetch-triggered downgrade condition remains satisfied for authority-bearing use. In some embodiments, revalidation engine 130 also verifies that the artifact or derived artifact presently associated with the candidate execution operation matches the artifact or derived artifact for which earlier approval evidence was generated.

In some embodiments, where the candidate execution operation is associated with an artifact set governed by an artifact-set coherence record, revalidation engine 130 further determines whether a then-current coherence verdict, contradiction state, completeness state, and corroboration state applicable to the candidate execution operation remain satisfied for the then-current action class, target, recipient, environment, selector scope, or other permitted-use scope. If a required contradiction-free, sufficiently complete, or sufficiently corroborated posture is absent, stale, narrowed, mismatched, or otherwise unsatisfied, execution boundary gate 128 denies, holds, downgrades, or quarantines the candidate execution operation notwithstanding that one or more individual member artifacts might otherwise appear usable in isolation.

In some embodiments, where the candidate execution operation relies on a response artifact or on one or more action-relevant fields thereof, revalidation engine 130 further determines whether one or more then-current response-support-map entries remain selector-grounded, support-confirmed, uncontradicted, and within an allowed output-class or permitted-use posture for the candidate execution operation. If a required action-relevant field lacks then-current grounded support, lacks required corroboration, conflicts with a then-current governed source, or otherwise fails the response-support map, broader authority is not inferred from the response artifact and execution boundary gate 128 instead denies, holds, downgrades, narrows, or requires fresh promotion under then-current policy.

If one or more required conditions are absent, stale, mismatched, revoked, downgraded, or otherwise unsatisfied, execution boundary gate 128 denies, downgrades, holds, or quarantines the candidate execution operation at step 608. The denial or downgrade can be scoped to selected recipients, selected effect classes, selected fields, or selected action classes.

3. Disclosure Gating, Post-Execution Verification, and Standalone Revalidation Operation Disclosure gate 166 can separately govern release of data according to recipient class, sensitivity class, or permitted-use scope. Thus, a context-only artifact may be permitted for bounded internal reasoning while remaining ineligible to authorize disclosure of selected information to external recipients, downstream agents, or remote services.

Figure 7:
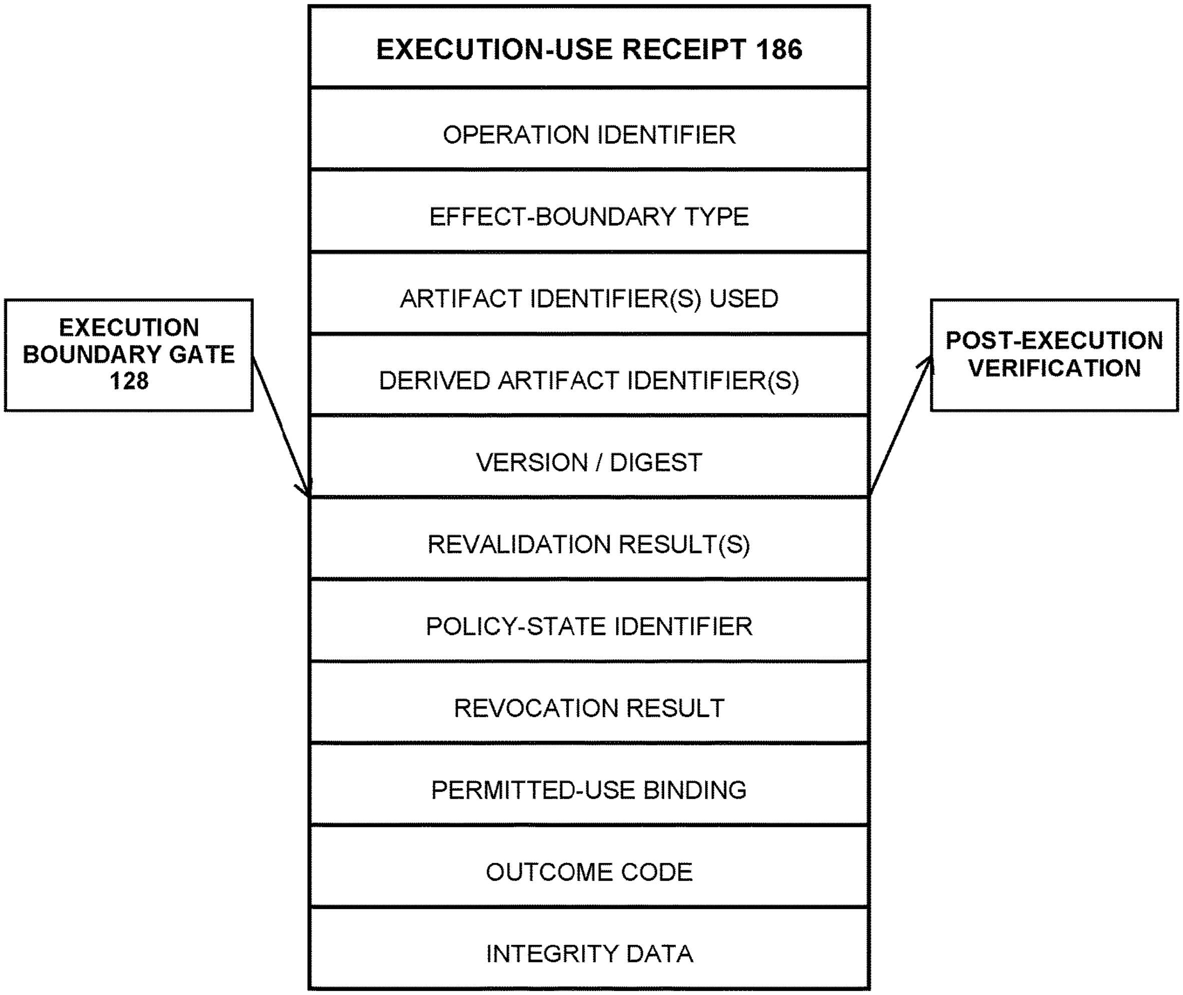
FIG. 7 is a diagram of an example execution-use receipt, post-execution verification record, and evidence-ledger entry.

At step 610, receipt generator 134 creates an execution-use receipt 186. Referring to FIG. 7, execution-use receipt 186 can identify the operation identifier, effect-boundary type, artifact identifiers used, derived artifact identifiers used, versions or digests, revalidation results, policy-state identifier, revocation result, permitted-use binding, outcome code, and integrity data. Post-execution state verifier 168 can additionally confirm whether the side effect actually occurred as permitted and can generate a post-execution verification record linked to receipt 186.

In certain embodiments, effect-bound revalidation and execution-use enforcement can be practiced independently. Even without the full admission-and-classification or derivation-control stack, effect-bound revalidation provides a concrete technical improvement by tying execution permission to present artifact state rather than merely to earlier planning context.

4. Single-Use Execution Tokens, Deferred Execution, and Commit Control

In some embodiments, when revalidation succeeds, execution boundary gate 128 or revalidation engine 130 generates an execution authority token 194 bound to an operation identifier, one or more target identifiers, one or more artifact identifiers or derived artifact identifiers, one or more current digests, a parameter digest, a policy-state identifier, an effect-boundary type, a nonce, an expiration condition, and integrity data. The execution authority token 194 can be single-use, bounded-use, recipient-specific, or environment-specific.

Execution component 132 can be required to present execution authority token 194 at the actual side-effect interface, and the side-effect interface can consume, countersign, or otherwise mark the execution authority token 194 as used. If the token is absent, expired, already consumed, bound to different parameters, bound to a different target, or otherwise invalid, the side effect is denied or held even if earlier planning logic indicated approval.

For deferred, queued, or asynchronous workflows, the system can create a reservation record 195 or schedule record that identifies a proposed future operation without thereby granting unconditional execution authority. Before later execution, the system can require fresh revalidation, token refresh, or both, so that a stale job object, cached tool argument package, or previously approved plan cannot be replayed against changed artifacts, changed recipients, or changed policy state.

In some embodiments, post-execution state verifier 168 compares the actually executed parameters, actual recipient, actual target, or resulting state to the digest or bounds recorded in execution authority token 194 and execution-use receipt 186. Mismatch can generate a violation record, revocation trigger, compensating action, or downstream quarantine action.

Figure 12:
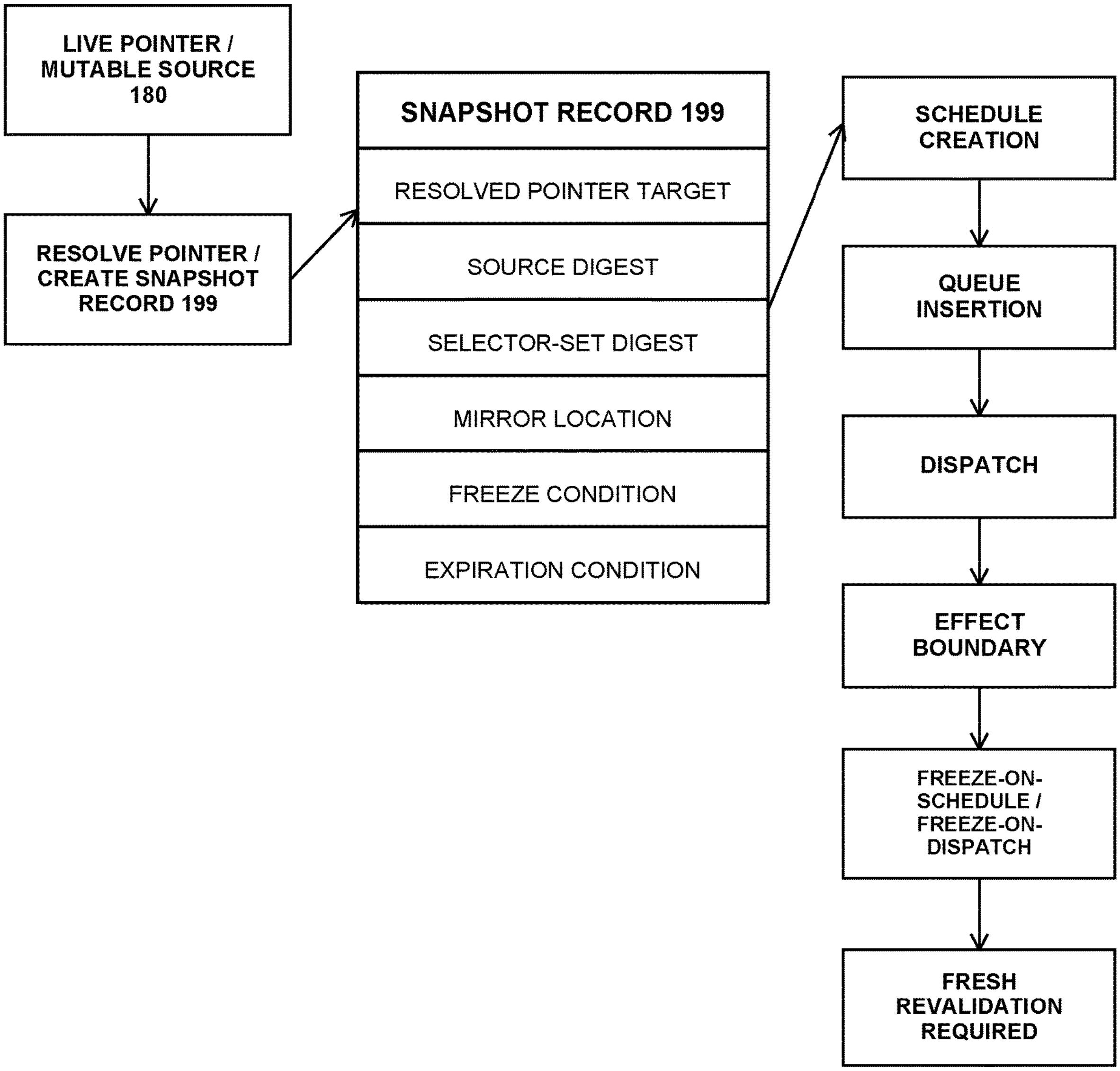
FIG. 12 is a flow diagram of an example pointer-resolution, snapshot, freeze-on-schedule, freeze-on-dispatch, reservation-to-execution, and re-fetch-triggered revalidation process for deferred execution.
Figure 13:
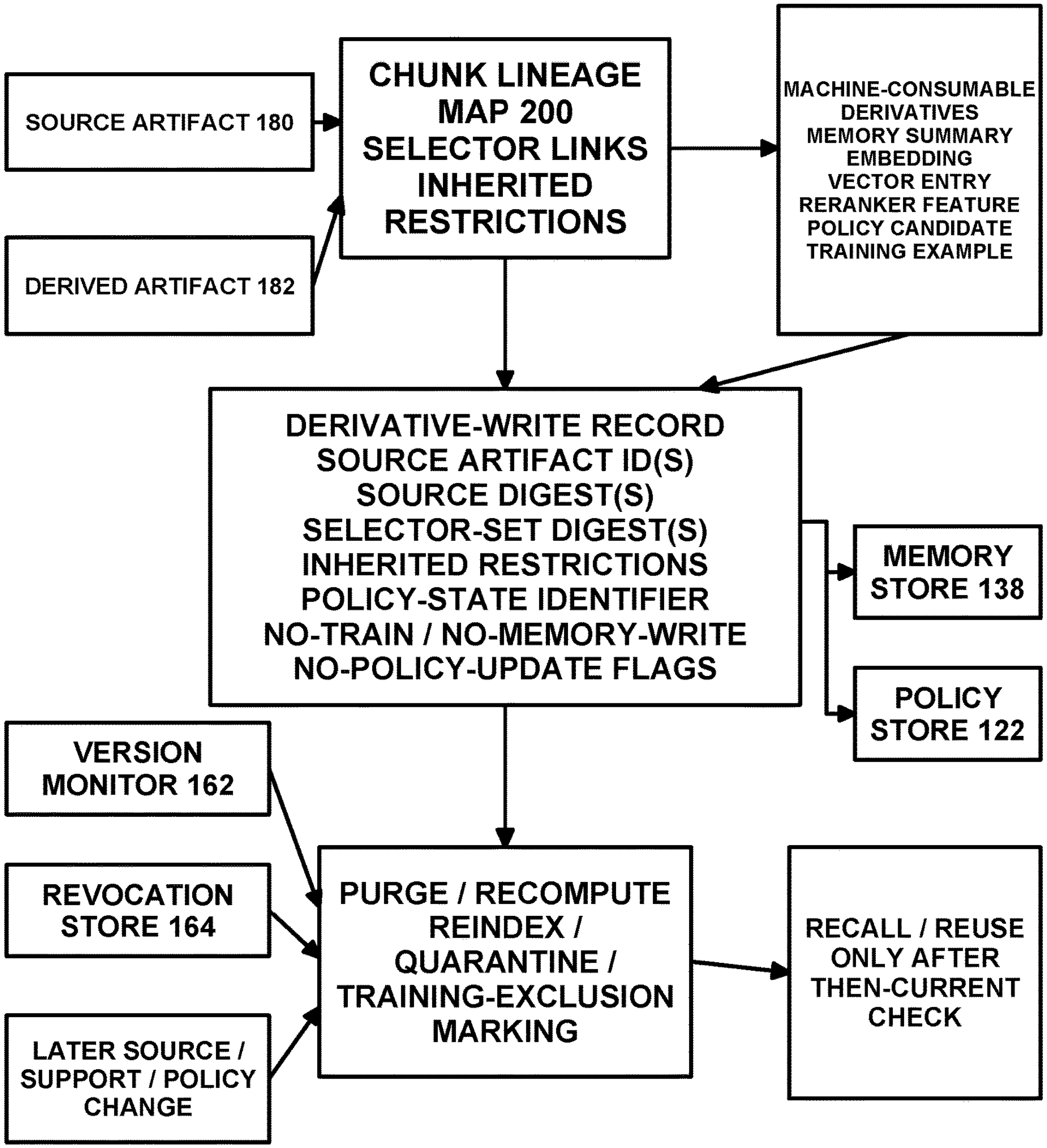
FIG. 13 is a diagram of an example chunk-lineage map, derivative-write record, purge or recomputation controls, and other machine-consumable derivatives generated from governed artifacts.

As illustrated in FIG. 12, the system can create a snapshot record 199 at schedule creation time, queue insertion time, dispatch time, or immediately before an effect-boundary operation. The snapshot record 199 can bind a resolved pointer target, source digest, selector-set digest, mirror location if applicable, freeze condition, and expiration condition so that deferred execution is tied to a specific governed resolution of the underlying artifact.

4A. Attested Effect-Boundary Interfaces, Consumption Proofs, and Actual-to-Authorized Correspondence In some embodiments, the actual side-effect interface is represented by one or more machine-readable interface values including an effect-interface identifier, an effect-interface class, a consumer-runtime identifier, a consumer-measurement digest, an interface-attestation result, an endpoint-binding value, and one or more integrity-protected correspondence values describing the then-current effect-bearing boundary at which an execution authority token 194 may be presented and consumed.

Execution authority token 194 can be bound not only to an operation identifier, target identifier, parameter digest, artifact digest set, policy-state identifier, nonce, and expiration condition, but also to one or more interface-bound correspondence values so that token presentation at a different runtime, a different endpoint, a different boundary class, or a different measured interface posture is insufficient for commit. Execution component 132 or another effect-bearing interface can consume, countersign, or otherwise mark the token as used and can generate a token-consumption proof or interface-consumption proof identifying one or more actual interface conditions at time of commit.

In some embodiments, post-execution state verifier 168 or another verification component compares one or more actually executed conditions, including an actual endpoint digest, actual target identifier, actual recipient identifier, actual parameter digest, actual resulting-state digest, or actual interface posture, to one or more bound or authorized conditions recorded in execution authority token 194, reservation record 195, snapshot record 199, or execution-use receipt 186. Mismatch can generate a structured precondition failure reference, violation record, revocation trigger, compensating action, or downstream quarantine action.

In some embodiments, an effect-bearing interface lacking a required attestation result, measurement correspondence, endpoint correspondence, or interface-class correspondence is treated as insufficient for commit even where earlier planning logic, delegated planning logic, or deferred reservation logic indicated approval. The resulting technical improvement includes fail-closed reduction of replay, proxy substitution, endpoint drift, and runtime-substitution failures at the actual effect boundary.

4B. Runtime-Family-Bound Commit Correspondence, Translation-Record Binding, and Credential-Lease Consumption In some embodiments, execution authority token 194 is bound not only to an operation identifier, target identifier, parameter digest, artifact digest set, policy-state identifier, nonce, expiration condition, and one or more interface-bound correspondence values, but also to one or more runtime-family descriptors, provider-class descriptors, invocation-dialect translation-record digests, delegated credential object references, credential lease record identifiers, session-authority digests, endpoint-class values, or other machine-readable values sufficient to determine whether a later commit path remains within the governed operational posture previously authorized.

In some embodiments, execution component 132, post-execution state verifier 168, or another verification component determines at commit time whether one or more actual commit conditions correspond to the bound conditions of execution authority token 194, including by way of example an actual runtime-family value, actual provider-class value, actual endpoint-class value, actual translated invocation form, actual session-authority posture, actual delegated credential-use posture, actual lease-state posture, actual target identifier, actual recipient identifier, or actual parameter digest. A mismatch can be treated as a commit-precondition failure even where earlier planning logic, delegated planning logic, capability-resolution logic, or deferred reservation logic indicated approval.

In some embodiments, an effect-bearing interface that consumes or otherwise operationalizes delegated credential use generates a credential-consumption proof identifying one or more credential-governance values without disclosing the underlying credential material, the credential-consumption proof identifying, by way of non-limiting example, a delegated credential object reference, a credential lease identifier, a session-authority digest, an endpoint-class value, an actual runtime-family value, an actual provider-class value, an actual invocation-dialect translation-record digest, an actual target or recipient value, a consumption time, and integrity data. The credential-consumption proof can be generated independently or as part of a token-consumption proof, interface-consumption proof, or execution-use receipt 186.

In some embodiments, when a required runtime-family correspondence, provider-class correspondence, translation-record correspondence, delegated credential correspondence, credential-lease correspondence, session-authority correspondence, or endpoint-class correspondence is absent, stale, exhausted, mismatched, replayed, over-broad, or otherwise unsatisfied, execution boundary gate 128 denies, holds, downgrades, quarantines, freezes, or requires renewed authority for the candidate execution operation.

The resulting technical improvement includes fail-closed reduction of runtime-substitution, provider-surface substitution, translation-path drift, unauthorized secret-use paths, stale credential-refresh reuse, and other actual-to-authorized commit mismatches at the effect boundary.

In some embodiments, for a browser-mediated, workflow-mediated, or computer-use candidate execution operation, execution component 132, post-execution state verifier 168, or another verification component further determines at commit time whether a then-current cross-view field-binding manifest remains satisfied, including whether one or more rendered-field correspondences, hidden-field correspondences, interface-state snapshot correspondences, canonical submit-surface digest values, submit-endpoint correspondences, and origin, site, tenant, account, or session correspondences continue to match the governed posture authorized for the candidate execution operation.

In some embodiments, where an actual commit path presents a rendered field, hidden field set, submit surface, endpoint posture, account posture, tenant posture, or ordered interaction-step posture that does not correspond to the applicable cross-view field-binding manifest, the governance rail denies, holds, downgrades, quarantines, or requires renewed authority rather than inferring broader authority from presentation-level similarity, prior highlighting, prior preview correspondence, or prior interface-state resemblance alone.

4C. Verification-Only Acceptance Boundaries, Intake Correspondence, and Bundle Reissuance In some embodiments, a downstream policy-consumer intake boundary is treated as a governed acceptance boundary distinct from an effect boundary even when no immediate side effect is committed, the acceptance boundary corresponding to installation, enablement, submission, certification, procurement intake, partner exchange, insurer intake, regulator review, or other event at which a downstream component determines whether a presented object will be accepted as verified, compatible, or eligible for authority-bearing use or evidence-bearing use.

In some embodiments, a destination runtime, tool provider, remote service, partner, auditor, procurement consumer, insurer, regulator, or other relying party determines acceptance-boundary correspondence by comparing one or more values of a portable verification bundle or verifier result receipt to one or more then-current destination-verification-profile values, policy-pack values, selector or transformation correspondences, normalized-capability or translation correspondences where applicable, review-state values, allowed relying-party classes, or context-of-use constraints. Failure of such correspondence can yield accept, narrow, advisory-only, hold, reject, or reissue-required outcomes without requiring an actual effect-bearing commit to be attempted.

In some embodiments, a presented object may be accepted for advisory-only use or evidence-only use while being denied for authority-bearing use, and may be accepted for one relying-party class, consumer class, or context-of-use while being denied, held, or narrowed for another. A later component therefore does not infer broader authority merely because a prior downstream policy-consumer rail accepted the object for a different verification profile, relying-party class, or context-of-use.

In some embodiments, when a source policy-pack version, destination verification profile, selector correspondence, transformation correspondence, review-state value, or profile-negotiation result changes after an earlier acceptance event, the governance rail invalidates, downgrades, holds, rejects, or requires reissuance of the portable verification bundle or verifier result receipt before continued downstream acceptance is permitted.

In some embodiments, receipt generator 134 generates an acceptance result record identifying an acceptance-boundary type, destination-verification-profile identifier, compatibility verdict, allowed relying-party classes, context-of-use constraints, one or more reason codes, and integrity data, the acceptance result record being exportable in verifier kit 205, another assurance export, or another downstream verification bundle.

In some embodiments, a managed-agent control-plane event is treated as a governed acceptance boundary distinct from a later effect boundary, the control-plane event corresponding to agent enrollment, re-enrollment, roster admission, work-item creation, assignment, reassignment, status transition, board-state transition, capability-advertisement acceptance, or local-runtime registration acceptance. A downstream component can accept such an event for advisory-only, task-acquisition-eligible, queue-eligible, or execution-eligible treatment only when one or more then-current local-agent enrollment records, managed-agent control-plane objects, capability-manifest references, selector correspondences, review or policy-state values, heartbeat or lease values, and allowed relying-party or context-of-use conditions correspond; otherwise the governance rail yields accept-narrowed, advisory-only, hold, reject, or reissue-required treatment without inferring broader authority from mere presence of the control-plane event.

J1. Optional Future-State Staleness, Reforecast-Required State Transition, and Dependency Propagation In some embodiments, a future-state evaluation object or future-state governance receipt becomes stale when one or more then-current conditions no longer correspond to values bound or referenced by the earlier object or receipt. Such conditions can include arrival of new observation data, expiration of an observation-window tolerance, covariate drift, feature-lineage change, checkpoint change, model-version change, policy-profile change, challenge event, rights-governance change, disclosure change, target shift, or environment shift.

In some embodiments, when a stale condition is detected, the system marks a corresponding receipt, registry entry, future-state evaluation object, or dependent action path as hold, challenged, expired, reauthorize-required, or reforecast-required, and prevents continued reliance on the earlier future-state posture for one or more downstream actions until a compliant reevaluation, reforecast, or replacement authorization path is completed.

In some embodiments, version monitor 162 or another dependency graph and receipt-impact analyzer stores one or more evidentiary or authorization dependencies among future-state evaluation objects, future-state governance receipts, model manifests, covariate manifests, feature-lineage records, candidate deployments, branch variants, and downstream action paths, thereby allowing invalidation or reforecast requirements to propagate in a technically determinable manner.

In some embodiments, one or more stored evidentiary or authorization dependencies further identify one or more branch-state records, branch-local assumption digests, merge-manifest identifiers, or branch-to-live correspondence results such that stale, contradicted, invalidated, or non-corresponding branch assumptions propagate hold, challenged, reforecast_required, branch_review_required, renewed_authority_required, narrowed_merge_only, or other fail-closed treatment to one or more dependent action paths.

In some embodiments, a later downstream action path does not remain forecast-eligible, merge-eligible, or otherwise live-authorized merely because an earlier branch-local future-state evaluation object or branch-local derivative previously satisfied a policy profile, where then-current branch posture, merge posture, assumption correspondence, or source correspondence no longer remains satisfied. Dependency propagation can therefore prevent stale or simulation-only branch outputs from silently retaining live authority across later action paths.

In some embodiments, different action classes are invalidated differently. A first downstream action class can remain permitted under a prior future-state evaluation object, while a second downstream action class is moved to hold or reforecast-required, thereby supporting action-scoped state mutation rather than indiscriminate global invalidation.

In some embodiments, freeze conditions include freeze-on-schedule, freeze-on-dispatch, bounded snapshot time-to-live, or any combination thereof. If a required freeze condition is absent, expired, thawed, revoked, or invalidated by re-fetch or mutation detection, execution boundary gate 128 can deny, hold, downgrade, or quarantine the candidate execution operation until fresh revalidation succeeds.

In some embodiments, execution authority token 194 is further bound to one or more of: a snapshot-record identifier, a selector-set digest, a promotion-manifest identifier, a relay-envelope identifier, a policy-overlay identifier, a reservation-chain identifier, or a recipient-class binding, thereby reducing the risk that approval evidence is replayed against materially different content, parameters, recipients, or policy states.

For queued, scheduled, or otherwise deferred workflows, the system can require a reservation-to-execution chain in which an earlier reservation record 195 does not itself grant final execution authority and each later dispatch, handoff, or replay attempt must still satisfy then-current snapshot, selector, relay, promotion, and policy conditions before the effect-bearing step is committed.

In some embodiments, initial acceptance of a queued, scheduled, resumed, replayed, or otherwise deferred workload by a queue manager, workload manager, placement engine, or other cluster-control surface is treated as a governed acceptance boundary distinct from a later compute-execution effect boundary. A queued or deferred workload object can comprise or reference one or more job descriptors, partition descriptors, node-pool descriptors, accelerator-pool descriptors, fair-share states, preemption postures, reservation values, snapshot identifiers, runtime-family descriptors, provider-class descriptors, selector or target correspondence values, or combinations thereof, such that earlier planning, scheduling, or reservation does not itself authorize later execution on a different cluster posture. Before queue insertion, schedule creation, dispatch, placement, launch, migration, resumption, or another effect-bearing operationalization is permitted, the governance rail determines whether a then-current scheduler-neutral workload admission, cluster-compatibility record, portable verification bundle, reservation-to-execution chain, and execution authority token remain present and corresponding to the actual queue, partition, node pool, accelerator pool, runtime posture, provider posture, endpoint posture, policy state, and freshness conditions, and otherwise denies, holds, narrows, downgrades, quarantines, or requires fresh admission, fresh promotion, or fresh revalidation.

Figure 14:
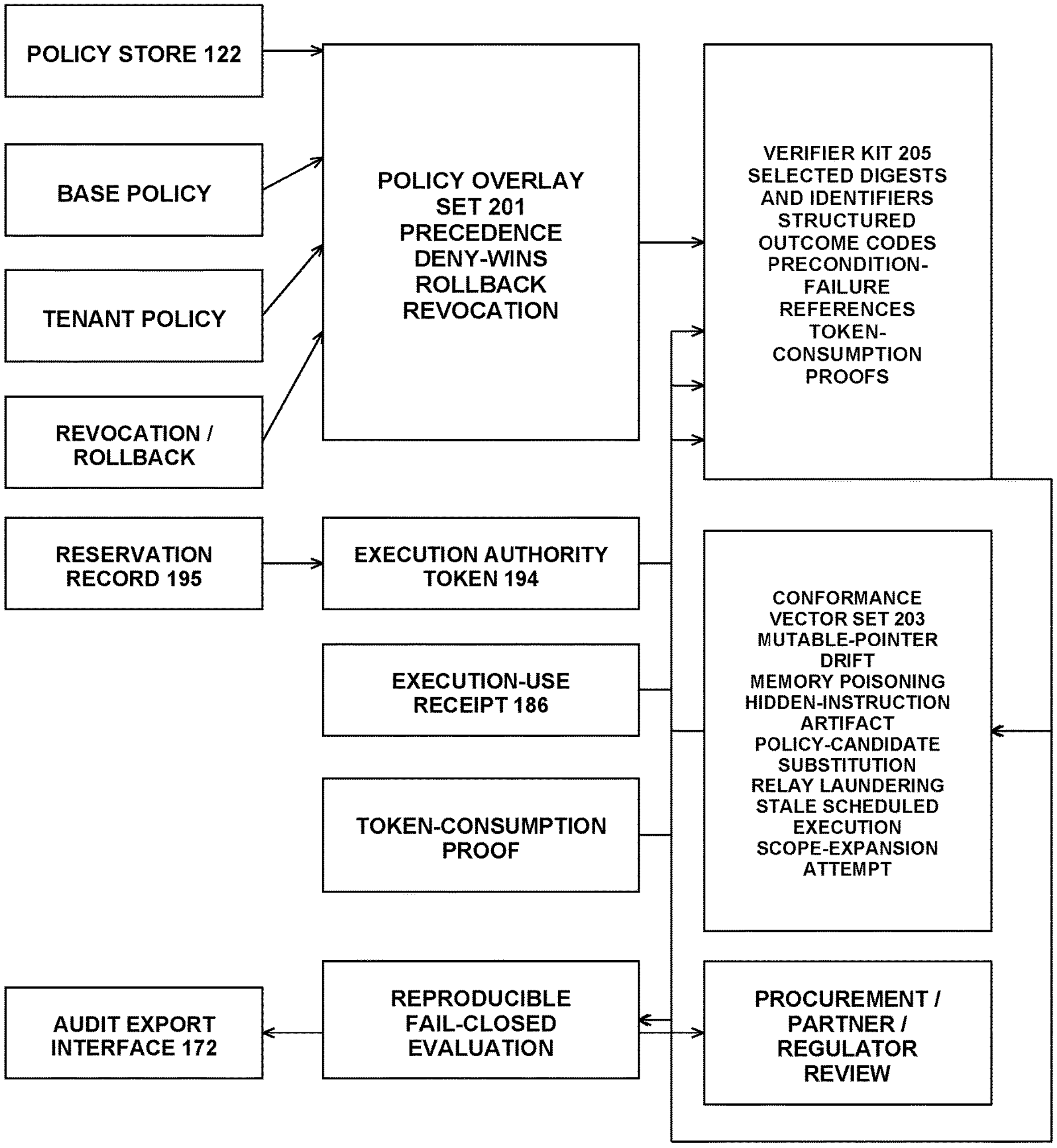
FIG. 14 is a diagram of an example policy-overlay composition, verifier-kit output, structured outcome codes, token-consumption proofs, and conformance-vector evaluation process for assurance, procurement, or downstream verification.

As illustrated in FIG. 14, the system can export verifier kit 205 outputs and conformance vector set 203 results demonstrating whether mutable-pointer drift, memory poisoning, hidden-instruction artifacts, policy-candidate substitution, relay laundering, stale scheduled execution, or scope-expansion attempts were successfully detected and fail-closed. Such outputs can be used for platform assurance, procurement review, incident reconstruction, partner diligence, or regulator-facing verification.

In some embodiments, writes to future-behavior stores, including memory stores, retrieval indexes, embedding stores, ranking caches, policy stores, training corpora, or fine-tuning queues, additionally require execution authority token 194 presentation, token-consumption recording, or post-execution confirmation so that future-governing updates are controlled with the same or stricter rigor as outward-facing side effects.

In some embodiments, execution component 132 or another effect-bearing interface requires presentation of execution authority token 194 at commit time, consumes or countersigns the token upon use, and generates a token-consumption proof identifying the actual executed parameter digest, actual recipient, actual target, or resulting state. A replayed, partially reused, or scope-divergent token can therefore be detected at or after commit and recorded as a machine-verifiable mismatch.

In some embodiments, deny, hold, downgrade, or allow outcomes at execution boundary gate 128 are additionally associated with a structured precondition failure reference or outcome code identifying whether the determining condition was, by way of example, selector mismatch, snapshot expiration, policy-epoch drift, target change, recipient change, missing attestation, missing disclosure, or revocation. Receipt generator 134 can bind such references, together with token-consumption proofs or selected digests, into evidence ledger 136 or an audit export so that later verification can reproduce the reason for fail-closed treatment without disclosing full underlying content.

5. Delegation-Specific Effect-Bound Revalidation and Commit Controls

In some embodiments, when a candidate execution operation is attempted pursuant to delegated authority, revalidation engine 130 additionally verifies one or more then-current delegation receipts, a delegation-chain digest, a non-transitive or re-delegation condition, one or more revocation objects, one or more required confirmation references, and one or more mode-class conditions before execution boundary gate 128 permits the effect-bearing step to proceed.

Such revalidation can include determining whether the candidate execution operation remains within the then-current delegated action class, parameter class, target class, recipient class, environment scope, task reference, purpose digest, and trust-domain binding associated with the applicable delegation receipt, authority capsule 193, relay envelope 198, promotion manifest 197, or execution authority token 194.

In some embodiments, read mode or draft mode is insufficient for an effect-bearing commit. Thus, even where an artifact, derived artifact, draft package, queued object, or resumed-session object was previously permissible for informational use, planning use, or draft generation, execution boundary gate 128 denies, holds, quarantines, or downgrades a later act-mode event unless a then-current live execution permit and all required act-mode predicates are satisfied.

In some embodiments, act-mode predicates include one or more of: a current execution authority token 194 or other live execution permit; a current confirmation digest or sponsor-binding correspondence; then-current policy-state correspondence; then-current selector or draft-artifact correspondence; then-current target and recipient correspondence; revocation-lineage clearance; trust-domain compatibility; and freshness of a designated act window. Failure of any required predicate can map to deny, hold, quarantine, freeze, downgrade, or renewed-authority-required treatment.

For queued, scheduled, resumed, replayed, or otherwise deferred delegated operations, the system can require not only the reservation-to-execution chain described above, but also a then-current delegated-authority correspondence check showing that the delegated target, delegated recipient, delegated action class, delegated parameter class, and any required sponsor or confirmation state remain current at commit time rather than merely at planning time.

In some embodiments, execution component 132 or another effect-bearing interface generates a delegation-consumption proof in addition to or as part of a token-consumption proof, the delegation-consumption proof identifying one or more of a delegation-hop identifier, a delegation-chain digest, a confirmation-digest reference, a sponsor-binding reference, an actual target identifier, an actual recipient identifier, an actual parameter digest, a resulting-state digest, or an actual-versus-authorized comparison result.

In some embodiments, a revocation receipt, revocation digest, revocation epoch, re-delegation-limit violation, sponsor mismatch, draft-to-act mismatch, target shift, recipient shift, or stale act window is encoded as a structured precondition failure reference or outcome code so that later verification can reproduce whether a delegated operation failed closed because of stale delegated authority, invalid re-delegation, revoked lineage, or mismatch between authorized and actual execution conditions.

In some embodiments, receipt generator 134, evidence ledger 136, audit export interface 172, or verifier kit 205 exports a delegation-state view, a revocation-lineage view, a re-delegation-limit view, a draft-to-act consistency view, a confirmation-to-act consistency proof, or a delegation-consumption proof sufficient to demonstrate that a delegated effect-bearing action remained within attenuated, fresh, revocable, and machine-verifiable scope at the moment of commit.

E. Integrated Operation and Example Workflows

Figure 8:
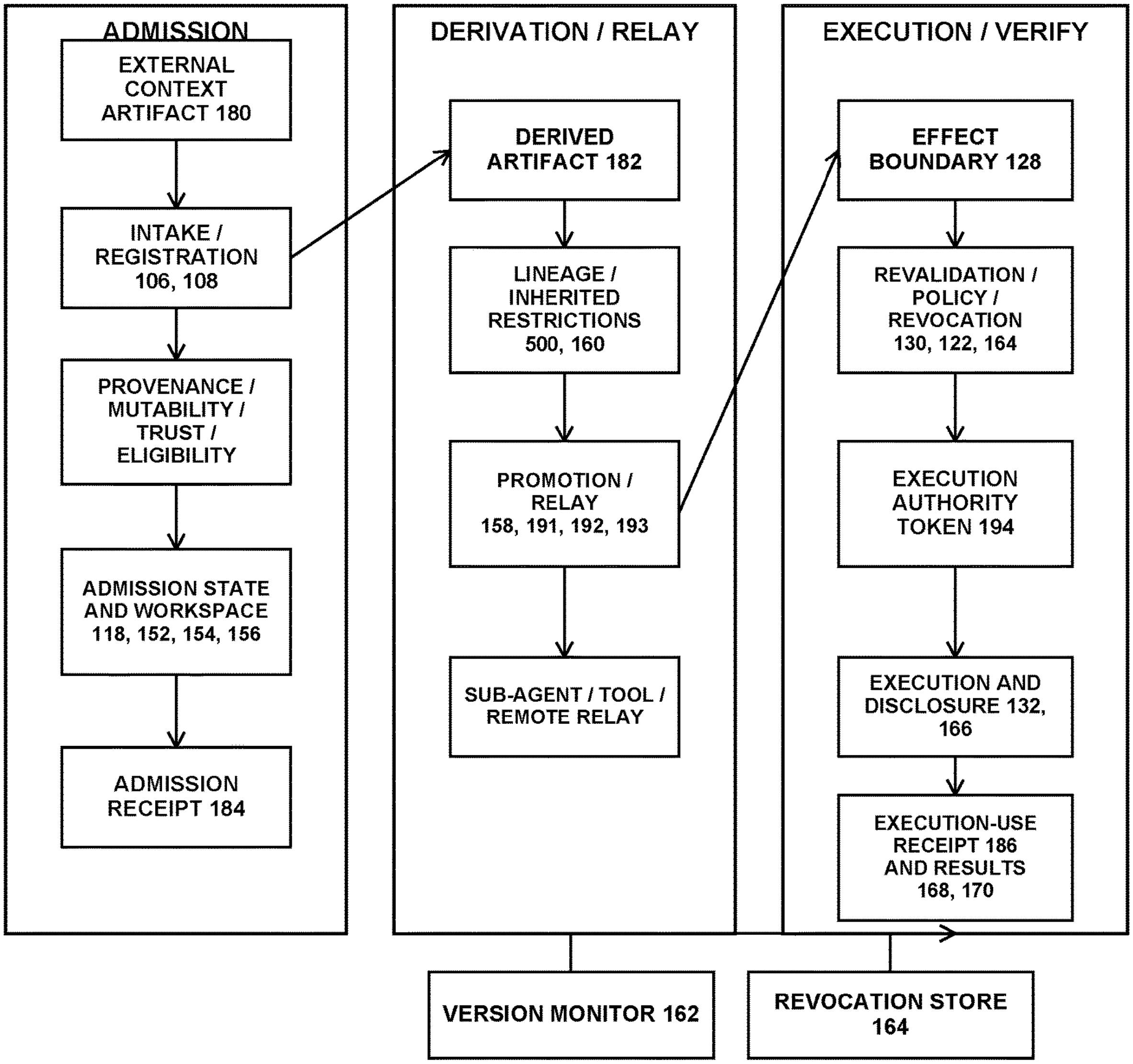
FIG. 8 is an end-to-end flow diagram showing combined operation of admission, derivation and propagation control, and effect-bound revalidation.

Referring to FIG. 8, an integrated embodiment begins when external context artifact 180 is received through intake interface 106 and is registered in artifact registry 108. Provenance analyzer 110, mutability assessor 112, trust tier classifier 114, and authority-eligibility engine 116 evaluate the artifact, after which admission engine 118 assigns an admission state and receipt generator 134 stores an admission receipt 184 in evidence ledger 136.

If the agentic system later generates derived artifact 182, derivation controller 124 and propagation controller 126 store lineage information in restriction lineage store 160, apply inherited restrictions, and determine whether any promotion condition is satisfied. If the derived artifact is relayed, relay credential 191 and permitted-use binding 192 accompany the relayed object or are otherwise made available to downstream policy logic.

If a source artifact or derived artifact is later used for a side effect, execution boundary gate 128 and revalidation engine 130 recheck artifact state, policy state, and scope compliance before the side effect is permitted. Receipt generator 134 then emits an execution-use receipt 186, and post-execution state verifier 168 may confirm whether the side effect actually occurred as allowed.

In one example workflow, a mutable shared document arrives through connector 140. Mutability assessor 112 marks the artifact as mutable, trust tier classifier 114 assigns a low or bounded trust tier, authority-eligibility engine 116 marks the artifact authority-ineligible, and admission engine 118 assigns context-only or quarantine. A transformed representation is exposed for summary generation, but any summary derived therefrom remains context-only by default through inherited restriction propagation.

In another example workflow, a signed policy pack arrives with a verified signature and a version-locked policy-pack identifier matching an allowed record in policy-pack store 148. Trust tier classifier 114 assigns a higher trust tier, authority-eligibility engine 116 determines that the artifact can be authority-bearing for a bounded action class, and admission engine 118 stores the artifact in authority-bearing workspace 156 subject to scope limits.

In another example workflow, a delegated task generated from a context-only source is relayed to sub-agent runtime 144. Because propagation controller 126 preserved restriction inheritance and relay scope, the sub-agent cannot use the derived artifact as an authority-bearing input when attempting an effect-bearing action unless a valid promotion condition is satisfied. In another example workflow, a job object scheduled earlier is about to execute.

Revalidation engine 130 detects that a source artifact changed after the initial admission decision, downgrades the candidate execution operation to hold, and stores an execution-use receipt 186 indicating version change and revalidation failure.

In another example workflow, an optional future-state evaluation subsystem generates a future-state evaluation object, such as a forecast object, for a candidate downstream action, the future-state evaluation object identifying a target identifier, an observation window, a forecast window or horizon, one or more forecast outputs, and one or more uncertainty indicators. A machine-readable policy profile evaluates whether the future-state evaluation object corresponds to an eligible future-state configuration and whether applicable uncertainty controls are satisfied, after which the system generates a future-state governance receipt and stores a corresponding qualifier in a separate decision-state record.

In one implementation of the workflow of paragraph [0378], the candidate downstream action is a scheduled, routed, allocated, activated, or dispatch-related action. If the future-state evaluation object remains within an allowed uncertainty budget and corresponds to the then-applicable model-manifest, covariate-manifest, checkpoint, and policy-profile conditions, the separate decision-state record indicates forecast-eligible treatment; otherwise the separate decision-state record indicates hold, scenario-review-required, stale-forecast-blocked, or reforecast-required treatment.

In a further implementation, new observation data, covariate drift, checkpoint change, or policy-profile change occurs after the initial future-state governance receipt is created but before commit of the candidate downstream action. The system detects that the earlier future-state posture is no longer current, changes the separate decision-state record to stale-forecast-blocked or reforecast-required, prevents commit of the candidate downstream action based solely on the earlier receipt, and requires a compliant reevaluation or replacement authorization path before later effect-bearing use.

In another example workflow, the same artifact is partially authoritative for one action class and non-authoritative for another action class. Admission-and-classification features assign different authority scopes, derivation-control features preserve those scopes across derived artifacts, and effect-bound revalidation features enforce the scoped distinction at the effect boundary.

F. Computing Implementations, Variations, and Non-Limiting Deployment Forms

The disclosed functions can be implemented in a centralized server, distributed control plane, local gateway, proxy, sidecar, tool-use interceptor, model wrapper, operating-system service, browser or client extension, storage-access layer, robotic middleware component, on-premises appliance, cloud platform, hybrid deployment, or any combination thereof.

In some embodiments, the policy store 122 and policy-pack store 148 are local to a tenant. In other embodiments, selected policy packs are provided by a platform operator, regulator, customer, partner, or managed-service provider. In some embodiments, the governance rail is exposed as an application programming interface, software development kit, policy service, embedded runtime, or original-equipment-manufacturer control plane.

The governance rail can operate with natural-language artifacts, structured data, code, configuration data, binary payloads, mixed-media objects, vectors, embeddings, field-level records, or combinations thereof. The rail can be applied before a model consumes an artifact, after a model produces a derived artifact, before a queue or schedule is committed, and again before any later side effect occurs.

In some embodiments, an artifact can be partially authority-bearing. In some embodiments, different fragments of the same artifact can be assigned different admission states. In some embodiments, an authority-bearing artifact for one principal class or one environment can be context-only or authority-ineligible for another principal class or environment.

In some embodiments, the system generates not only receipts but also machine-checkable proofs, witness signatures, transparency-log references, attestation envelopes, or tamper-evident ledger records that bind a decision to a specific artifact version, policy state, or permitted-use binding.

All modules described herein can share processors, stores, and communication links or can be distributed across cooperating machines. The ordering of steps described herein is exemplary. In various embodiments steps can be reordered, partitioned, combined, repeated, or conditionally omitted without departing from the claimed subject matter, except where express ordering is recited in a claim.

Unless explicitly required by a claim, the examples herein are not limited to any particular naming convention, trust-tier scheme, workspace count, receipt format, promotion rule, signature scheme, or storage architecture. The claims are intended to cover equivalents and variants consistent with their language and the present disclosure.

1. Memory, Learning, and Governance-State Update Control

In some embodiments, a write to long-term memory, a retrieval index, an embedding store, a prompt cache, a safety-state store, a ranking model, a tool-prioritization model, a policy-candidate store, a policy store, a fine-tuning queue, or a training corpus is treated as a governed side effect. An external context artifact or derived artifact can therefore be prevented from altering future system behavior unless the applicable admission, promotion, and revalidation conditions are satisfied.

Restrictions can propagate not only to human-readable derived artifacts but also to embeddings, labels, ranked items, extracted facts, feature vectors, synthetic training examples, cached tool arguments, or other machine-consumable derivatives. Example propagated indicators include no-authorize, no-redisclose, no-train, no-policy-update, no-memory-write, environment-limited, or recipient-limited indicators.

In some embodiments, a policy candidate, allowlist candidate, safety-rule candidate, or model-behavior candidate derived from an external context artifact is stored in a non-authoritative workspace by default and may be promoted only through a separate promotion flow that is stricter than ordinary informational use. Thus, an external note, retrieved document, or relayed message cannot directly rewrite the policy that determines its own future authority.

In some embodiments, later retrieval or later learning use of a stored derivative remains subject to the lineage, authority map, and permitted-use bindings associated with the originating artifact, thereby preventing laundering of restricted content through long-lived memory or model-adaptation pathways.

In some embodiments, each governed write to a future-behavior store creates a derivative-write record bound to one or more source artifact identifiers, source digests, selector-set digests, inherited restrictions, applicable policy-state identifiers, and one or more no-train, no-policy-update, no-memory-write, no-redisclose, or similar indicators. The derivative-write record can further identify the specific memory entry, embedding, reranker feature, cached argument, ranking label, policy candidate, or training example created from the governed source.

In some embodiments, later correction, withdrawal, revocation, support-state change, or source-digest change can trigger one or more machine actions with respect to the derivative-write record, including tombstoning, cache invalidation, reindexing, purge scheduling, training-exclusion marking, quarantine, or recomputation before the derivative is again permitted to influence later retrieval, ranking, recommendation, planning, or policy behavior.

In some embodiments, recall-time or reuse-time processing compares the then-current source and policy state against the derivative-write record so that a machine-consumable derivative need not gain broader governing effect merely because it has been compacted, embedded, reranked, deduplicated, or rewritten.

1A. Future-Behavior Influence Maps, Training-Exclusion Manifests, and Clawback Work Orders In some embodiments, when a source artifact or derived artifact influences a long-term memory object, retrieval object, embedding record, ranking feature, policy candidate, training example, fine-tuning input, prompt cache entry, or other future-behavior object, the system generates or updates an influence map identifying one or more downstream dependency sets, derivative-write references, affected future-behavior stores, and one or more associated scope, restriction, freshness, or policy values.

When a source artifact or derived artifact is later corrected, withdrawn, revoked, superseded, selector-mismatched, policy-ineligible, or otherwise shown to be outside then-current granted scope, the system can generate a training-exclusion manifest, an unlearning work order, a derivative-quarantine epoch, a rollback-domain indicator, a recomputation requirement, a reuse-block reason, or a residual-influence status associated with one or more affected future-behavior objects.

In some embodiments, later retrieval, reuse, ranking, policy promotion, training use, fine-tuning use, or other future-behavior use of a previously influenced object remains denied, held, downgraded, quarantined, tombstoned, reindexed, recomputed, or otherwise limited until the applicable influence-map correspondence, exclusion state, unlearning state, rollback state, or recomputation state satisfies then-current policy.

In some embodiments, verifier kit 205 or another assurance export includes an influence-map view, a downstream-dependency view, a training-exclusion proof, an unlearning-work-order reference, a derivative-quarantine result, a rollback-completion result, or a residual-influence result sufficient to permit later verification that a future-behavior update remained within granted scope or was appropriately clawed back when continued downstream influence became non-compliant.

G. Standalone Aspect Summaries

In one standalone derivation-control embodiment, a computer-implemented propagation-governance system maintains lineage between an external context artifact and one or more derived artifacts, applies inherited restrictions from the source artifact to the derived artifacts, prevents promotion of a restricted artifact to authority-bearing use unless one or more promotion conditions are satisfied, and binds relay of the artifact or derived artifact to a permitted-use scope when the artifact or derived artifact is sent to a sub-agent, tool, queue, or remote service.

In one standalone effect-bound revalidation embodiment, a computer-implemented execution-use governance system intercepts a candidate side-effecting operation at an effect boundary, identifies one or more source or derived artifacts associated with the operation, rechecks version, admission state, permitted-use scope, and policy state of the artifacts, and either allows, denies, downgrades, or quarantines the operation based on the rechecked conditions while generating a machine-verifiable execution-use receipt bound to the operation and the artifacts.

In integrated embodiments, admission-state assignment, restriction inheritance, relay control, and effect-bound revalidation collectively govern the full lifecycle of context intake, context transformation, context propagation, and side-effecting execution.

In one standalone promotion-manifest embodiment, a computer-implemented promotion system generates or verifies a promotion manifest bound to one or more source or derived artifact identifiers, selector-set digests, transformation identifiers, parameter or action classes, approver or reviewer classes, quorum or freshness conditions, policy-state identifiers, and revocation handles, and permits promotion to authority-bearing use only when current correspondence to those bound conditions is satisfied.

In one standalone relay-envelope embodiment, a computer-implemented carriage system propagates a source artifact or derived artifact with a relay envelope bound to sender-runtime identity, intended recipient class, trust-domain binding, hop or fan-out limits, replay-protection data, and one or more session, channel, or attestation conditions, and requires a downstream runtime to compute an effective usable scope as an intersection of upstream granted scope, selector-scoped source restrictions, and downstream local policy before authority-bearing use.

In one standalone snapshot-governance embodiment, a computer-implemented deferred-execution system resolves a live pointer to a snapshot record, applies one or more freeze-on-schedule, freeze-on-dispatch, or snapshot time-to-live conditions, and requires a reservation-to-execution chain and then-current snapshot validity before a scheduled, queued, or replayed operation can cross an effect boundary.

In one standalone future-state-governance embodiment, a computer-implemented future-state-conditioned decision-state control system obtains a future-state evaluation object distinct from raw model output, verifies whether the object corresponds to an eligible future-state configuration including one or more model, data, lineage, checkpoint, policy, scope, or freshness conditions, evaluates one or more machine-readable uncertainty controls applicable to a candidate downstream action, generates a future-state governance receipt, stores a future-state-conditioned qualifier in a decision-state record, and permits, holds, denies, or marks reforecast-required the candidate downstream action according to the stored qualifier.

In some embodiments, standalone future-state governance can be practiced independently of admission-state assignment for external context artifacts, and a future-state evaluation object need not itself be received as an external context artifact in order to be governed under future-state governance controls including receipt issuance, decision-state assignment, freshness, uncertainty-budget, or reforecast controls.

In some embodiments, standalone future-state governance further stores dependencies among future-state evaluation objects, covariate manifests, feature-lineage records, checkpoint identifiers, and candidate downstream actions so that stale conditions, challenge events, or reforecast requirements propagate in an action-scoped manner without requiring indiscriminate global invalidation.

In one standalone future-behavior-store embodiment, a computer-implemented governance system treats writes to memory stores, retrieval indexes, embedding stores, ranking stores, policy-candidate stores, or training stores as governed side effects, creates derivative-write records preserving lineage to source selectors and inherited restrictions, and blocks, narrows, or claws back later influence when source, support, or policy state changes.

In one standalone verification-output embodiment, a computer-implemented policy-composition and verification system composes one or more policy overlay sets according to precedence, deny-wins, rollback, or revocation rules, evaluates one or more conformance vectors, and generates a verifier kit sufficient to reproduce whether a selected admission, promotion, relay, snapshot, publication, or execution-use decision remained within granted scope.

In one standalone publication-governance embodiment, a computer-implemented content-governance system stores selector-scoped editorial lineage and support states for a candidate content item or publication derivative, computes channel-specific permitted-use scope for a selected publication boundary, and denies, holds, downgrades, or limits external presentation when required source support, review freshness, disclosure state, or correction state is not satisfied.

In one standalone representation-governance embodiment, a computer-implemented transformation system converts an external context artifact into a typed inert representation, stores an authority map identifying fragment-level scopes, and exposes the typed inert representation rather than raw operative content to downstream reasoning or retrieval components while preserving linkage to the source artifact and source restrictions. The system can further bind the representation to a canonical selector form, selector-set digest, transformation digest, or support-state indicator so that later promotion, relay, publication, or revalidation remains machine-comparable across transformed representations.

In one standalone workspace-governance embodiment, a computer-implemented governance system generates or verifies a workspace scope manifest identifying one or more repositories, branches, folders, file trees, drives, data rooms, object collections, pointer targets, or other bounded workspace scopes, determines an enumeration permit for listing, crawling, inventorying, or otherwise inspecting availability of governed objects, separately determines a dereference permit for opening, reading, fetching, materializing, checking out, or exporting one or more governed objects or selected portions thereof, and prevents authority-bearing use of underlying content when enumeration visibility exists without corresponding dereference authority or when then-current pointer, snapshot, selector, scope, or policy correspondence is absent.

In one standalone managed-agent-governance embodiment, a computer-implemented managed-agent coordination system governs one or more managed-agent control-plane objects and one or more local-agent enrollment records, treats roster admissions, work-item transitions, board-state transitions, assignments, reassignments, and local-runtime registration acceptances as governed acceptance events, and denies, holds, narrows, downgrades, or blocks later task acquisition, queue eligibility, queued dispatch, or execution use when then-current capability, selector, session, heartbeat, lease, registration, or policy correspondence is unsatisfied.

In some embodiments, standalone managed-agent governance can be practiced independently of external-context admission-state assignment while still preserving fail-closed treatment for managed-agent coordination, task acquisition, queue eligibility, and execution eligibility under then-current enrollment and control-plane correspondence conditions.

In one standalone authorization-carriage embodiment, a computer-implemented relay system generates an authority capsule bound to one or more artifact versions, fragment selectors, permitted action classes, parameter constraints, recipients, environments, expiration conditions, and integrity data, and a downstream runtime verifies the authority capsule and a local policy-compatibility result before permitting authority-bearing use. The authority capsule can be generated from or coordinated with a promotion manifest, relay envelope, or runtime-attestation result and may be rejected, narrowed, or rewrapped when replay-protection or session correspondence fails.

In one standalone capability-harmonization embodiment, a computer-implemented governance system transforms one or more provider-specific connector descriptors, tool definitions, invocation schemas, capability advertisements, session-resume objects, background-task objects, or remote-service descriptors into one or more normalized capability records, verifies one or more invocation-dialect translation records, coordinates one or more delegated credential objects or credential lease records governing non-export credential use, computes an effective usable scope according to an intersection of upstream granted scope, normalized capability scope, selector-scoped restrictions, credential-governance scope, and downstream local policy, and denies, narrows, rewraps, downgrades, or blocks authority-bearing use when then-current runtime-family, provider-class, translation, credential, lease, session, or policy correspondence is absent.

In one standalone policy-compatibility and verification-profile interoperability embodiment, a computer-implemented governance system identifies a source policy-pack posture for a provider-specific machine-consumable derivative, promoted object, or relay object, identifies a destination verification profile for a destination runtime or other relying party, determines a provider-neutral compatibility verdict according to outcome-normalization and relying-party-class rules, generates a portable verification bundle and a verifier result receipt, and denies, narrows, downgrades to advisory-only use, holds, rejects, or reissues downstream acceptance when then-current profile, policy-pack, selector, transformation, review-state, or context-of-use correspondence is absent.

In some embodiments, the portable verification bundle is selective-disclosure capable and can be used by a downstream policy-consumer rail to verify compatibility for procurement, partner exchange, certification, insurance, or regulator-facing use without requiring disclosure of full governed content or underlying credential material.

In one standalone deferred-execution embodiment, a computer-implemented execution system issues a single-use execution authority token after revalidation, requires presentation and consumption of the token at an effect boundary, and separately treats memory writes, policy updates, queued jobs, or scheduled jobs as governed side effects subject to the same or stricter revalidation requirements. The system can further generate token-consumption proofs and actual-versus-authorized comparison results for use in later verification, compensating control, or audit export.

In one standalone commit-correspondence embodiment, a computer-implemented execution system issues an execution authority token bound to one or more runtime-family descriptors, provider-class descriptors, invocation-dialect translation-record digests, delegated credential object references, credential lease record identifiers, session-authority digests, endpoint-class values, or other interface-bound correspondence values, requires presentation and consumption of the token at an effect boundary, generates a token-consumption proof, a credential-consumption proof, or both, and denies, holds, downgrades, freezes, or requires renewed authority when an actual commit path, actual runtime posture, actual provider posture, actual translated invocation posture, or actual delegated credential-use posture fails correspondence with the bound authorized posture.

H. Media, Editorial, and Publishing Pipeline Embodiments

In some embodiments, the disclosed governance rail is deployed in a media, publishing, newsroom, research, or other content-production environment in which one or more source artifacts are used to prepare a candidate content item for external presentation. Example source artifacts include press releases, analyst notes, interview transcripts, public-web source materials, research memoranda, internal edit notes, source comment logs, structured fact tables, uploaded source packets, prior published articles, and mixed-format content packages.

A candidate content item can include, without limitation, a draft article, short-form news item, feature draft, headline draft, dek, excerpt set, caption set, script, fact sheet, answer draft, summary card, or other human-readable or machine-generated content artifact prepared for later external presentation, syndication, or downstream republication.

Admission and classification can assign admission states to the source artifacts before drafting or before later editorial use. Thus, a mutable press release, unsigned analyst note, externally editable source file, or machine-retrieved research packet can be admitted as context-only, quarantined, held, or otherwise restricted even though selected descriptive content remains available for bounded reasoning, summarization, or editorial review.

In some embodiments, derivation controller 124 stores editorial lineage linking the candidate content item to one or more source artifact identifiers, source digests or versions, selector sets, transformation identifiers, and inherited restrictions. The editorial lineage can be whole-item, section-level, paragraph-level, sentence-level, claim-level, caption-level, field-level, or assertion-level, and can distinguish supported assertions, unsupported assertions, quoted material, attributed material, or conditionally releasable material within the same candidate content item. The editorial lineage can additionally store support-state codes or transition identifiers distinguishing supported, quoted-supported, attributed-supported, conditionally releasable, unsupported, corrected, withdrawn, superseded, or similar states for a selected assertion or segment.

A publication effect boundary can occur when the candidate content item or a publication derivative is committed to a content-management-system draft state having outward exposure, a review state, a publication queue, a syndication queue, a scheduled release object, a newsletter object, a push object, a chatbot or answer surface, or any other channel from which external recipients can receive, retrieve, or rely upon the content. In some embodiments a save, dispatch, schedule, queue-insertion, or publish-flag operation is itself treated as an effect boundary when it materially configures a later external presentation.

Before permitting the candidate content item to cross a publication effect boundary, revalidation engine 130 can recheck current source digests or versions, selector-scoped support, admission states, inherited restrictions, disclosure conditions, review conditions, revocation state, and policy state. If a required source selector is unresolved, a source digest changed after drafting, a quoted portion is no longer within granted scope, or a required promotion condition or approval quorum is absent, the candidate publication operation can be denied, held, downgraded, or limited to a narrower channel, recipient class, or disclosure class. Review conditions can include review freshness windows, reviewer-class correspondence, or approval-epoch correspondence so that an earlier approval does not automatically authorize a later publication derivative prepared against a changed source or policy state.

In some embodiments, one or more editorial approvals, fact-check approvals, or legal-review approvals function as promotion conditions or threshold approvals without converting the disclosed architecture into a merely human workflow. The governance rail can require machine-verifiable evidence that such approvals were satisfied and remain fresh for the then-current source set, selector set, and policy state before allowing publication-bearing or disclosure-bearing use.

Receipt generator 134 can generate a publication-bound execution-use receipt or other integrity-protected publication record identifying the candidate content item, one or more source artifact identifiers, one or more selector sets or support maps, publication-boundary type, review state, policy-state identifier, outcome code, and integrity data. The resulting record can be exported for newsroom assurance, audit, dispute resolution, correction workflows, partner diligence, or regulator-facing review.

I. Channel-Specific Publication Derivatives and Disclosure-Gate Control

In some embodiments, a first derived content item gives rise to multiple publication derivatives corresponding to different external-presentation channels. Example publication derivatives include a homepage card, headline, dek, teaser, alert text, newsletter blurb, syndication object, summary card, search result snippet, chatbot answer fragment, social caption, short-form script, translated variant, or audio or video summary derived from the same underlying draft or source set.

The governance rail need not treat all publication derivatives as equivalent. A selector set, permitted-use binding, recipient class, channel class, or disclosure class associated with a long-form article can differ from that of a headline, alert, or chatbot answer even when the outputs share common source artifacts. Approval, promotion, or revalidation for one channel therefore does not by itself authorize commitment to another channel. Channel-specific scope can additionally depend on audience class, jurisdiction, monetization state, partner scope, embargo status, or disclosure freshness even where two derivatives share text or selector lineage.

In some embodiments, propagation controller 126 and disclosure gate 166 enforce channel-specific scope by preventing a publication derivative from carrying assertions, implications, or emphasis that exceed the selector-scoped support or permitted-use scope associated with the underlying source artifacts or draft segments. A summary, headline, alert, caption, or answer fragment therefore does not become authorized merely because related content appeared in a broader article body or draft workspace.

Channel-specific governance can additionally depend on recipient class, audience class, jurisdiction, time window, embargo state, disclosure state, monetization state, or partner scope. A candidate content item or publication derivative that is permissible for internal review, bounded research use, or one subscriber-facing channel can remain held, downgraded, or denied for another external-presentation channel until separate conditions are satisfied.

In some embodiments, relay envelope 198, authority capsule 193, or permitted-use binding 192 accompanies a publication derivative to a downstream distribution component, syndication partner, render service, notification service, search surface, recommendation surface, or other delivery runtime. The downstream component can compute an effective usable scope as an intersection of upstream granted scope, selector-scoped inherited restrictions, and downstream local policy so that syndication or downstream distribution does not inflate privilege.

Disclosure gate 166 can separately govern whether a publication derivative must be accompanied by one or more machine-readable or human-readable disclosures, notices, explanation fields, or provenance indicators before release. Such disclosures can concern, by way of example, use of external source classes, research-assist tools, review status, supported-scope limitations, or channel limitations, without requiring the claims to be limited to any particular disclosure text or consumer interface.

If a publication derivative is regenerated, translated, reformatted, excerpted, shortened, expanded, or otherwise transformed after an earlier approval event, the resulting derivative can be treated as a new derived artifact 182 requiring fresh lineage, fresh selector-scope comparison, and fresh revalidation before later external presentation.

J. Content-Publishing Memory, Retrieval, Ranking, and Training Governance

In some embodiments, writes from source artifacts, candidate content items, publication derivatives, fact tables, editorial notes, or machine-generated summaries into a newsroom memory store, retrieval index, embedding store, reranker cache, recommendation model, answer corpus, training corpus, correction memory, policy-candidate store, or other future-behavior store are treated as governed side effects under effect-bound revalidation and execution-use governance.

A restricted or unsupported source artifact does not gain broader future-governing effect merely because it is rewritten as a memory summary, extracted fact set, embedding, reranker feature, ranking label, source-digest table, cached answer, or editorial suggestion object. Chunk lineage map 200 can preserve linkage from such machine-consumable derivatives back to source selectors, source digests, admission states, inherited restrictions, and no-train, no-memory-write, no-policy-update, no-redisclose, or similar indicators. In some embodiments, a derivative-write record identifies the specific newsroom memory object, embedding, reranker feature, recommendation feature, answer fragment, or policy candidate created from the source.

In some embodiments, later retrieval, reranking, recommendation, summarization, or answer generation based on stored newsroom derivatives remains subject to selector-scoped revalidation. Thus, a stale or superseded press release, a corrected source excerpt, a restricted interview transcript, or a withdrawn research note can be prevented from influencing later article generation, answer synthesis, recommendation, or policy behavior after a change in source state, selector state, or policy state. A later correction, withdrawal, or support-state change can therefore trigger tombstoning, reindexing, purge scheduling, training exclusion, or recomputation before the stored derivative is again permitted to influence later behavior.

A candidate editorial policy, ranking heuristic, style template, source-priority rule, allowlist candidate, or model-adaptation object derived from an external context artifact can be stored in a non-authoritative workspace by default and promoted only through a separate promotion flow that is stricter than bounded informational use. External source material therefore need not be allowed to rewrite the very policy or ranking logic that governs later publication authority.

In one example content-publishing workflow, a press release and an analyst note are admitted as context-only source artifacts for bounded draft generation, a candidate article and a headline draft are generated therefrom, editorial lineage is stored linking selected assertions to source selectors, and revalidation at a publication effect boundary detects that one source artifact changed or that a required selector no longer supports a headline phrase. The governance rail can then hold or downgrade the headline while allowing a narrower derivative or corrected article body to proceed.

In another example content-publishing workflow, a candidate article that was permissible for internal review is later transformed into a newsletter blurb, a push alert, and a chatbot answer fragment. Channel-specific permitted-use bindings and disclosure conditions are computed for each derivative, and a downstream delivery component is required to verify any associated relay envelope 198 or authority capsule 193 before external presentation is committed.

In some embodiments, verifier kit 205 and conformance vector set 203 include publication-specific assurance artifacts sufficient to test or demonstrate fail-closed behavior for source-to-draft laundering, unsupported-assertion publication, stale-source publication, channel-scope escape, redisclosure beyond granted scope, newsroom-memory contamination, or training-write contamination. Such outputs can support platform assurance, procurement diligence, insurer review, correction workflows, partner integration, or licensing demonstrations.

K. Philanthropic, Charitable-Giving, Grantmaking, and Public-Benefit Disbursement Embodiments In some embodiments, the disclosed governance rail is deployed in a philanthropic, charitable-giving, grantmaking, donor-advisory, or other public-benefit disbursement environment in which one or more external context artifacts are used to prepare, constrain, verify, route, or authorize a candidate donation submission, grant recommendation, beneficiary designation, donor-advised disbursement, or nonprofit-endpoint interaction for later external commit.

Example external context artifacts in such environments can include charity-registry records, nonprofit-profile packets, beneficiary attestations, program descriptions, impact summaries, grant restrictions, sanctions- or watchlist-screening results, jurisdictional-eligibility records, cross-border diligence packets, donation endpoint descriptors, payment-platform metadata, public appeals, donor preference objects, advisor notes, foundation guidance records, and mixed-format source bundles relating to one or more charitable entities, beneficiaries, causes, or funding paths.

A candidate public-benefit disbursement object can include, without limitation, a donation submission object, pledge object, grant recommendation package, grantmaking instruction, donor-advised disbursement object, beneficiary-routing object, destination-selection object, impact-bound routing object, or other human-readable or machine-generated object prepared for later external commitment. A donation submission, pledge activation, grantmaking instruction dispatch, beneficiary designation, destination-endpoint handoff, payment-platform handoff, or other funding-route commit can each constitute an effect boundary when it would cause, commit, or materially configure a later external transfer, authorization, or beneficiary-affecting operation.

Admission and classification can assign admission states to such source artifacts before donor-facing use, advisor-facing use, machine-agent use, or later authority-bearing use. Thus, a public appeal, machine-generated cause summary, nonprofit profile, unsigned diligence packet, mutable registry extract, or externally editable donation-surface descriptor can be admitted as context-only, quarantined, held, or otherwise restricted even though selected descriptive content remains available for bounded reasoning, matching, comparison, explanation, or recommendation.

In some embodiments, selector-scoped or field-scoped governance distinguishes among a charitable brand name, a legal-entity identifier, a registry identifier, a tax-status field, a beneficiary class, a program or use-of-funds scope, a destination account or endpoint identifier, a review state, a freshness value, or a jurisdictional-eligibility field within the same artifact or artifact set. A charitable entity therefore does not become authority-bearing merely because an abbreviated label, rendered badge, public-facing page, or summary card appears to correspond to a valid nonprofit, beneficiary, or funding path absent then-current correspondence to the governed source scope.

In some embodiments, when a public-benefit disbursement object or derived artifact is relayed to a nonprofit site, donation API, payment platform, donor-advisory runtime, foundation workflow, or other downstream service, relay envelope 198, authority capsule 193, permitted-use binding 192, or another governed object further binds one or more permitted action classes, recipient classes, endpoint identifiers, schema or interface-profile identifiers, trust-domain conditions, and revalidation obligations. A downstream machine agent or service can therefore require machine-verifiable correspondence between the candidate disbursement object and a then-current permitted nonprofit or payment endpoint rather than inferring authority from narrative text, a rendered page, or a previously cached interaction surface.

In some embodiments, promotion to authority-bearing use for a public-benefit disbursement object is evidence-bearing and scope-narrowing by default. A promotion request can identify one or more relying-party classes, one or more evidence-purpose digests, one or more beneficiary or impact scopes, one or more endpoint or destination bindings, one or more jurisdictional scopes, and one or more freshness or review conditions so that exploratory donor guidance, advisory analysis, or recommendation use does not by itself authorize a later donation commit, grant dispatch, or beneficiary-affecting handoff.

Before permitting a candidate public-benefit disbursement object to cross an effect boundary, revalidation engine 130 can recheck one or more current charity-identity correspondences, beneficiary-provenance results, destination correspondences, endpoint correspondences, jurisdictional-eligibility results, review-freshness conditions, diligence-expiry conditions, permitted-use bindings, revocation states, and policy states. If a required correspondence fails, execution boundary gate 128 can deny, hold, downgrade, quarantine, reroute, or require renewed authority before external commitment.

In some embodiments, receipt generator 134 and verifier kit 205 support machine-readable explanation of charitable deny, hold, downgrade, reroute, or permit outcomes without requiring disclosure of full donor, beneficiary, nonprofit, or diligence content. Example outcome classes can include charity-identity mismatch, beneficiary-provenance insufficiency, donation-endpoint mismatch, destination-binding failure, jurisdiction-ineligible treatment, diligence-expired treatment, impact-scope mismatch, interoperability-profile failure, misuse-signal hold, or renewed-authority-required treatment.

In some embodiments, writes from source artifacts, recommendation objects, routing objects, donation-surface descriptors, beneficiary profiles, or public-benefit disbursement objects into donor-guidance stores, nonprofit-ranking stores, cause-matching stores, routing models, interoperability registries, answer corpora, recommendation models, policy-candidate stores, training corpora, or other future-behavior stores are treated as governed side effects. A restricted, stale, mismatched, or later-withdrawn charitable source therefore does not gain broader future-governing effect merely because it has been rewritten as a match score, ranking label, routing suggestion, summary, embedding, or cached recommendation object.

In one example workflow, a nonprofit profile, a charity-registry extract, a cross-border diligence packet, and a machine-generated recommendation are admitted for bounded donor guidance. The recommendation remains context-only by default, selector-scoped lineage links a candidate donation object to one or more underlying source selectors, and a later donation submission request is intercepted at an execution boundary gate. Revalidation then detects that either a destination endpoint changed, a beneficiary-provenance condition failed, a diligence result expired, or a charity-identity correspondence became insufficient, and the governance rail correspondingly denies, holds, downgrades, or reroutes the candidate submission rather than permitting commit on the basis of stale or over-broad charitable context.

In some embodiments, verifier kit 205 and conformance vector set 203 include philanthropic-assurance artifacts sufficient to test or demonstrate fail-closed behavior for charity-identity drift, beneficiary rebinding, donation-endpoint substitution, cross-border diligence expiry, impact-scope escape, recommendation-laundering into authority-bearing use, relay to an unapproved nonprofit surface, or misuse-oriented routing attempts. Such outputs can support donor-assurance workflows, foundation or advisor diligence, nonprofit-platform integration, partner review, insurer review, regulator-facing review, procurement diligence, or licensing demonstrations.

APPENDICES

The appendices that follow provide exemplary terms, vocabularies, record structures, selector structures, deployment embodiments, assurance outputs, reference numerals, and content-publishing extensions that may be used independently, in subcombination, or in integrated embodiments of the disclosed governance rail.

Unless expressly recited in a claim, no appendix, appendix field, example state, example reason code, optional output structure, or appendix-specific arrangement is required in every embodiment and no appendix is intended to import limitations into the claims. Overlap among appendix terms, fields, or records is provided for explanatory convenience and interoperability and does not require copresence, identical implementation, or any particular storage layout, serialization format, or deployment topology.

Appendix A—Glossary of Exemplary Terms

The following glossary is exemplary and non-limiting. Unless expressly recited in a claim, the glossary does not import limitations into the claims. The glossary is arranged alphabetically.

Accelerator-pool descriptor—a machine-readable descriptor identifying one or more governed accelerator groups within an execution cluster and optionally further identifying accelerator class, capacity class, locality, trust-domain posture, freshness, isolation, or admission constraints applicable thereto.

Acceptance boundary—a machine-governed boundary at which a downstream component determines whether a presented object will be accepted as verified, compatible, or eligible for authority-bearing use, evidence-bearing use, advisory-only use, narrowed use, or another governed downstream posture, the acceptance boundary being distinct from an effect boundary in embodiments where no immediate side effect is committed.

Act mode—a mode in which a protected execution event may proceed only after satisfaction of one or more designated act-mode predicates, such as a live execution permit, a current confirmation digest, a sponsor-binding condition, a freshness threshold, a trust-domain compatibility result, or a category-specific escalation rule.

Act window—a bounded time interval, freshness interval, or execution interval within which a protected act-mode transition or execution event remains authorized after a designated confirmation, permit, or policy evaluation.

Action-relevant field—a field, value, segment, parameter, identifier, recommendation, code element, endpoint value, schedule value, quantity value, or other machine-usable output element capable of influencing authorization, parameterization, routing, disclosure, connector activation, tool invocation, memory update, policy update, queued dispatch, effect-bound execution, or another downstream-governing use.

Admission receipt—a machine-readable record bound to an external context artifact and indicating an admission decision, one or more inputs to the decision, and integrity data associated with the decision.

Admission state—a machine-readable governance state assigned to an external context artifact, a transformed representation thereof, or one or more fragments thereof, indicating treatment such as deny, quarantine, context-only, authority-bearing, hold, or downgraded-authority.

Agent registration record—a machine-readable record identifying admission, registration, re-registration, or current governed status of an agent or agent runtime and optionally further identifying one or more runtime-family descriptors, provider-class descriptors, capability-manifest references, executable or measurement digests, session values, lease values, heartbeat values, registration epochs, revocation handles, selector correspondences, or integrity data.

Agent roster object—a machine-readable control-plane object identifying one or more agents, sub-agents, tools, runtimes, or human supervisors and optionally further identifying one or more role classes, availability states, assignment scopes, capability-manifest references, session values, lease values, freshness values, registration references, or integrity data for governed coordination within a managed-agent platform.

Allowed relying-party class—a machine-readable class, set, or identifier specifying which downstream runtime, tool provider, remote service, partner, auditor, insurer, regulator, procurement consumer, or other relying party is permitted to rely on a selected governed object, portable verification bundle, verifier result receipt, or other assurance export.

Artifact identifier—a machine-readable identifier bound to an external context artifact, a derived artifact, or a version thereof.

Artifact record—a stored record associated with an artifact identifier and containing one or more of provenance evidence, mutability state, trust tier, authority eligibility, admission state, reason codes, digests, timestamps, policy-pack identifiers, or receipt references.

Artifact-set coherence record—a machine-readable record identifying an artifact set associated with a common candidate execution operation, decision, disclosure event, submission event, policy update, or other downstream-governing use, and further identifying one or more member artifact identifiers, member digests or version indicators, selector references where applicable, one or more contradiction, completeness, or corroboration results, one or more coherence reason codes, and a coherence verdict.

Assignment-state record—a machine-readable control-plane record identifying assignment, reassignment, release, ownership, responsibility, reviewer designation, or other governed task-allocation state for one or more work-item objects and optionally further identifying one or more selector correspondences, capability-manifest references, session values, lease values, freshness values, policy-state values, registration references, or integrity data sufficient to determine whether a later task acquisition, route, queue eligibility, or execution use remains within governed scope.

Authority capsule—a machine-readable authorization object bound to one or more artifact identifiers, versions or digests, fragment selectors, permitted-use scopes, conditions, and integrity data.

Authority eligibility—a determination indicating whether an external context artifact or derived artifact is permitted to influence authorization of a candidate execution operation.

Authority map—a machine-readable map identifying which fragments, fields, spans, regions, or views of an artifact or transformed representation are eligible for which uses.

Authority-bearing artifact—an artifact that is eligible, within defined scope, to influence authorization of a candidate execution operation.

Authority-shadow view—a machine-readable view or transformed representation derived from an artifact and bounded to one or more selectors or permitted-use scopes for downstream authorization, relay, or revalidation use while remaining distinct from raw artifact content.

Board-state object—a machine-readable control-plane object representing one or more board columns, lanes, queues, issue states, status transitions, assignment states, or coordination states for one or more work-item objects, and optionally further identifying selector correspondences, capability-manifest references, session values, lease values, freshness values, review-state values, policy-state values, or integrity data sufficient to determine whether a later transition, task acquisition, route, or execution-use remains within governed scope.

Branch-state record—a machine-readable record associated with a hypothetical, simulated, exploratory, scenario-specific, branch-specific, or draft-only posture and identifying one or more branch identifiers, optional parent-branch references, branch-local assumptions, branch-local decision-state values, source or selector correspondences, freshness values, or linkage values sufficient to distinguish branch-local posture from a live authority-bearing posture.

Beneficiary provenance record—a machine-readable record identifying or characterizing a designated beneficiary, beneficiary class, program, or use-of-funds recipient and evidencing one or more relationships among the beneficiary, a charitable entity, a donation destination, a program restriction, a review state, or a governing diligence posture.

Bounded execution-use representation—a transformed or selector-scoped representation permitted to be used for specified effect classes, relay classes, or revalidation purposes without conveying broader authority than is expressly granted.

Canonical submit-surface digest—a machine-readable digest or other correspondence value identifying a governed submit surface, form-commit surface, or other effect-bearing interface posture, optionally bound to one or more rendered-field correspondences, hidden-field correspondences, interface-state values, endpoint values, origin values, tenant or account values, or ordered interaction-step values, such that later commit depends on then-current correspondence rather than on presentation-level similarity alone.

Candidate execution operation—an operation proposed for execution and capable of causing, committing, or materially contributing to a side effect.

Charitable misuse/fraud denial code—a machine-readable reason code indicating that a candidate public-benefit disbursement object is denied, held, downgraded, quarantined, rerouted, or otherwise restricted because one or more misuse, impersonation, diversion, over-broad routing, endpoint substitution, or other fraud-related conditions were detected or remained insufficiently cleared.

Charity identity record—a machine-readable record identifying a charitable or nonprofit entity according to one or more legal names, registry identifiers, tax-status identifiers, jurisdiction fields, brand mappings, verified endpoints, or other identity-correspondence values usable in admission, promotion, relay, or revalidation.

Chunk lineage map—a machine-readable mapping linking retrieved chunks, vector entries, reranker outputs, summaries, memory derivatives, or other machine-consumable derivatives to source artifacts, selectors, and inherited restrictions.

Cluster-compatibility record—a machine-readable record identifying whether a requested queue insertion, schedule creation, dispatch, placement, launch, migration, resumption, or other workload operationalization remains compatible with one or more then-current runtime-family, provider-class, partition, node-pool, accelerator-pool, fair-share, preemption, policy, or verification-profile conditions.

Coherence verdict—a machine-readable result indicating whether an artifact set is coherent, coherent_narrowed, contradictory, incomplete, stale_coherence, corroboration_insufficient, insufficiently_correlated, review_required, or otherwise suitable or unsuitable for a selected governed use.

Compatibility verdict—a machine-readable determination indicating whether a source policy-pack posture remains compatible with a destination verification profile for a requested downstream acceptance event, and can identify compatible, compatible_narrowed, advisory_only, evidence_only, incompatible, stale, mismatched, reissue_required, or another governed result.

Confirmation digest—a digest, signed reference, or other machine-verifiable value indicating that a required approval, acknowledgment, summary review, or sponsor confirmation was presented, satisfied, and bound to one or more task, purpose, target, recipient, mode, freshness, or execution-context values.

Context-only artifact—an artifact or representation thereof that may be used for bounded informational or analytical purposes but is not permitted to authorize a candidate execution operation.

Cross-border diligence record—a machine-readable record identifying one or more jurisdictional-eligibility results, sanctions- or watchlist-screening results, corridor restrictions, payment-rail compatibility results, recipient-class conditions, review-freshness values, or other diligence-related correspondence values applicable to a candidate charitable or public-benefit disbursement across jurisdictions.

Cross-view field-binding manifest—a machine-readable manifest binding one or more governed field or region representations across multiple rendered, selector-linked, interface-linked, hidden-field, OCR-linked, accessibility-linked, submit-surface, or other machine-perceivable and machine-usable views of a candidate interaction target, such that later authority-bearing use depends on then-current correspondence across those views.

Decision badge—a machine-verifiable indication of a PASS, HOLD, FAIL, permit, deny, downgrade, or similar verification or revalidation outcome, optionally bound to one or more bundle digests, receipt digests, policy identifiers, profile identifiers, or other integrity-protected references for downstream use.

Discovery-surface descriptor—a machine-readable descriptor identifying a command-line interface, daemon, session manager, local registry, service endpoint, socket endpoint, inter-process communication surface, or another machine-usable discovery or registration surface through which an agent, runtime, or capability advertisement may be detected, enrolled, refreshed, re-enrolled, or revoked, and optionally further identifying one or more protocol, schema, heartbeat, measurement, trust-domain, or attestation conditions applicable thereto.

Delegation chain—a linked sequence of one or more delegation hops extending from a human principal, enterprise principal, policy-bound service account, or other originating authority source to one or more agents, sub-agents, tools, runtimes, queues, connectors, or remote services participating in a governed workflow.

Delegation consumption proof—a machine-verifiable proof or record indicating that a delegated authority state was actually presented, consumed, or matched at an effect boundary for a selected execution event.

Delegation hop—an individual authority-transfer step within a delegation chain, associated with a delegator, a delegate, an authority scope, a purpose limitation, a freshness condition, a re-delegation condition, or any combination thereof.

Delegation receipt—a machine-readable, signed, or otherwise integrity-protected record representing a delegation hop and binding a delegator identity or descriptor, a delegate identity or descriptor, an authority manifest, authority capsule, or authority-scope digest, a purpose digest or task reference, one or more scope-defining classes, a freshness or expiry value, and integrity data.

Delegation-state view—an audience-specific evidence view showing delegated authority, scope reduction, freshness, re-delegation status, revocation state, or lineage state for one or more delegation hops without requiring disclosure of full hidden prompts, internal reasoning traces, or non-essential source content.

Derived artifact—an artifact generated from one or more source artifacts, such as a summary, extracted instruction set, generated plan, delegated task object, policy candidate, embedding record, ranking label, tool argument package, or relayed message.

Donation interoperability credential—a machine-readable credential, profile, descriptor, or bounded authorization object indicating correspondence among a public-benefit disbursement object, a charity identity record, one or more permitted endpoints or interfaces, one or more action classes, one or more recipient classes, one or more scope restrictions, and one or more revalidation obligations for machine-mediated giving.

Downstream policy-consumer rail—a machine-governed intake, acceptance, or verification rail used by a destination runtime, tool provider, remote service, partner, auditor, insurer, regulator, procurement consumer, or other relying party to determine whether a presented object, portable verification bundle, verifier result receipt, or other assurance export is acceptable for a selected downstream use.

Draft artifact digest—a digest or equivalent verifier-usable value representing a non-final candidate message, command, workflow object, approval object, disclosure object, tool invocation package, or other non-final candidate action.

Draft mode—a mode in which a candidate message, command, task package, approval object, disclosure object, or other candidate action may be prepared, but not finally transmitted, committed, approved, executed, or otherwise effectuated.

Draft-to-act consistency view—an audience-specific evidence view showing whether a protected act-mode event was consistent with a previously reviewed, confirmed, or policy-evaluated draft artifact, recommendation artifact, or other non-final candidate action.

Editorial lineage map—a machine-readable mapping linking a candidate content item or publication derivative, or one or more segments thereof, to one or more source artifacts, selectors, support states, review states, or inherited restrictions.

Effect boundary—a boundary at which a side effect would occur, could become externally consequential, would commit the system to later cause such a side effect, or would update a store or model that can govern future behavior.

Evidence ledger—an append-only or integrity-protected store of receipts, records, or proofs associated with artifact admission, propagation, revalidation, or execution-use decisions.

Execution authority token—a machine-readable token issued after revalidation and required to be presented at an effect boundary before an effect-bearing operation is committed.

Execution-use receipt—a machine-readable record identifying an effect-bound decision and one or more source artifacts or derived artifacts associated with the decision.

External context artifact—a prompt template, resource pointer, retrieved document, memory item, markdown artifact, shared note, skill file, tool description, policy pack, policy candidate, embedded resource, delegated task payload, relayed message, structured data record, or other artifact received for potential use by an agentic system.

Fact-support selector—one or more selector expressions identifying source portions sufficient to support a selected assertion, quotation, caption, or summary phrase in a candidate content item or publication derivative.

Fair-share state—machine-readable data identifying one or more relative-share, priority, entitlement, depletion, or scheduling-order conditions applicable to a workload, principal, session, environment, partition, node pool, accelerator pool, or provider class.

Freeze condition—a machine-readable condition indicating whether a pointer, snapshot, reservation record, or deferred job is frozen, when the freeze was established, and what events require thaw, refresh, downgrade, or revalidation before execution.

Guidance overlay representation—a presentation-derived representation corresponding to one or more overlay regions, highlights, focus cues, or other interaction-guidance surfaces associated with one or more source artifacts, selectors, or permitted-use bindings, the guidance overlay representation being insufficient by itself to authorize an effect-bearing action absent a separate governed authority-bearing object.

Impact-bound routing receipt—a machine-readable receipt identifying or binding one or more cause classes, beneficiary classes, program scopes, geographic scopes, use-of-funds scopes, routing conditions, or related correspondence values associated with a candidate charitable or public-benefit disbursement path.

Interaction trace-a machine-readable trace representing one or more previously observed, drafted, simulated, or partially executed interaction events, field interactions, navigation events, or other interaction-related sequence elements, the interaction trace being bindable to one or more source artifact identifiers, derived-artifact identifiers, selector sets, target classes, parameter classes, session values, digests, or lineage values such that later reuse remains within governed scope rather than inheriting broader authority from prior observation or prior successful execution alone.

Interaction transcript—a machine-readable transcript representing one or more interaction-related utterances, descriptions, guidance statements, or other presented interaction content associated with one or more rendered surfaces, selectors, interface-state representations, or source artifacts, the interaction transcript being context-only or otherwise scope-limited unless separately promoted under then-current policy.

Interface-state representation—a machine-readable representation derived from one or more rendered surfaces, interface field views, overlay regions, audio-linked guidance representations, interaction transcripts, or combinations thereof, and bound to one or more source artifact identifiers, source digests, selector sets, transformation digests, support-state indicators, or permitted-use bindings such that later highlighting, guidance, narration, focus cues, or other interaction assistance does not itself broaden authority beyond the governed source scope.

Interface-state snapshot—a machine-readable snapshot of an interface-state representation, or of one or more presentation-linked selectors associated therewith, captured at a selected time and bound to one or more interface-correspondence values, source-correspondence values, selector sets, support-state indicators, permitted-use bindings, timestamps, or freshness conditions such that later authority-bearing use depends on then-current correspondence rather than on prior presentation alone.

Job descriptor—a machine-readable descriptor identifying one or more workload attributes for a queued, scheduled, resumed, replayed, migrated, or otherwise deferred operational derivative and optionally further identifying action class, parameter scope, target scope, selector correspondence, resource request, environment scope, or freshness conditions applicable thereto.

Live execution permit—an execution authority token, permit, approval state, or equivalent verifier-usable authorization state that is current, unexpired, unrevoked, and sufficient under then-current policy to permit transition to act mode or completion of another protected execution event.

Local-agent enrollment record—a machine-readable record identifying admission, enrollment, refresh, re-enrollment, or current governed status of a local or self-hosted agent runtime and optionally further identifying one or more runtime-family descriptors, provider-class descriptors, executable digests, measurement digests, capability-manifest references, workspace-scope values, delegated-credential references, credential-lease references, heartbeat values, refresh values, registration epochs, revocation handles, or integrity data sufficient to determine whether later task acquisition, queued dispatch, board-state transition, or effect-bearing use remains within governed scope.

Managed-agent control-plane object—a machine-readable control-plane object representing or coordinating one or more agent roster objects, work-item objects, issue objects, board-state objects, assignment-state records, status-transition records, comment-linked selector records, attachment-linked selector records, or combinations thereof, and optionally further identifying one or more capability-manifest references, session values, lease values, freshness values, policy-state values, registration references, selector correspondences, or integrity data sufficient to determine whether a later transition, task acquisition, queue eligibility, or execution use remains within governed scope.

Merge manifest—a machine-readable merge-gated authorization object identifying one or more branch identifiers, branch-local assumption digests, branch-to-live correspondence results, source or selector correspondences, action-class or target correspondences, review or approval correspondences where applicable, freshness conditions, policy-state values, and integrity data sufficient to determine whether a branch-local object may transition into a live authority-bearing posture.

Minimization-lineage record—a machine-readable record identifying one or more removed, masked, substituted, generalized, tokenized, bucketized, or retained fields, selectors, values, fragments, or transformed portions associated with a minimization transform, and further identifying one or more source identifiers, selector-set digests, transformation digests, permitted-use bindings, context-of-use constraints, sensitivity classes, freshness values, or integrity data sufficient to determine whether a resulting minimized representation remains within governed scope.

Mode class—an execution classification indicating whether an operation is in read mode, draft mode, act mode, or another policy-distinguished execution state.

Mode-transition record—a machine-readable, signed, or otherwise integrity-protected record representing a transition between mode classes and binding at least a prior mode, a requested mode, an authority-scope digest or authority reference, a task reference or purpose digest, an execution-context digest, and a freshness value, act window, or equivalent bounded execution interval.

Mutability state—a machine-readable state indicating whether an artifact is mutable, version-locked, append-only, immutable, pointer-based, re-fetchable, callback-updated, or otherwise subject to later modification.

No-privilege-inflation rule—a rule requiring propagated authority at a downstream runtime to be no broader than both the upstream granted scope and the downstream locally allowed scope.

Node-pool descriptor—a machine-readable descriptor identifying one or more governed compute-node sets and optionally further identifying capacity class, locality, trust-domain class, runtime-family correspondence, attestation posture, isolation posture, or admission constraints applicable thereto.

Non-transitive delegation—a delegation rule under which a delegate may perform a bounded authorized action but may not further delegate the authority to another agent, tool, queue, workflow, connector, or service unless re-delegation is expressly permitted.

Nonprofit endpoint descriptor—a machine-readable descriptor identifying one or more donation, pledge, grant-making, or other public-benefit interaction endpoints associated with a charitable entity, nonprofit platform, payment surface, or machine-consumable giving interface, and optionally further identifying schema, scope, freshness, or verification conditions applicable thereto.

Outbound invocation package—a machine-readable submission object generated for supplying a transformed representation, authority-shadow view, minimized representation, or other governed representation to a model, runtime, connector surface, tool surface, or remote service for a bounded machine use, the outbound invocation package being bound to one or more source identifiers, selector sets, transformation digests, minimization-lineage values, route-decision values, runtime-family descriptors, provider-class descriptors, context-of-use constraints, allowed output classes, parameter bounds, freshness values, or integrity data.

Outcome-normalization record—a machine-readable record mapping one or more source outcome values, reason codes, or verification results into one or more provider-neutral compatibility classes, destination-profile-compatible outcome classes, or other normalized downstream acceptance values.

Partition descriptor—a machine-readable descriptor identifying one or more governed queue, partition, or scheduling domains within an execution cluster and optionally further identifying placement, isolation, policy, freshness, or admission conditions applicable thereto.

Permitted-use binding—machine-readable data specifying one or more allowed action classes, principals, environments, recipients, or time windows for which an artifact or derived artifact may be used.

Policy overlay—a machine-readable policy layer composed with one or more other policy layers according to precedence, deny-wins, rollback, revocation, or compatibility rules.

Policy pack—a machine-readable set of rules, mappings, thresholds, or governance conditions used in evaluating external context artifacts, promotion conditions, trust tiers, revalidation conditions, or permitted-use scopes.

Policy-compatibility record—a machine-readable record identifying whether one or more source policy-pack posture values correspond to one or more destination verification profile values for a selected downstream acceptance event and can include one or more compatibility verdicts, relying-party-class conditions, selector or transformation correspondences, context-of-use constraints, freshness values, or reason codes.

Policy-consumer rail—a downstream enforcement path, relying component, or control point that conditions promotion, relay, publication, execution, or other effect-bearing use on presentation, validation, or correspondence of one or more receipts, proofs, badges, policy identifiers, profile identifiers, or other machine-verifiable evidence.

Policy-pack exchange object—a machine-readable object representing a source policy-pack posture, destination verification profile, compatibility record, portable verification bundle, verifier result receipt, or another governed machine object usable to exchange policy-relevant verification posture across heterogeneous vendors, runtimes, or relying-party classes.

Policy-pack identifier—an identifier, digest, or version indicator that binds a decision to a specific policy pack or policy-pack version.

Portable verification bundle—a machine-readable assurance export that binds one or more policy-pack identifiers, selector or transformation correspondences, compatibility-verdict values, verification-profile values, or other governed correspondence values in a form usable by a downstream policy-consumer rail and that can be selective-disclosure capable.

Preemption posture—machine-readable data identifying whether, when, or under what conditions a workload may be suspended, displaced, migrated, resumed, renewed, or otherwise reordered and optionally further identifying one or more corresponding freshness, confirmation, revalidation, or consumption conditions.

Profile-negotiation record—a machine-readable record identifying a comparison, mapping, or compatibility determination between a source policy-pack posture and a destination verification profile, including one or more accepted outcome classes, required verification classes, allowed relying-party classes, context-of-use constraints, or reason codes.

Promotion condition—one or more conditions that must be satisfied before an artifact or derived artifact can be promoted from a restricted state to authority-bearing use.

Promotion manifest—a machine-readable promotion record binding source or derived artifacts, selectors, scope, approvals, expiration, revocation, and integrity data to a promotion decision.

Promotion token—a machine-readable record or credential indicating that a promotion condition has been satisfied for a source artifact or derived artifact.

Provenance evidence—machine-usable evidence about the origin, integrity, authenticity, or governance status of an external context artifact.

Public-benefit disbursement object—a machine-readable candidate object representing a donation submission, pledge instruction, grant recommendation, grantmaking instruction, beneficiary designation, disbursement-routing instruction, or other externally consequential charitable or public-benefit operation, whether final or non-final.

Publication derivative—a candidate content item or other derived artifact prepared for a selected external-presentation channel, including a headline, blurb, excerpt, summary card, answer fragment, caption, alert, script, or similar output.

Publication effect boundary—an effect boundary associated with commitment, scheduling, queueing, release, syndication, or other external presentation of a candidate content item or publication derivative.

Publication-assurance bundle—a machine-readable or human-reviewable set of receipts, selector digests, source digests, review states, policy identifiers, proofs, or instructions sufficient to verify one or more publication, syndication, or content-derived future-behavior decisions.

Quarantine—an admission state or workspace treatment in which an artifact is isolated from authority-bearing use pending review, transformation, or other condition.

Re-delegation policy—a rule defining whether a delegate may further delegate authority to another agent, tool, queue, workflow, connector, or service, and if so, under what hop limit, scope-reduction rule, freshness condition, target or recipient restriction, tool-class restriction, or purpose limitation.

Re-delegation-limit view—an audience-specific evidence view showing whether a selected delegation chain, hop set, or downstream authorization event remained within permitted hop, fan-out, scope, freshness, or tool-class limits for re-delegation.

Read mode—a mode in which bounded retrieval, summarization, extraction, ranking, reference generation, provenance generation, or other non-operative processing is permitted while designated protected execution events remain prohibited.

Reason code—a machine-readable code indicating a basis for an admission decision, promotion decision, revalidation outcome, or execution-use outcome.

Relay credential—machine-readable data attached to a propagated artifact or derived artifact indicating source lineage, restriction status, scope limits, or required conditions for downstream use.

Relay envelope—a machine-readable carriage object associated with propagated artifacts or derived artifacts and specifying hop-bound, audience-bound, scope-bound, and revalidation-bound relay conditions.

Reservation record—a machine-readable record describing a proposed future operation without by itself granting unconditional execution authority.

Response artifact—machine-produced content, metadata, code, structured output, tool-call request, citation set, extracted field set, ranking output, or another machine-produced material returned in response to an outbound invocation package and treated as a separately governed artifact having a response-artifact identifier, a response-lineage binding, and one or more provenance, digest, runtime-family, provider-class, policy-state, or review-state values.

Response-support map—a machine-readable map associated with a response artifact and identifying, for one or more selected response fields or response segments, one or more corresponding source artifacts, one or more source selectors or selector-set digests, one or more transformation or extraction references, one or more support-state values, and, where applicable, one or more action-relevant-field indicators, corroboration results, contradiction results, unsupported-field indicators, or grounding reason codes.

Restriction inheritance—a rule by which one or more restrictions associated with a source artifact are applied by default to a derived artifact.

Reusable execution template—a machine-readable derivative representing a reusable or replayable interaction sequence, workflow sequence, or partial execution sequence, optionally parameterized, and bindable to one or more action classes, parameter classes, target classes, selector scopes, session values, runtime-family descriptors, provider-class descriptors, digests, refresh conditions, expiration conditions, or authorization objects such that reuse of the template does not itself confer broader authority absent then-current governed correspondence.

Revocation receipt—a machine-readable, signed, or otherwise integrity-protected record indicating that one or more delegation hops, authority scopes, confirmation predicates, or downstream protected actions have been revoked, invalidated, quarantined, frozen, downgraded, or placed on hold.

Revocation-lineage view—an audience-specific evidence view showing how a revocation state, revocation digest, revocation epoch, or equivalent revocation effect propagated across one or more delegation hops, resumed sessions, queued jobs, tools, or downstream protected actions.

Route-decision record—a machine-readable record identifying a governed routing posture for a transformed representation, authority-shadow view, minimized representation, or other bounded execution-use representation, including one or more permitted model classes, runtime-family descriptors, provider-class descriptors, trust-domain classes, context-of-use profiles, disclosure classes, route outcomes, substitute-route outcomes, reason codes, or integrity data sufficient to determine whether a later submission, relay, disclosure, or commit remains within authorized route scope.

Scheduler-neutral workload admission—a governed authorization posture under which a queued, scheduled, resumed, replayed, migrated, or otherwise deferred workload may be inserted, scheduled, dispatched, placed, launched, or otherwise operationalized according to provider-neutral correspondence values rather than according to any single vendor-specific scheduler syntax or named scheduler implementation.

Selector grammar—a machine-readable grammar or schema for identifying whole artifacts, fragments, fields, attachments, regions, spans, or other selector-scoped portions of an artifact or derived artifact.

Selector set—one or more selector expressions identifying governed portions, views, spans, or regions of an artifact, derived artifact, or transformed representation.

Sensitivity class—a machine-readable classification identifying a disclosure-relevant, governance-relevant, or route-relevant sensitivity posture of a whole artifact, a derived artifact, a selector-scoped portion thereof, a transformed field set, or another bounded representation, the sensitivity class being usable to determine minimization treatment, route eligibility, disclosure scope, provider eligibility, trust-domain eligibility, or another permitted-use constraint.

Skill file—a machine-readable file, package, or other machine-consumable derivative representing one or more reusable interaction sequences, execution templates, tool-usage patterns, or bounded operational capabilities, the skill file being bindable to one or more lineage values, capability-manifest values, action classes, parameter classes, activation-scope values, refresh conditions, expiration conditions, or authorization objects such that installation, activation, replay, or downstream consumption does not itself grant broader authority absent then-current governed correspondence.

Snapshot record—a machine-readable record identifying a resolved snapshot of a pointer-addressed or mutable artifact, including at least one resolution time, digest, source pointer, freeze state, or expiration condition.

Sponsor binding—a machine-verifiable binding between a delegated operation and a sponsoring principal, approver class, reviewer class, or other originating authority whose continued correspondence is required for selected protected actions.

Step-sequence representation—a machine-readable representation of an ordered set of interaction steps, workflow steps, or execution-related transitions capable of being stored, reviewed, relayed, replayed, or transformed into another machine-consumable derivative while remaining bound to applicable lineage, scope, selector, parameter, and authorization constraints.

Status-transition record—a machine-readable control-plane record identifying a transition among one or more statuses, board states, issue states, workflow states, queue states, task states, review states, escalation states, or release states associated with one or more managed-agent control-plane objects, and optionally further identifying one or more selector correspondences, capability-manifest references, session values, lease values, policy-state values, registration references, freshness values, or integrity data sufficient to determine whether a later transition, task acquisition, queued dispatch, or execution use remains within governed scope.

Trust tier—a machine-readable classification reflecting relative trust, authenticity, or governance status of an external context artifact or derived artifact.

Typed inert representation—a transformed representation of an artifact that retains descriptive or declarative content while excluding, neutralizing, or separately retaining authority-bearing or operative content.

Verification bundle—a machine-readable or human-reviewable package comprising one or more receipts, proofs, digests, policy identifiers, selector sets, lineage data, or other evidence sufficient to permit downstream evaluation of one or more admission, promotion, relay, snapshot, revalidation, publication, or execution-use conditions.

Verification profile—a machine-readable profile identifying one or more verification classes, accepted outcome classes, selective-disclosure requirements, freshness requirements, relying-party-class conditions, schema or translation requirements, or context-of-use constraints applicable to downstream acceptance of a governed object, portable verification bundle, verifier result receipt, or other assurance export.

Verifier kit—a machine-readable or human-reviewable set of proofs, records, policy identifiers, test vectors, or instructions sufficient to verify one or more admission, promotion, relay, snapshot, revalidation, or execution-use conditions.

Verifier result receipt—a machine-readable receipt identifying or binding a compatibility verdict, destination verification profile, allowed relying-party classes, context-of-use constraints, selector or transformation correspondences, or other governed values sufficient for a downstream policy-consumer rail to determine whether a presented object remains acceptable for a selected downstream use.

Version monitor—a component that detects or checks version changes of an artifact, pointer target, or associated resource.

Work-item object—a machine-readable control-plane object representing a task, issue, ticket, job, assignment candidate, queued item, review item, escalation item, or other managed-agent coordination unit and optionally further identifying one or more source or derived-artifact identifiers, selector sets, capability-manifest references, session values, lease values, assignee values, board-state references, status-transition references, freshness values, registration references, or integrity data sufficient to determine whether a later task acquisition, queue eligibility, dispatch, or execution use remains within governed scope.

Workflow trace—a machine-readable trace representing one or more ordered workflow steps, branches, dependencies, transitions, or execution-related events associated with preparation, routing, drafting, delegation, replay, or partial execution of a candidate action or reusable derivative, the workflow trace being linked to one or more lineage, scope, selector, parameter, session, or policy-correspondence values.

Workload-admission receipt—a machine-readable receipt identifying one or more workload identifiers, job-descriptor identifiers, runtime-family values, provider-class values, partition correspondences, node-pool correspondences, accelerator-pool correspondences, verification-profile values, outcome codes, freshness values, reason codes, or integrity data associated with a scheduler-neutral workload admission decision.

Workload manager class—a machine-readable descriptor identifying a class of scheduler, queue manager, placement engine, workload manager, or other resource-arbitration control surface without requiring limitation to a named vendor, named scheduler, or named orchestration implementation.

Appendix B—Exemplary Admission States, Trust Tiers, and Reason Codes

This appendix is exemplary and non-limiting and illustrates example governance vocabularies that may be implemented in the systems and methods described herein.

Example admission states include DENY, which blocks operational consumption while optionally retaining evidence; QUARANTINE, which isolates an artifact pending review, transformation, or other condition; CONTEXT_ONLY, which permits bounded informational use while preventing authority-bearing use; AUTHORITY_BEARING, which permits bounded authority-bearing use within defined scope; HOLD, which pauses use pending revalidation or missing evidence; and DOWNGRADED_AU- THORITY, which indicates that an artifact previously treated as more trusted is presently limited to narrower scope.

Example trust tiers include TO for unknown or insufficiently evidenced artifacts, T1 for source-known but insufficiently authenticated or authorized artifacts, T2 for authenticated and version-monitored artifacts, and T3 for authenticated artifacts that are additionally policy-authorized for bounded authority-bearing use. Other tiering schemes, including vector-valued schemes, may be used.

Example reason codes include unsigned_external_policy, mutable_pointer_unlocked, digest_mismatch, source_not_allowlisted, memory_default_context_only, policy_pack_verified, promotion_condition_satisfied, promotion_condition_missing, artifact_version_changed, relay_scope_exceeded, revalidation_required, revocation_hit, canonical_selector_mismatch, promotion_freshness_expired, relay_replay_detected, runtime_attestation_missing, snapshot_expired, policy_epoch_drift, support_state_unsatisfied, actual_parameter_mismatch, derivative_write_clawback_required, and review_freshness_expired.

Appendix C—Exemplary Record, Lineage, and Receipt Fields

This appendix is exemplary and non-limiting and illustrates example fields that can be stored in machine-readable governance records.

Example artifact-record fields include artifact_identifier, source_class, source_channel, source_identity, repository_origin, pointer_origin, current_digest, digest_history, signature_status, witness_status, timestamp_status, mutability_state, version_state, trust_tier, authority_eligibility, admission_state, reason_codes, policy_pack_identifier, permitted_use_binding, workspace_assignment, fragment_selector_set, canonical_selector_form, selector_set_digest, transformation_digest, authority_map_reference, typed_representation_reference, support_state_reference, training_exclusion_indicator, memory_write_scope, created_at, verified_at, and admission_receipt_reference.

Example artifact-set-coherence-record fields include artifact_set_identifier, member_artifact_identifier_set, member_ digest_set, member_version_indicator_set, selector_reference_set, canonical_field_map, contradiction_set, missing_required_field_set, corroboration_class, corroboration_result, completeness_result, coherence_verdict, coherence_reason_code_set, coherence_scope_identifier, freshness_value, invalidation_trigger_set, artifact_set_coherence_receipt_reference, and integrity_data.

Example lineage-record fields include derived_artifact_identifier, source_artifact_identifiers, source_versions, source_admission_states, source_reason_codes, transformation_identifier, transformation_policy_identifier, transformation_digest, inherited_restrictions, derived_fragment_selector_set, selector_set_digest, downstream_policy_compatibility_result, relay_credential_reference, authority_capsule_reference, promotion_token_reference, reservation_record_reference, derivative_write_record_reference, support_state_transition_code, and permitted_use_binding.

Example response-support-map fields include response_support_map_identifier, response_artifact_identifier, response_field_identifier, response_segment_identifier, source_artifact_identifier_set, source_selector_set, selector_set_digest, transformation_reference, extraction_reference, support_state, action_relevant_field_indicator, corroboration_result, contradiction_result, unsupported_field_indicator, output_class_constraint_result, grounding_reason_code_set, revalidation_required_indicator, and integrity_data.

Example branch-state and merge-manifest fields include branch_identifier, parent_branch_reference, branch_local_source_identifier_set, branch_local_selector_set, assumption_digest_set, scenario_input_set, branch_local_decision_state, branch_local_scope_identifier, freshness_value, expiration_condition, merge_manifest_identifier, branch_to_live_correspondence_result, stale_branch_indicator, merge_reason_code_set, branch_state_receipt_reference, and integrity_data.

Example admission-receipt and execution-use-receipt fields include receipt_identifier, artifact_identifier, derived_artifact_identifier, current_digest, effect_boundary_type, revalidation_results, policy_state_identifier, revocation_result, execution_authority_token_identifier, parameter_digest, actual_parameter_digest, actual_target_identifier, actual_recipient_identifier, nonce, token_consumption_status, token_consumption_proof, outcome_code, structured_precondition_failure_reference, post_execution_verification_result, receipt_timestamp, and integrity_data.

Example artifact-set-coherence, response-grounding, field-binding, and branch-merge receipt fields include artifact_set_coherence_receipt_identifier, artifact_set_identifier, coherence_verdict, contradiction_set_indicator, missing_required_field_indicator, corroboration_result, response_support_map_identifier, response_field_identifier, action_relevant_field_indicator, support_state_result, grounding_reason_code_set, field_binding_manifest_identifier, canonical_submit_surface_digest, hidden_field_correspondence_result, submit_endpoint_correspondence_result, branch_state_receipt_identifier, branch_identifier, merge_manifest_identifier, branch_to_live_correspondence_result, outcome_code, receipt_timestamp, and integrity_data.

Example promotion-manifest, relay-envelope, and snapshot-record fields include promotion_manifest_identifier, source_artifact_identifiers, source_digest_set, derived_artifact_identifier, selector_set, selector_set_digest, transformation_digest, allowed_action_class_set, allowed_parameter_class_set, intended_recipient_class_set, environment_scope, approver_set, reviewer_class_set, quorum_state, freshness_window, policy_epoch_identifier, expiration_condition, revocation_handle, relay_envelope_identifier, relay_hop_counter, max_relay_depth, max_fan_out, trust_domain_binding, session_binding_data, channel_binding_data, monotonic_counter, idempotency_key, sender_runtime_attestation_reference, replay_protection_data, pointer_ resolution_time, snapshot_digest, snapshot_time_to_live, freeze_condition, snapshot_invalidation_trigger_set, and reservation_chain_reference.

Example chunk-lineage-map, policy-overlay, and verifier-kit fields include chunk_lineage_map_identifier, chunk_identifier, source_selector_set, embedding_identifier, reranker_output_identifier, memory_summary_identifier, derivative_write_identifier, inherited_restrictions, no_train_indicator, no_policy_update_indicator, no_memory_write_indicator, policy_overlay_identifier, policy_state_identifier, overlay_precedence_rule, compatibility_result, purge_state, correction_clawback_state, conformance_vector_set_identifier, verifier_kit_reference, token_consumption_proof, structured_precondition_failure_reference, audit_export_reference, and selector_set_digest.

Appendix D—Exemplary Deployment, Platform, and Licensing Embodiments

This appendix is exemplary and non-limiting and is included to illustrate broad commercial and technical applicability without importing limitations into the claims.

In enterprise knowledge and messaging agents, external context artifacts can include notes, messages, email content, calendar content, chat threads, shared-drive documents, memory entries, and retrieved excerpts. Admission-and-classification features distinguish informative content from approval-bearing or policy-bearing artifacts. Derivation-control features constrain relay to sub-agents and downstream tools. Effect-bound revalidation features operate before message send, record mutation, task creation, or disclosure.

In code, DevOps, and infrastructure agents, external context artifacts can include tickets, runbooks, code snippets, build logs, shell fragments, deployment manifests, incident notes, configuration records, and repository pointers. The governance rail can prevent mutable or unsigned artifacts from authorizing code change, secret access, infrastructure mutation, queue submission, job scheduling, or release actions.

In procurement and workflow agents, external context artifacts can include purchase requests, vendor messages, budget records, approval notes, policy documents, and workflow definitions. The governance rail can distinguish informational context from approval-bearing artifacts and can revalidate before purchase submission, approval issuance, contract dispatch, payment workflow initiation, or external commitment.

In healthcare and regulated-record systems, external context artifacts can include clinical notes, payer communications, prior authorizations, treatment guidelines, care-plan annotations, and patient messaging. Context-only handling can permit bounded reasoning while preventing unsigned or mutable records from authorizing release, submission, scheduling, or treatment-affecting operations without satisfying promotion conditions.

In media, publishing, newsroom, and research-reporting systems, external context artifacts can include press releases, analyst notes, interview transcripts, fact tables, public-web materials, internal edit memoranda, candidate drafts, and channel derivatives. Admission-and-classification features can distinguish bounded source use from publication-bearing authority. Derivation-control features can preserve lineage and inherited restrictions across headlines, blurbs, captions, summaries, newsletters, answer surfaces, and syndication objects. Effect-bound revalidation features can operate at publication, syndication, disclosure, queueing, scheduling, or future-behavior update boundaries before external presentation or later content influence occurs.

In robotics and other embodied systems, external context artifacts can include mission notes, maintenance reports, procedure documents, environment reports, safety bulletins, supervisor annotations, and delegated task objects. Effect-bound revalidation features can revalidate context and scope before physical actuation, motion execution, access to controlled equipment, or command dispatch to a robot controller.

The disclosed governance rail can be commercialized as a platform feature, gateway, control-plane service, embedded runtime, software-development-kit component, policy engine, original-equipment-manufacturer module, managed-service layer, or procurement-grade assurance feature, with receipts, policy-pack identifiers, and audit exports serving as licensing and diligence artifacts.

In browser and computer-use agents, external context artifacts can include DOM fragments, page regions, screenshot regions, clipboard contents, OCR spans, extension messages, downloaded files, and remote browsing instructions. Typed inert representations and authority maps can constrain which page regions or extracted fields may influence autofill, click sequences, credential submission, navigation, download actions, or other browser-mediated side effects.

In multi-agent or cross-vendor platforms, authority capsules, relay credentials, and execution authority tokens can be exchanged as original-equipment-manufacturer or platform-level control objects so that a customer, platform operator, or downstream runtime can independently verify scope, freshness, and permitted-use limits before an action is executed or a future-behavior store is updated.

In managed-agent collaboration platforms, external context artifacts or derived artifacts can be represented in one or more agent roster objects, work-item objects, issue objects, board-state objects, assignment-state records, comment-linked selector records, attachment-linked selector records, or status-transition records shared across multiple agents, tools, runtimes, or human supervisors. The disclosed governance rail can bind such objects to capability manifests, authority capsules, session or lease states, and current selector-scoped lineage so that visibility of a roster entry, issue card, board lane, comment, attachment, or assignment state does not itself authorize broader operational use and so that claim, assign, reassign, task-acquisition, close, reopen, or route transitions can be independently governed, revalidated, and denied when then-current correspondence fails.

In local or self-hosted agent environments, one or more agents can be discovered, admitted, enrolled, refreshed, or re-enrolled through a command-line interface, daemon, session manager, local registry, service endpoint, socket endpoint, or another discovery surface, and the governance rail can generate or verify a local-agent enrollment record bound to runtime-family posture, provider-class posture, executable or measurement digest, capability-manifest scope, workspace scope, delegated-credential or lease posture, heartbeat or refresh state, and revocation or re-registration state. A platform operator, customer, orchestrator, or downstream runtime can therefore independently verify whether a local runtime remains within governed scope before task acquisition, queued dispatch, delegated execution, board-state transition, or effect-bearing commit is permitted.

Appendix E—Exemplary Interoperability Surfaces and Artifact Classes

This appendix is exemplary and non-limiting and illustrates how the disclosed governance rail can operate across heterogeneous protocol surfaces, interface surfaces, and artifact classes.

Example artifact classes include prompt templates, prompt fragments, retrieval results, resource pointers, snapshots, memory items, markdown artifacts, code artifacts, configuration objects, structured-record fields, mixed-media objects, capability descriptors, tool metadata, policy candidates, policy packs, relay objects, delegated task objects, embeddings, labels, and summaries.

Example interoperability surfaces include messaging interfaces, queueing systems, schedule managers, orchestration frameworks, agent-to-agent relays, tool registries, remote procedure call gateways, repository connectors, browser-mediated interfaces, robotic middleware layers, database adapters, and disclosure gateways.

The same external context artifact can arrive through multiple surfaces or can be re-expressed across multiple surfaces. The disclosed admission, lineage, and revalidation rails permit machine governance to follow the artifact or derivative across those surfaces rather than being confined to any single prompt, channel, or vendor-specific interface.

Accordingly, the systems and methods disclosed herein are not limited to any single prompt-injection framing and instead govern whether a given artifact or derived artifact is eligible to influence authorization of an effect-bearing operation regardless of how the artifact is named, packaged, transported, transformed, or relayed.

Example selector types for fragment-level governance include byte offsets, token spans, paragraph identifiers, page regions, DOM paths, JSON pointers, column identifiers, table cell selectors, image regions, audio intervals, video intervals, and object identifiers. Such selectors can be carried in authority maps, relay credentials, or execution authority tokens so that scope follows the governed fragment across heterogeneous systems.

Appendix F—Exemplary Procurement, Assurance, and Audit Outputs

This appendix is exemplary and non-limiting and illustrates machine-verifiable outputs that can support procurement, audit, assurance, and platform governance workflows.

Example outputs include admission receipts, promotion records, relay credentials, execution-use receipts, post-execution verification records, artifact-record exports, policy-pack bindings, version histories, digest histories, and evidence-ledger extracts. Such outputs can be packaged for security review, procurement review, incident reconstruction, policy attestation, or partner diligence.

A procurement-facing or assurance-facing bundle can, by way of example, identify default context-only artifact classes, recognized trust tiers, governing policy-pack versions, lineage from source artifacts to derived artifacts, emitted reason codes, mutable-source handling, compatibility or verifier-profile correspondence, and revalidation or scope-preservation behavior sufficient for procurement review, partner diligence, incident reconstruction, or insurer, customer, or regulator review.

Because the disclosed governance rail produces machine-readable, version-bound evidence, the rail can function not only as an internal security feature but also as a platform and procurement differentiator that can be independently reviewed by customers, partners, insurers, or regulators.

Example assurance outputs can additionally include authority-capsule manifests, policy-compatibility proofs, token-consumption proofs, reservation-to-execution chains, training-exclusion proofs, and fragment-level disclosure maps, thereby enabling a customer, partner, insurer, regulator, or platform integrator to verify that a later side effect or future-behavior update remained within granted scope.

Example assurance outputs can further include delegation-chain manifests, delegation-state views, re-delegation-limit views, revocation-lineage views, sponsor-binding proofs, confirmation digests or confirmation references, mode-transition records, draft-to-act consistency views, and delegated-operation consumption proofs, thereby enabling a customer, partner, insurer, regulator, or platform integrator to verify that delegated authority remained attenuated, fresh, revocable, and machine-verifiable at the time of a protected action.

In some embodiments, a procurement-facing or assurance-facing bundle can indicate whether delegation is non-transitive by default, what hop or fan-out limits apply, how revocation propagates across one or more delegated hops, whether resumed sessions or queued jobs require renewed delegated-authority correspondence, and whether read-mode or draft-mode operations are prevented from entering act mode absent a then-current live execution permit and any required confirmation or sponsor correspondence.

In some embodiments, audience-specific assurance exports are generated such that one verifier receives a delegation-state view, another verifier receives a revocation-lineage view, and another verifier receives a draft-to-act consistency view or sponsor-binding proof, all derived from a common evidence substrate without requiring disclosure of hidden prompts, internal reasoning traces, or non-essential governed content.

Example attested effect-boundary interface and consumption-correspondence fields include effect interface_identifier, effect_interface_class, consumer_runtime_identifier, consumer_measurement_digest, interface_attestation_result, endpoint_binding_value, actual_endpoint_digest, token_binding_mode, consumption_epoch, token_consumption_proof_identifier, actual_target_identifier, actual_recipient_identifier, actual_parameter_digest, resulting_state_digest, actual_to_authorized_correspondence_result, structured_precondition_failure_reference, and integrity_data.

Example influence-map, training-exclusion, unlearning, and rollback-related fields include influence_map_identifier, downstream_dependency_set_identifier, affected_store_class, derivative_write_reference, training_exclusion_manifest_identifier, unlearning_work_order_identifier, derivative_quarantine_epoch, rollback_domain_identifier, recomputation_requirement, reuse_block_reason, residual_influence_status, rollback_completion_state, correction_propagation_state, and integrity_data.

Appendix G—Exemplary Selector Grammars, Authority-Shadow Views, and Snapshot/Freeze Controls This appendix is exemplary and non-limiting and illustrates selector-scoped governance objects, authority-shadow views, snapshot records, and freeze-related controls that can be used in the systems and methods described herein.

Example selector-grammar elements include artifact_selector, fragment_selector, field_selector, attachment_selector, page_region_selector, DOM_path_selector, JSON_pointer_selector, OCR_selector, metadata_selector, hyperlink_target_selector, tool_argument_selector, vector_chunk_selector, and combinations thereof. Selector expressions can be canonicalized, normalized, deterministically serialized, field-ordered, or hashed to produce a canonical selector form, selector-set digest, or transformation digest so that scope can be compared across transformations, modalities, or revalidations.

Example capability-manifest, tool-class, and activation-gate fields include capability_manifest_identifier, connector_or_derivative_identifier, source_artifact_identifier_set, derived_artifact_identifier_set, tool_class_set, allowed_action_class_set, allowed_parameter_class_set, invocation_contract_digest, schema_digest, activation_scope, session_binding_value, channel_binding_value, enablement_epoch, refresh_condition, expiration_condition, revocation_handle, required_attestation_reference, verification_profile_reference, and integrity_data.

Example delegation-lease, refresh, exhaustion, and renewal-control fields include delegation_lease_identifier, delegation_chain_identifier, delegation_hop_identifier, lease_start_time, lease_expiry_condition, refresh_window, act_window, remaining_use_count, maximum_use_count, renewal_trigger, reconfirmation_predicate, lease_epoch, exhaustion_result, lease_consumption_proof_identifier, renewal_history_identifier, and integrity_data.

Example authority-shadow-view fields include authority_shadow_view_identifier, source_artifact_identifier, source_digest, selector_set, canonical_selector_form, selector_set_digest, transformation_digest, typed_fields, suppressed_fields, non authoritative_markers, support_state_code, permitted_use_scope, structured_precondition_failure_reference, created_at, expires_at, and integrity_data.

Example cross-view-field-binding-manifest fields include field_binding_manifest_identifier, source_artifact_identifier_set, source_digest_set, selector_set, selector_set_digest, DOM_path_value_set, accessibility_node_reference_set, rendered_text_span_set, OCR_span_reference_set, page_region_reference_set, bounding_region_value_set, field_label_value_set, field_name_digest_set, field_label_digest_set, hidden_field_identifier_set, hidden_field_digest_ set, form_action_value, submit_endpoint_value, endpoint_class_value, method_value, interface_state_snapshot_reference, canonical_submit_surface_digest, origin_value, site_value, tenant_binding_value, account_binding_value, session_binding_value, sequence_step_identifier_set, sequence_step_index_set, permitted_use_scope, support_state_code, expiration_condition, and integrity_data.

Example field-binding or submit-surface-correspondence receipt fields include field_binding_manifest_identifier, interface_state_snapshot_reference, rendered_surface_correspondence_result, hidden_field_correspondence_result, canonical_submit_surface_digest, submit_endpoint_correspondence_result, origin_tenant_account_correspondence_result, sequence_step_correspondence_result, outcome_code, reason_code_set, receipt_timestamp, and integrity_data.

Example snapshot-record and freeze-control fields include snapshot_record_identifier, source_pointer, resolution_time, resolved_digest, mirror_digest, snapshot_time_to_live, freeze_on_schedule_indicator, freeze_on_dispatch_indicator, refetch_required_indicator, downgrade_on_ refetch_indicator, reservation_chain_reference, freeze_condition, freeze_state, target_binding, policy_epoch_identifier, and snapshot_invalidation_trigger_set.

Appendix H—Exemplary Promotion Manifests, Relay Envelopes, and No-Privilege-Inflation Controls This appendix is exemplary and non-limiting and illustrates propagation-control objects and bounded-authority carriage controls that can be used for promotion, relay, or cross-runtime interoperability.

Example promotion-manifest fields include promotion_manifest_identifier, source_artifact_identifiers, source_digest_set, derived_artifact_identifier, selector_set, selector_set_digest, transformation_digest, action_class_set, parameter_class_set, parameter_digest, intended_recipient_class_set, environment_scope, approver_set, reviewer_class_set, quorum_state, freshness_window, policy_epoch_identifier, expiration_condition, revocation_handle, and integrity_data.

Example relay-envelope fields include relay_envelope_identifier, relay_hop_counter, max_relay_depth, max_fan_out, sender_runtime_identifier, sender_runtime_attestation_reference, intended_recipient_class, trust_domain_binding, session_binding_data, channel_binding_data, nonce, monotonic_counter, idempotency_key, replay_protection_data, downstream_revalidation_obligation, policy_compatibility_result, and scope_intersection result.

Example delegation-chain and delegation-receipt fields include delegation_chain_identifier, delegation_hop_identifier, parent_hop_reference, origin_principal_reference, delegator_identity_reference, delegate_identity_reference, authority_capsule_reference, authority_scope_digest, purpose_digest, task_reference, action_class_set, parameter_class_set, target_class_set, recipient_class_set, environment_scope, effective_time, expiration_condition, freshness_window, max_hop_count, hop_index, re_delegation_policy, non_transitive_flag, confirmation_digest_reference, sponsor_binding_reference, policy_state_identifier, verification_profile_reference, revocation_epoch, delegation_chain_digest, and integrity_data.

Example mode-transition and delegated-act fields include mode_transition_record_identifier, prior_mode_class, requested_mode_class, draft_artifact_digest, execution_context_digest, live_execution_permit_reference, act_window, confirmation_digest_reference, sponsor_binding_reference, draft_to_act_consistency_result, target_correspondence_result, recipient_correspondence_result, policy_state_identifier, and integrity_data.

Example revocation-lineage and renewed-authority fields include revocation_receipt_identifier, revoked_hop_identifier_set, upstream_revocation_reference, revocation_digest, revocation_epoch, downstream_freeze_state, downstream_hold_state, renewed_authority_required_indicator, affected_ target_class_set, affected_recipient_class_set, affected_action_class_set, and integrity_data.

Example resumed-session, queued-dispatch, and delegated-tool fields include resumed_session_identifier, queued_dispatch_identifier, scheduled_replay_identifier, connector_enablement_identifier, plugin_activation_identifier, delegated_tool_identifier, delegated_tool_class, delegated_tool_restriction_result, session_resume_scope_result, replay_time_correspondence_result, and then_current_delegation_reference.

Example no-privilege-inflation controls require that downstream usable scope be no broader than the upstream granted scope, no broader than the downstream local policy result, and no broader than the selector-scoped source restrictions represented in lineage, authority-capsule, or promotion-manifest data, and can further permit rejection, rewrapping, narrowing, or downgrade when replay, attestation, freshness, or local-policy correspondence fails.

Example no-privilege-inflation controls can additionally require that a downstream delegated act be no broader than the upstream delegated action class, parameter class, target class, recipient class, and environment scope represented in one or more delegation receipts, mode-transition records, authority-capsule references, or execution-authority-token references, and can further require that any sponsor-binding, confirmation predicate, or live-permit condition remain current at commit time rather than only at planning time.

Example fail-closed responses to delegated-authority mismatch include deny, hold, quarantine, freeze, downgrade, renewed_authority_required, revalidation_required, confirmation_required, sponsor_mismatch, revocation_lineage_mismatch, draft_to_act_mismatch, and re_delegation_not_permitted.

Appendix I—Exemplary Conformance Vectors, Memory/Rag Lineage Outputs, and Verifier Kits This appendix is exemplary and non-limiting and illustrates assurance artifacts, regression vectors, and machine-verifiable outputs that can be used to demonstrate fail-closed operation of the disclosed governance rail.

Example conformance vectors include mutable_pointer_drift, memory_poisoning, hidden_instruction_image, policy_candidate_substitution, relay_laundering, stale_scheduled_job, scope_expansion_attempt, reranker_scope_escape, embedding_writeback_escape, selector_digest_mismatch, correction_clawback_escape, review_freshness_expiry, token_replay_attempt, build_artifact provenance_mismatch, package_manifest_substitution, source_map_debug_artifact_escape, plugin_package_scope_escape, extension_package_scope_escape, hook_configuration_substitution, hook_payload_mutation_escape, permission_profile_mismatch, connector_descriptor_scope_escape, agent_definition_override, subagent_scope_escape, session_resume_scope_drift, stale_resumed_session, background_task_policy_drift, queued_dispatch_after_revocation, channel_injection_relay_escape, remote_control_event_spoofing, cached_tool_enablement_escape, and resume_time_selector_mismatch.

Example chunk-lineage-map and memory-governance fields include chunk_identifier, source_artifact_identifier, source_digest_set, source_selector_set, embedding_identifier, reranker_output_identifier, memory_summary_identifier, derivative_write_identifier, inherited_restrictions, support_state, no_train_indicator, no_policy_update_indicator, no_memory_write_indicator, policy_state_identifier, purge_state, correction_state, and recall_time_revalidation_requirement.

Example verifier-kit outputs include policy_overlay_identifier, selector_set_digest, promotion_manifest_identifier, relay_envelope_identifier, snapshot_record_identifier, execution_authority_token_identifier, token_consumption_proof, structured_precondition_failure_reference, actual_parameter_digest, actual_target_identifier, outcome_code, selective_proof_reference, conformance_vector_results, and instructions sufficient to reproduce admission, promotion, relay, snapshot, or execution-use verification.

Example conformance vectors further include charity_registry_drift, beneficiary_rebinding_attempt, donation_endpoint_substitution, cross_border_diligence_expiry, impact_scope_escape, nonprofit_surface_interoperability_mismatch, relay_to_unapproved_fundraising_surface, public_appeal_selector_mismatch, disbursement_destination_shift, donor_preference_scope_expansion, and charitable_recommendation_to_commit_laundering.

Example chunk-lineage-map, routing-governance, and public-benefit-disbursement fields include charity_identity_record_identifier, cross_border_diligence_record_identifier, beneficiary_provenance_record_identifier, public_benefit_disbursement_object_identifier, donation_endpoint_descriptor_identifier, donation_interoperability_credential_identifier, impact_scope_identifier, beneficiary_class_identifier, destination_binding_digest, registry_correspondence_result, due_diligence_expiry, jurisdiction_eligibility_result, use_of_funds_scope_identifier, review_epoch_identifier, reroute_requirement, and misuse_signal_reference.

Example verifier-kit outputs further include donation_routing_receipt_identifier, impact_bound_routing_receipt_identifier, charity_identity_correspondence_result, beneficiary_provenance_result, donation_destination_correspondence_result, cross_border_due_diligence_result, interoperability_profile_result, selective_proof_reference, decision_scope_identifier, structured_precondition_failure_reference, outcome_code, and instructions sufficient to reproduce admission, promotion, relay, snapshot, or execution-use verification for a charitable or public-benefit disbursement object.

Example outcome codes further include CHARITY_IDENTITY_MISMATCH, BENEFICIARY_PROVENANCE_INSUFFICIENT, DONATION_ENDPOINT_MISMATCH, DESTINATION_BINDING_FAILED, JURISDICTION_INELIGIBLE, DUE_DILIGENCE_EXPIRED, IMPACT_SCOPE_MISMATCH, INTEROPERABILITY_PROFILE_MISSING, MISUSE_SIGNAL_HOLD, DONOR_SCOPE_EXPANSION_ATTEMPT, REROUTE_REQUIRED, and RENEWED_AUTHORITY_REQUIRED.

Example relying-party and scope fields further include donor_class, donor_advisor_class, foundation_class, sponsor_class, payment_intermediary_class, charitable_entity_class, beneficiary_class, regulator_class, auditor_class, cause_class, geographic_scope, program_scope, and use_of_funds_scope.

Example delegation-specific conformance vectors include non_transitive_escape, unauthorized_re_delegation, hop_limit_bypass, fan_out_limit_bypass, trust_domain_mismatch_on_relay, stale_confirmation_before_act, stale_live_permit_before_act, draft_to_act_mismatch, sponsor_binding_mismatch, recipient_class_expansion, target_class_expansion, parameter_class_expansion, resumed_session_after_revocation, queued_dispatch_after_delegation_expiry, connector_enablement_without_current_delegation, plugin_activation_without_current_delegation, delegated_tool_class_escape, revocation_propagation_failure, renewed_authority_required_but_missing, and act_window_expired_but_committed.

Example verifier-kit outputs further include delegation_chain_identifier, delegation_chain_digest, delegation_hop_identifier, parent_hop_reference, delegation_state_view_reference, re_delegation_limit_view_reference, revocation_lineage_view_reference, confirmation_digest_reference, sponsor_binding_reference, mode_transition_record_identifier, draft_artifact_digest, draft_to_act_consistency_result, live_execution_permit_reference, renewed_authority_required_indicator, and delegated_operation_consumption_proof.

In some embodiments, verifier instructions sufficient to reproduce admission, promotion, relay, snapshot, or execution-use verification additionally include instructions sufficient to determine whether a delegated operation remained within non-transitive or expressly permitted re-delegation limits, whether a required confirmation or sponsor correspondence remained current at act time, whether revocation lineage was clear at commit time, and whether actual target, recipient, and parameter values remained within then-current delegated scope.

In some embodiments, conformance-vector results and verifier-kit outputs are exportable in audience-specific forms such that a downstream runtime, customer, regulator, insurer, or procurement reviewer can independently determine whether delegated authority remained attenuated and revocable without requiring any particular verifier topology, storage layout, receipt container, or export syntax.

Appendix J—Reference Numeral Index

The following reference numeral index is exemplary and non-limiting.

Reference numeral 100 denotes an agentic-system environment; 102, a principal terminal; 104, an agent orchestration platform; 106, an intake interface; 108, an artifact registry; 110, a provenance analyzer; 112, a mutability assessor; 114, a trust tier classifier; 116, an authority-eligibility engine; 118, an admission engine; 120, an admission-state registry; 122, a policy store; 124, a derivation controller; 126, a propagation controller; and 128, an execution boundary gate.

Reference numeral 130 denotes a revalidation engine; 132, an execution component; 134, a receipt generator; 136, an evidence ledger; 138, a memory store; 140, an external resource connector; 142, a tool registry; 144, a sub-agent runtime; 146, a remote service; 148, a policy-pack store; 150, a signature and digest verifier; 152, a quarantine workspace; 154, a context-only workspace; 156, an authority-bearing workspace; 158, a promotion controller; 160, a restriction lineage store; 162, a version monitor; 164, a revocation store; 166, a disclosure gate; 168, a post-execution state verifier; 170, a result store; 172, an audit export interface; and 174, a network.

Reference numeral 180 denotes an external context artifact; 182, a derived artifact; 184, an admission receipt; 186, an execution-use receipt; 190, a promotion token; 191, a relay credential; 192, a permitted-use binding; 193, an authority capsule; 194, an execution authority token; 195, a reservation record; 196, an authority-shadow view; 197, a promotion manifest; 198, a relay envelope; 199, a snapshot record; 200, a chunk lineage map; 201, a policy overlay set; 203, a conformance vector set; and 205, a verifier kit.

Reference numeral 300 denotes an artifact record, and reference numeral 500 denotes a lineage record.

Appendix K—Exemplary Media Artifact Classes, Publication Boundaries, and Channel Derivatives This appendix is exemplary and non-limiting and illustrates artifact classes, publication boundaries, and channel-derivative classes that can arise in media, publishing, newsroom, and other content-production embodiments of the disclosed governance rail.

Example source-artifact classes include press_release, analyst_note, interview_transcript, earnings_call_excerpt, source_comment_log, edit_memo, research_note, public_web_source, fact_table, prior_publication_reference, uploaded_source_packet, image_caption_source, audio_source_excerpt, and mixed-format source bundle.

Example candidate-content-item classes include draft_article, feature_draft, breaking_news_draft, answer_draft, headline_draft, dek_draft, caption_set, script_draft, summary_card_draft, and translated_draft.

Example publication-effect-boundary events include content_management_system_commit, review_queue_insert, publication_queue_insert, publish_flag_set, scheduled_release_commit, syndication_queue_insert, newsletter_send, push_send, chatbot_surface_release, search_surface_release, social_caption_release, audio_render_release, and video_script_release.

Example channel-derivative classes include headline, dek, teaser, blurb, excerpt, caption, fact_box, push_text, newsletter_blurb, syndication_object, search_snippet, answer_fragment, short_form_script, audio_summary, video_summary, translated_variant, and correction_notice.

Example machine-readable indicators or fields associated with the foregoing classes include source_selector_set, support_status, support_state_transition_code, unsupported_assertion_indicator, review_state, review_freshness_window, disclosure_state, embargo_state, audience_class, partner_scope, channel_scope, no_redisclose_indicator, no_train_indicator, derivative_write_record_reference, and publication_receipt_reference.

Appendix L—Exemplary Editorial Lineage Maps, Fact-Support Selectors, and Publication Receipts This appendix is exemplary and non-limiting and illustrates editorial-lineage structures, fact-support selector structures, and publication-receipt outputs that can be used in content-publishing embodiments.

Example editorial-lineage fields include candidate_content_identifier, source_artifact_identifier_set, source_digest_ set, source_selector_set, selector_set_digest, paragraph_or_segment_identifier, assertion_identifier, quotation_identifier, attribution_state, support_status, support_state_transition_code, unsupported_assertion_indicator, reviewer_state, review_freshness_window, fact_check_state, legal_review_state, channel_class, correction_state, and inherited_restrictions.

A fact-support selector can identify, by way of example, one or more source paragraphs, lines, page regions, transcript intervals, table cells, metadata fields, quoted spans, or structured fields sufficient to support a selected assertion, quotation, caption, or summary phrase in the candidate content item or publication derivative.

Example publication-receipt fields include publication_receipt_identifier, candidate_content_identifier, publication_ derivative_identifier, publication_boundary_type, release_channel_identifier, channel_class, selector_set_digest, source_digest_set, review_quorum_state, review_freshness_result, support_state_result, disclosure_state, policy_state_identifier, promotion_manifest_identifier, relay_envelope_identifier, structured_precondition_failure_reference, token_consumption_proof, outcome_code, correction_linkage_identifier, and integrity_data.

In some embodiments, a publication-assurance bundle includes one or more publication receipts, source-digest tables, selector-set digests, review-state records, support-state transition records, correction-linkage records, derivative-write clawback proofs, conformance-vector results, verifier instructions, or token-consumption proofs sufficient to demonstrate that a selected publication event or future-behavior update remained within granted scope.

Appendix M—Exemplary Publication States, Disclosure States, and Media Reason Codes This appendix is exemplary and non-limiting and illustrates publication states, disclosure states, and media-oriented reason codes that can be used in content-publishing embodiments.

Example publication states include DRAFT_ONLY, INTERNAL_REVIEW, FACT_CHECK_HOLD, LEGAL_REVIEW_HOLD, DISCLOSURE_HOLD, CHANNEL_LIMITED, READY_FOR_PUBLICATION, READY_FOR_SYNDICATION, READY_FOR_INTERNAL_ANALYTICS_ONLY, CORRECTION_PENDING, and WITHDRAWN.

Example disclosure states include disclosure_not_required, disclosure_pending, disclosure_required_before_release, disclosure_satisfied, disclosure_partner_specific, and disclosure_reader_facing_only.

Example reason codes include source_selector_missing, source_drift_after_draft, source_drift_after_edit, unsupported_assertion_detected, review_quorum_missing, channel_scope_exceeded, derivative_scope_escape, disclosure_required, external_partner_scope_mismatch, no_train_for_newsroom_memory, no_memory_write_without_promotion, correction_state_conflict, revalidation_required_before_publish, source_corrected_after_draft, source_withdrawn_after_draft, support_state_changed, review_freshness_expired, derivative_write_clawback_required, disclosure_freshness_expired, and token_reuse_detected.

Appendix N—Optional Reader-Facing Disclosure, Byline, Rights, and Compensation Output Structures This appendix is exemplary and non-limiting and reserves optional reader-facing, partner-facing, or settlement-facing output structures that can be used in selected content-publishing embodiments without importing limitations into the claims.

Example optional output structures include machine-readable or human-readable disclosure objects, byline-state objects, provenance notices, correction notices, partner-redistribution notices, rights-clearance indicators, content-compensation indicators, or settlement-support records bound to one or more source artifacts, publication derivatives, or publication receipts.

Example byline-state or disclosure-related fields include byline_mode, human_contribution_state, machine_assist_indicator, disclosure_text_reference, disclosure_scope, explanation_reference, correction_reference, and release_channel_binding.

Example rights or compensation-related fields include rights_scope, partner_identifier, compensation_rule_identifier, settlement_reference, usage_event_identifier, provenance_notice_reference, and redistribution_scope.

The optional output structures of this appendix can be governed by the same admission, lineage, promotion, relay, and revalidation rails described elsewhere herein, including selector-scoped restrictions, channel-specific permitted-use bindings, and publication-receipt linkage.

In some embodiments, one or more optional output structures of this Appendix N are absent entirely, and absence thereof does not limit operation of the admission, lineage, promotion, relay, publication, or future-behavior controls described herein.

Appendix O—Illustrative Forecast Object and Forecast Receipt Field Families

Identity and Scope

Forecast identifier; prediction identifier; target identifier; target-variable identifier; asset identifier; branch identifier; package identifier; action-class identifier Temporal Scope Observation-window start; observation-window end; forecast-window start; forecast-window end; horizon class; cadence; granularity; snapshot time; stale-after field Forecast Outputs Point forecast; quantile vector; lower interval bound; upper interval bound; confidence band; scenario identifier; scenario spread; calibration class; disagreement score Manifest and Lineage Model-manifest identifier; covariate-manifest identifier; checkpoint identifier; feature-lineage digest; transform-pipeline identifier; evaluation-profile identifier; training-cutoff identifier Governance and Lifecycle Uncertainty budget; confidence-floor result; disagreement-threshold result; reforecast flag; stale flag; challenge status; expiry field; override class Trust and Audit Receipt identifier; signer identity; policy-profile hash; external anchor reference; verifier profile; schema version; reason codes

Appendix P—Illustrative Covariate Manifest, Feature Lineage, and Invalidation Field Families Covariate Manifest Covariate-manifest identifier; covariate class; exogenous-input class; source identifier; source freshness; missingness field; imputation profile; jurisdiction tag Feature Lineage Feature identifier; feature-family identifier; selector or source-field reference; transform-pipeline identifier; normalization profile; aggregation rule; lineage digest Checkpoint and Evaluation Checkpoint identifier; model version; deployment identifier; training-cutoff identifier; evaluation-profile identifier; calibration profile; drift-baseline reference Invalidation Triggers New observation event; covariate drift event; checkpoint change; policy-profile change; target shift; environment shift; rights/disclosure change; external challenge event Dependency Propagation Dependency node identifier; dependent action path; rollback domain; challenge domain; reauthorization requirement; reforecast requirement

Appendix Q—Illustrative Future-State-Conditioned Action Classes, Gate Outcomes, and Reason Codes Action Classes Scheduling; allocation; routing; activation; continuation; notification timing; dispatch-related action; pricing-related action; order-related action; inventory-related action; other effect-bearing action Gate Outcomes Permit; limited permit; hold; deny; expired; challenged; reforecast-required; scenario-review-required; uncertainty-budget-exceeded Reason Codes LOW_CONFIDENCE; QUANTILE_CONDITION_FAILED; PREDICTION_INTERVAL_UNACCEPTABLE; MODEL_DISAGREEMENT; SCENARIO_SPREAD_EXCEEDED; FORECAST_STALE; REFORECAST_REQUIRED; CHECKPOINT_CHANGED; COVARIATE_DRIFT; TARGET_ SHIFT; POLICY_MISMATCH

Appendix R—Exemplary Policy-Pack Exchange, Verification-Profile, and Compatibility Field Families This appendix is exemplary and non-limiting and illustrates field families and machine-readable structures usable for policy-pack exchange, verification-profile interoperability, and provider-neutral compatibility determination across heterogeneous vendors, runtimes, partner surfaces, procurement workflows, assurance workflows, and regulator-facing workflows.

Example policy-pack-exchange fields include policy_pack_identifier, policy_pack_version, source_outcome_code, source_outcome_class, allowed_relying_party_class_set, context_of_use_profile, evidence_purpose_digest, selector_set_digest, transformation_digest, review_state_identifier, review_freshness_window, policy_epoch, revocation_handle, and integrity_data.

Example destination-verification-profile fields include destination_verification profile_identifier, destination_profile_version, accepted_outcome_class_set, required_verification_class_set, selective_disclosure_requirement_set, accepted_relying_party_class_set, context_of_use_constraint_set, review_freshness_requirement, schema_version_identifier, translation_profile_identifier, portability_requirement_set, and profile_integrity_data.

Example policy-compatibility and outcome-normalization fields include compatibility_record_identifier, profile_negotiation_record_identifier, outcome_normalization_record_identifier, source_to_destination_mapping_identifier, compatibility_verdict, compatibility_scope_identifier, narrowed_scope_identifier, advisory_only_indicator, evidence_only_indicator, rejection_indicator, reissue_required_indicator, mismatch_reason_code, drift_reason_code, and compatibility_integrity_data.

In some embodiments, compatibility verdict classes include compatible, compatible_narrowed, advisory_only, evidence_only, incompatible, stale_profile, stale_policy_pack, relying_party_mismatch, context_mismatch, selector_mismatch, transformation_mismatch, translation_mismatch, review_state_mismatch, and reissue_required, without requiring any particular naming convention.

Appendix S-Exemplary Verifier Result Receipts, Acceptance-Boundary Outcomes, and Profile-Drift Reason Codes This appendix is exemplary and non-limiting and illustrates verifier result receipt fields, acceptance-boundary result structures, and profile-drift or compatibility-drift reason codes usable in downstream policy-consumer intake workflows.

Example verifier-result-receipt fields include verifier_result_receipt_identifier, portable_verification_bundle_identifier, destination_verification_profile_identifier, policy_pack_identifier, selector_set_digest, transformation_digest, normalized_capability_record_identifier, translation_record_digest, compatibility_verdict, allowed_relying_party_class_set, context_of_use_profile, review_state_identifier, reason_code_set, issuance_time, expiry_condition, reissue_condition, revocation_handle, and integrity_data.

Example acceptance-boundary types include installation_boundary, enablement_boundary, submission_boundary, certification_boundary, procurement_intake_boundary, partner_exchange_boundary, insurer_intake_boundary, regulator_review_boundary, and evidence_exchange_boundary.

Example reason codes include destination profile_missing, destination_profile_stale, policy_pack_stale, relying_party_class_mismatch, context_of_use_mismatch, selector_scope_mismatch, transformation_scope_mismatch, translation_profile_mismatch, review_freshness_expired, profile_version_changed, policy_epoch_changed, selective_disclosure_required, advisory_only_required, evidence_only_required, bundle_reissue_required, verifier_result_revoked, and downstream_acceptance_denied.

The invention claimed is:

1. A computer-implemented governance system for an agentic system, comprising one or more processors and memory storing instructions that, when executed by the one or more processors, cause the system to: receive an external context artifact for potential use by the agentic system in connection with a candidate execution operation; create, in an artifact registry, an artifact record associated with an artifact identifier for the external context artifact, the artifact record storing at least a source class, a current version indicator or digest, and an admission state; determine provenance evidence for the external context artifact and, using one or more machine-readable policy rules, determine a mutability state and a trust tier for the external context artifact; determine, based at least in part on the provenance evidence, the mutability state, and the trust tier, an authority-eligibility status indicating whether the external context artifact is eligible to influence authorization of the candidate execution operation; assign to the external context artifact an admission state selected from a plurality of admission states comprising deny, quarantine, context-only, and authority-bearing; store the external context artifact or a transformed representation thereof in one of a plurality of workspaces selected according to the admission state, the plurality of workspaces comprising a quarantine workspace, a context-only workspace, and an authority-bearing workspace; and expose to the agentic system only a workspace-selected representation of the external context artifact, including preventing a representation assigned the context-only admission state from serving as an authority-bearing input to authorize the candidate execution operation.

2. The system of claim 1, wherein the provenance evidence comprises at least one of source identity, signature-verification status, digest correspondence, repository origin, transport-source metadata, witness record, timestamp attestation, transparency-log reference, or policy-pack identifier.

3. The system of claim 1, wherein the mutability state indicates whether the external context artifact is mutable, version-locked, append-only, immutable, pointer-based, callback-updated, or locally mirrored from a mutable source.

4. The system of claim 1, wherein, when the external context artifact or a derived artifact is relayed to another agent, tool, runtime, or remote service, the one or more processors further determine whether a then-current authority capsule or relay envelope associated with the external context artifact or the derived artifact corresponds to an action class, a recipient class, an environment scope, and a trust-domain condition applicable to the candidate execution operation, and prevent the relayed external context artifact or the relayed derived artifact from serving as an authority-bearing input for the candidate execution operation absent current correspondence.

5. The system of claim 1, wherein an external context artifact obtained from an external memory store, a retrieved document source, or a mutable shared-document source is assigned, by default, the context-only admission state unless a verified policy authorization satisfying a promotion condition is present.

6. The system of claim 1, wherein the quarantine workspace is isolated from the authority-bearing workspace and from policy logic used to determine authorization of candidate execution operations.

7. The system of claim 1, wherein the transformed representation stored in the context-only workspace excludes or suppresses at least one imperative instruction string, executable code fragment, embedded credential, capability descriptor, or authority token extracted from the external context artifact.

8. The system of claim 1, wherein the instructions further cause the system to generate an admission receipt identifying the artifact identifier, the current version indicator or digest, the trust tier, the authority-eligibility status, the admission state, and at least one reason code associated with the admission state.

9. The system of claim 1, wherein the instructions further cause the system to detect a later version change of the external context artifact and, responsive to detecting the later version change, re-evaluate at least one of the mutability state, the trust tier, the authority-eligibility status, or the admission state before further operational use of the external context artifact.

10. The system of claim 1, wherein the transformed representation comprises a rendered, excerpted, clipped, highlighted, resized, reflowed, translated, summarized, preview-carded, or otherwise presentation-derived representation of the external context artifact, and wherein the authority-eligibility status for the presentation-derived representation is determined according to one or more selectors, fields, spans, regions, or views bound to the external context artifact or to the presentation-derived representation rather than being inferred from presentation alone.

11. A computer-implemented method for governing external context artifacts in an agentic system, the method comprising: receiving an external context artifact for potential use by the agentic system in connection with a candidate execution operation; assigning an artifact identifier to the external context artifact and storing, in an artifact registry, an artifact record associated with the artifact identifier, the artifact record storing at least a source class, a current version indicator or digest, and an admission state; determining provenance evidence for the external context artifact and, using one or more machine-readable policy rules, determining a mutability state and a trust tier for the external context artifact; determining, based at least in part on the provenance evidence, the mutability state, and the trust tier, an authority-eligibility status indicating whether the external context artifact is eligible to influence authorization of the candidate execution operation; assigning an admission state selected from deny, quarantine, context-only, and authority-bearing to the external context artifact; storing the external context artifact or a transformed representation thereof in one of a plurality of workspaces selected according to the admission state; intercepting, at an execution boundary gate associated with the candidate execution operation, a request to authorize or perform the candidate execution operation; revalidating, at the execution boundary gate and in view of a then-current version indicator or digest, the admission state, the mutability state, the trust tier, the authority-eligibility status, and at least one applicable policy state associated with the external context artifact; and permitting the candidate execution operation only when revalidation confirms that a workspace-selected representation of the external context artifact remains eligible to serve as an authority-bearing input for the candidate execution operation, and otherwise blocking, downgrading, or holding the candidate execution operation.

12. The method of claim 11, wherein, when the external context artifact or a derived artifact is relayed to another agent, tool, runtime, or remote service, revalidating at the execution boundary gate further comprises determining whether a then-current authority capsule or relay envelope associated with the external context artifact or the derived artifact corresponds to an action class, a recipient class, an environment scope, and a trust-domain condition applicable to the candidate execution operation, and preventing broader authority from being inferred absent current correspondence.

13. The method of claim 12, wherein determining current correspondence comprises determining an effective delegated scope as no broader than an intersection of (i) upstream granted scope, (ii) downstream local policy, and (iii) selector-scoped or permitted-use restrictions associated with the external context artifact or the derived artifact, and, when the candidate execution operation exceeds the effective delegated scope, denying authority-bearing use of, holding, quarantining, downgrading, or requiring rewrapping of the relayed external context artifact or the relayed derived artifact.

14. The method of claim 11, wherein assigning the admission state comprises assigning different admission states to different fragments, fields, or views of a compound external context artifact.

15. The method of claim 11, wherein storing the external context artifact or the transformed representation in the selected workspace comprises labeling a context-only representation as non-authoritative for at least one action class or recipient class.

16. The method of claim 11, further comprising generating an admission receipt including the artifact identifier, the admission state, the trust tier, the authority-eligibility status, and at least one reason code associated with the admission state.

17. The method of claim 11, wherein, for a queued, scheduled, resumed, replayed, or otherwise deferred candidate execution operation, revalidating at the execution boundary gate further comprises determining, at commit time, whether a then-current execution authority token or other live execution permit is present and valid, whether any required confirmation-digest reference or sponsor-binding correspondence is satisfied, and whether any required revocation-lineage clearance is satisfied, and preventing the candidate execution operation when any required one of the foregoing is absent, stale, revoked, or mismatched.

18. The method of claim 11, further comprising detecting a later version change of the external context artifact and, responsive to detecting the later version change, re-evaluating at least one of the mutability state, the trust tier, the authority-eligibility status, or the admission state before further operational use of the external context artifact.

19. The method of claim 11, wherein the authority-eligibility status is scoped to at least one of an action class, a principal class, an environment, a recipient class, or a time window, and wherein the action class comprises at least one of a file write, a file deletion, a queue insertion, a schedule creation, a message transmission, a credential use, a data disclosure, a purchase submission, a remote application-programming-interface mutation, a physical actuation command, or an update to a memory store, retrieval index, embedding store, policy store, training corpus, or fine-tuning queue that can govern future behavior.

20. The method of claim 11, wherein revalidating at the execution boundary gate comprises determining whether an excerpting operation, truncation operation, highlighting operation, resizing operation, reflow operation, translation operation, summarization operation, or channel transformation applied to the external context artifact or to a derived artifact has altered a selector scope, support state, or permitted-use scope, and preventing broader authority from being inferred unless a promotion condition or a fresh admission decision authorizes the broader authority.

21. One or more non-transitory computer-readable media storing instructions that, when executed by one or more processors, cause an agentic-system governance platform to: receive an external context artifact for potential use by an agentic system in connection with a candidate execution operation; create, in an artifact registry, an artifact record associated with an artifact identifier for the external context artifact, the artifact record storing at least a source class, a current version indicator or digest, and an admission state; determine provenance evidence for the external context artifact and, using one or more machine-readable policy rules, determine a mutability state and a trust tier for the external context artifact; determine, based at least in part on the provenance evidence, the mutability state, and the trust tier, an authority-eligibility status indicating whether the external context artifact is eligible to influence authorization of the candidate execution operation; assign to the external context artifact an admission state selected from deny, quarantine, context-only, and authority-bearing; store the external context artifact or a transformed representation thereof in one of a plurality of workspaces selected according to the admission state; and expose to the agentic system only a workspace-selected representation of the external context artifact, including preventing a representation assigned the context-only admission state from serving as an authority-bearing input to authorize the candidate execution operation.

22. The one or more non-transitory computer-readable media of claim 21, wherein the provenance evidence comprises at least one of source identity, signature-verification status, digest correspondence, repository origin, transport-source metadata, witness record, timestamp attestation, transparency-log reference, or policy-pack identifier.

23. The one or more non-transitory computer-readable media of claim 21, wherein the artifact record further stores at least one of a policy-pack identifier, a digest history, a workspace assignment, a permitted-use binding, or a receipt reference.

24. The one or more non-transitory computer-readable media of claim 21, wherein, when the external context artifact or a derived artifact is relayed to another agent, tool, runtime, or remote service, the instructions further cause the agentic-system governance platform, before permitting the relayed external context artifact or the relayed derived artifact to serve as an authority-bearing input for the candidate execution operation, to determine whether a then-current authority capsule or relay envelope associated with the external context artifact or the derived artifact corresponds to an action class, a recipient class, an environment scope, and a trust-domain condition applicable to the candidate execution operation, and, absent current correspondence, to block, hold, downgrade, require rewrapping of, or otherwise prevent authority-bearing use of the relayed external context artifact or the relayed derived artifact.

25. The one or more non-transitory computer-readable media of claim 21, wherein an external context artifact obtained from an external memory store, a retrieved document source, or a mutable shared-document source is assigned, by default, the context-only admission state unless a verified policy authorization satisfying a promotion condition is present.

26. The one or more non-transitory computer-readable media of claim 21, wherein a quarantined artifact is stored in a workspace isolated from an authority-bearing workspace and from policy logic used to determine authorization of candidate execution operations.

27. The one or more non-transitory computer-readable media of claim 21, wherein the transformed representation stored in the context-only workspace excludes or suppresses at least one imperative instruction string, executable code fragment, embedded credential, capability descriptor, or authority token extracted from the external context artifact.

28. The one or more non-transitory computer-readable media of claim 21, wherein the instructions further cause the governance platform to detect a later version change of the external context artifact and, responsive to detecting the later version change, re-evaluate at least one of the mutability state, the trust tier, the authority-eligibility status, or the admission state before further operational use of the external context artifact.

29. The one or more non-transitory computer-readable media of claim 21, wherein the instructions further cause the governance platform to generate an integrity-protected admission receipt identifying the artifact identifier, the current version indicator or digest, the trust tier, the authority-eligibility status, the admission state, and at least one reason code associated with the admission state.

30. The one or more non-transitory computer-readable media of claim 21, wherein the candidate execution operation comprises a browser-mediated interface operation including at least one of an autofill operation, a click sequence, a navigation event, a form submission, or a credential submission, and wherein the instructions further cause the governance platform to block, hold, or downgrade authority-bearing use when a later-presented interface field, rendered region, or preview surface fails correspondence with a canonical selector form, a selector-set digest, a transformation digest, a support-state indicator, or a permitted-use binding associated with the external context artifact or with a derived artifact thereof.

* * * * *